(12) United States Patent
Ikeya

(10) Patent No.: US 7,210,465 B2
(45) Date of Patent: May 1, 2007

(54) FUEL SUPPLY DEVICE FOR FUEL RETURNLESS SYSTEM

(75) Inventor: Masaki Ikeya, Aichi-ken (JP)

(73) Assignee: Aisan Kogyo Kabushiki Kaisha, Obu-shi, Aichi-ken (JP)

( * ) Notice: Subject to any disclaimer, the term of this patent is extended or adjusted under 35 U.S.C. 154(b) by 33 days.

(21) Appl. No.: 11/151,659

(22) Filed: Jun. 14, 2005

(65) Prior Publication Data

US 2005/0274361 A1 Dec. 15, 2005

(30) Foreign Application Priority Data

| Jun. 14, 2004 | (JP) | ............... 2004-175450 |
| Mar. 10, 2005 | (JP) | ............... 2005-067122 |

(51) Int. Cl.
*F02M 37/04* (2006.01)
*F16K 21/18* (2006.01)

(52) U.S. Cl. .............. 123/510; 123/514; 123/519
(58) Field of Classification Search ........... 123/509, 123/510, 511, 514, 516
See application file for complete search history.

(56) References Cited

U.S. PATENT DOCUMENTS

| 5,263,458 | A | * | 11/1993 | Fujino et al. ............ 123/514 |
| 5,289,810 | A | * | 3/1994 | Bauer et al. .............. 123/510 |
| 5,396,872 | A | * | 3/1995 | Ruger et al. .............. 123/514 |
| 5,636,616 | A | * | 6/1997 | Okane et al. ............. 123/514 |
| 5,647,329 | A | * | 7/1997 | Bucci et al. .............. 123/509 |
| 5,762,047 | A | * | 6/1998 | Yoshioka et al. .......... 123/509 |
| 5,894,857 | A | * | 4/1999 | Takaki et al. ............ 137/395 |
| 6,123,511 | A | * | 9/2000 | Sertier ..................... 417/87 |
| 6,164,267 | A | * | 12/2000 | Okada et al. ............. 123/510 |
| 6,378,504 | B1 | * | 4/2002 | Horiuchi et al. .......... 123/509 |
| 6,718,953 | B1 | * | 4/2004 | Torgerud .................. 123/516 |
| 7,069,916 | B2 | * | 7/2006 | Osanai ..................... 123/516 |
| 7,077,109 | B2 | * | 7/2006 | Lee .......................... 123/514 |

FOREIGN PATENT DOCUMENTS

JP 09032676 2/1997

* cited by examiner

*Primary Examiner*—Thomas Moulis
(74) *Attorney, Agent, or Firm*—Dennison, Schultz & MacDonald

(57) ABSTRACT

A fuel supply device for a fuel returnless system is disposed in a fuel tank and includes: a fuel pump that draws, pressurizes, and discharges fuel in the fuel tank; a pressure regulating valve that regulates the pressure of the pressurized fuel and drains a surplus of the pressurized fuel into the fuel tank; an intake filter that removes foreign matters contained in fuel drawn into the fuel pump; and a pressurized fuel return passage through which a part of the pressurized fuel is returned to a fuel intake passage extending from an interior of the intake filter to a pump intake port of the fuel pump.

29 Claims, 30 Drawing Sheets

FUEL SUPPLY DEVICE FOR FUEL RETURNLESS SYSTEM

This application claims priority to Japanese patent application serial numbers 2004-175450 and 2005-67122, the contents of which are incorporated herein by reference.

BACKGROUND OF THE INVENTION

1. Field of the Invention

The present invention relates to a fuel supply device for a fuel returnless system that supplies an internal combustion engine (hereinafter also referred to simply as the engine) with fuel in a fuel tank mounted mainly in a vehicle such as an automobile. In this specification, the fuel returnless system refers to a system that is constructed so as to treat a surplus of fuel in the fuel tank and prevent it from returning from the engine side to the fuel tank.

2. Description of the Related Art

A known fuel supply device for a fuel returnless system of this kind will be described. As shown in FIG. 10, a fuel supply device in a return system is disposed within a fuel tank 101 and is constructed as a module including a fuel pump 110, a high-pressure filter 112, a pressure regulating valve 114, and an intake filter 116.

The fuel pump 110, which is a motorized pump of an in-tank type, draws fuel from a reserve cup 103 installed in the fuel tank 101 through the intake filter 116, pressurizes the fuel, and discharges the fuel to the high-pressure filter 112. The high-pressure filter 112 removes foreign matters contained in pressurized fuel discharged from the fuel pump 110 and discharges the pressurized fuel to the pressure-regulating valve 114. The pressurized fuel will also be referred to hereinafter as "high-pressure fuel".

The pressure regulating valve 114 regulates the pressure of the pressurized fuel discharged from the high-pressure filter 112 and discharges a surplus of pressurized fuel into the reserve cup 103 through a pressurized fuel return pipe 118. The pressurized fuel whose pressure has been regulated by the pressure-regulating valve 114 is discharged to a fuel supply passage 105 outside the fuel tank 101. The fuel supply passage 105 leads to injectors via a delivery pipe of an engine (not shown). The intake filter 116 removes foreign matters contained in fuel drawn into the fuel pump 110 from the interior of the reserve cup 103.

In the fuel supply device in the aforementioned fuel returnless system, when the fuel pump 110 is driven, fuel within the reserve cup 103 is drawn through the intake filter 116, pressurized, and discharged into the high-pressure filter 112. Fuel that has passed through the high-pressure filter 112 is supplied to the fuel supply passage 105 via the pressure-regulating valve 114. The fuel supplied to the fuel supply passage 105 is supplied to the injectors via the delivery pipe of the engine. FIG. 11 shows how fuel flows in a known fuel supply device (see FIG. 10).

Referring to FIG. 11, "$Q_E$" represents an amount of fuel passing through the intake filter 116, that is, an amount of fuel supplied to the engine or a fuel consumption amount at the engine. "$Q_R$" represents the amount of a surplus of pressurized fuel (a so-called surplus fuel amount) drained from the pressure-regulating valve 114. "P" represents the pressure in the fuel tank 101, which is equal to the atmospheric pressure when P=0. "$P_{SYS}$" represents the pressure of the pressurized fuel supplied into a pipeline of an injector or a high-pressure pump provided in a direct injection engine, that is, a so-called system fuel pressure (more specifically, 300 to 600 kPa). "$-\Delta P$" represents a pressure (negative pressure) in the intake filter 116 generated by drawing fuel via the fuel pump 110.

The fuel supply device in the fuel returnless system as described above is disclosed in, for example, JP 9-32672 A.

In the aforementioned fuel supply device, the intake filter 116 provided on the intake side of the fuel pump 110 presents at least some passage resistance (referred to also as "intake resistance"). Thus, a negative pressure environment is created in the intake filter 116 due to a suction force generated by the fuel pump 110 to draw fuel. Accordingly, for example, in the case where fuel containing low-boiling components such as alcohol or the like is used, the low-boiling components contained in the fuel are decompressed and boiled at a high temperature, in a low-pressure environment, etc., so that steam bubbles or vapors v (see FIG. 10) are generated. The fuel pump 110 draws in the vapors v, which may cause a decrease in the flow rate of fuel discharged from the fuel pump 110 and consequently from the fuel supply device.

SUMMARY OF THE INVENTION

It is an object of the present invention to provide a fuel supply device for a fuel returnless system which is capable of suppressing the generation of vapor in a second filter and preventing the decreasing of the discharge flow rate due to the suction of the vapor via a fuel pump.

In one aspect of the present teachings, fuel supply devices for fuel returnless systems are taught. The fuel supply device is disposed in a fuel tank and includes a fuel pump that draws, pressurizes, and discharges fuel in the fuel tank; a pressure regulating valve that regulates a pressure of the pressurized fuel and drains a surplus of the pressurized fuel into the fuel tank; and a first filter that removes foreign matters contained in fuel drawn into the fuel pump. The fuel supply device includes a pressurized fuel return passage through which a part of the pressurized fuel is returned to a fuel intake passage extending from an interior of the first filter to a pump intake port of the fuel pump. Optionally, a second filter may be provided for removing foreign matters contained in pressurized fuel (hereinafter also referred to as "positive-pressure fuel") discharged from the fuel pump.

Therefore, a negative pressure generated in the first filter due to a fuel suction force of the fuel pump and the passage resistance of the first filter can be mitigated. Vapors that may be generated in the first filter due to decompression and boiling of low-boiling components in fuel at a high temperature, in a low-pressure environment, etc. can be reduced. As a result, potential reduction of the discharge flow rate due to the suction of vapors by the fuel pump can be minimized.

In one embodiment, the surplus of pressurized fuel drained from the pressure-regulating valve is utilized as a pressurized fuel flowing into the fuel intake passage, through the pressurized fuel return passage. Thus, a high-efficiency device can be constructed.

In another embodiment, the pressurized fuel return passage is connected to the pressurized fuel inflow port provided in the first filter. Thus, a loss due to a sealing property resulting from the connection of the pressurized fuel return passage to the first filter, namely, due to fuel leakage, can be reduced or minimized.

In a further embodiment, the pressurized fuel return passage is provided with a vapor separation/drainage mechanism that separates and drains vapor contained in the pressurized fuel flowing through the return passage. Thus, the vapors contained in the pressurized fuel and entering the fuel intake passage can be reduced or minimized.

The vapor separation/drainage mechanism may be provided with a vapor drain hole formed in an upper wall portion of the pressurized fuel return passage and through which vapors are drained. As a result, the vapors can be swiftly drained from the vapor drain hole in the upper wall portion of the pressurized fuel return passage.

The vapor separation/drainage mechanism may be provided with a vapor separation filter that allows the passage of pressurized fuel and restricts the passage of vapors contained in the pressurized fuel.

The vapor separation filter may be formed by a part of the filtering member of the first filter. This construction makes it possible to reduce the number of components and the size of the fuel supply device in comparison with a case where the vapor separation filter is separately provided.

The pressurized fuel return passage of the vapor separation/drainage mechanism may be provided with an expansion chamber that is larger in a passage cross-sectional area than the return passage. Pressurized fuel flowing through the pressurized fuel return passage is decompressed in the expansion chamber, whereby vaporized components in the pressurized fuel can be made into bubbles. Consequently, the vapors contained in the pressurized fuel can be easily separated and drained.

In this case, it is preferable that a vapor drain hole, through which vapors are drained, be formed in a wall portion that is located higher than an inlet portion of the expansion chamber. This construction makes it possible to drain vapors, which have been separated from pressurized fuel and floated and gathered in an upper portion in the expansion chamber, from the vapor drain hole.

The vapor separation/drainage mechanism may be provided with a collision wall with which a flow of pressurized fuel that has flown into the expansion chamber collides. The flow of pressurized fuel that has flown into the expansion chamber collides with the collision wall and is stirred, whereby the vaporized components in the pressurized fuel can be made into bubbles. Thus, the vapors contained in the pressurized fuel can be easily separated and drained.

A vapor drain passage of the vapor separation/drainage mechanism, through which vapors are drained, may be provided with a valve mechanism for maintaining the fuel pressure in the pressurized fuel return passage at a prescribed pressure. Thus, the fuel supply performance can be stabilized. At the same time, fuel and gases (air and vapors) can be prevented from flowing backwards from the vapor drain passage. The vapor drain passage may include a vapor drain hole for draining vapors, a duct for draining vapors, or the like.

A vapor drain passage of the vapor separation/drainage mechanism, through which vapors are drained, may be provided with a throttle means for limiting a flow rate of drained fuel. The throttle means limits the flow rate of fuel drained to the outside of the pressurized fuel return passage, whereby the flow rate of pressurized fuel returned to the fuel intake passage can be prevented or restrained from decreasing.

The first filter (i.e., an intake filter) may have a larger filtering area than that of the second filter (i.e., a high-pressure filter) and enable the removal of foreign matters that are approximately equal in size to or smaller in size than those captured or removed by the second filter. Accordingly, the first filter can remove foreign matters contained in fuel drawn into the fuel pump, especially foreign matters that are approximately equal in size to or smaller in size than those removed by the second filter. Thus, a sliding portion of the fuel pump may be prevented or restrained from abrading, malfunctioning, etc. due to foreign matters. As a result, the life of the fuel pump can be prolonged. In this specification, "sliding portion" means a portion where members slide relatively to each other.

In another embodiment, the fuel supply device is further provided with a reserve cup and a jet pump. The reserve cup is installed in the fuel tank, and stores fuel that is drawn via the first filter by means of the fuel pump. Using the flow of pressurized fuel discharged from the vapor drain passage of the vapor separation/drainage mechanism, through which vapors are drained, as a drive source, the jet pump transfers fuel from outside of the reserve cup into the reserve cup. Therefore, the pressure energy of the flow of pressurized fuel discharged from the vapor drain passage of the vapor separation/drainage mechanism can be efficiently utilized.

In another embodiment, the fuel supply device may be further provided with a reserve cup and a jet pump. The reserve cup is installed in the fuel tank and stores fuel that is drawn via the first filter by means of the fuel pump. Using a flow of pressurized fuel discharged from a branch passage provided in the pressurized fuel return passage as a drive source, the jet pump transfers fuel from outside of the reserve cup into the reserve cup. This construction also makes it possible to efficiently utilize the pressure energy of the flow of pressurized fuel in the pressurized fuel return passage.

In another embodiment, the pressurized fuel return passage is provided with a jet pump that draws fuel using a flow of pressurized fuel as a drive source. The jet pump makes it possible to draw fuel into the pressurized fuel return passage. Therefore, the amount of fuel returned to the fuel intake passage can be increased, and the negative pressure generated in the first filter can be mitigated.

In these cases, it is preferable that the jet pump serves also as a vapor separation/drainage mechanism that separates and drains the vapor contained in pressurized fuel flowing through the pressurized fuel return passage. Accordingly, the vapor contained in the pressurized fuel flowing through the pressurized fuel return passage can be separated and drained by the jet pump.

In another embodiment, the fuel pump is provided with a pump portion and a motor portion. The pump portion draws, pressurizes, and discharges fuel. The motor portion is constructed as a brushless motor and drives the pump portion. Pressurized fuel discharged from the pump portion passes through an interior of the motor. Since the motor portion is a non-contact brushless motor having no brushes, there are almost no foreign matters generated in the motor portion. Even when the pressurized fuel discharged from the pump portion passes through the interior of the motor, foreign matters in the motor portion can be prevented or restrained from mixing into the pressurized fuel, so that the life of the fuel supply device can be prolonged. In addition, since the brushless motor can be controlled with regard to rotational speed, the discharge flow rate of the fuel can be easily regulated.

In another embodiment, the fuel pump is provided with a pump portion and a motor portion. The pump portion draws fuel, pressurizes the fuel, and directly discharges the fuel to the outside of the pump. The motor portion drives the pump portion. Therefore, discharged fuel is directly discharged from the pump portion to the outside of the motor. Accordingly, since foreign matters in the motor can be prevented from mixing into the pressurized fuel as a result of the passage of the pressurized fuel through the interior of the motor, the life of the fuel pump can be prolonged. A brushless motor or a brush-equipped motor can be used as the motor portion. For example, in the case where the brushless motor is used the discharge flow rate of fuel can be easily regulated since the rotational speed thereof can be controlled. In the case where a brush-equipped motor is used the drive circuit required for a brushless motor can be dispensed with, achieving a cost reduction in comparison with the case of the brushless motor. A fuel pump having a construction in which a pump portion is separated from a motor portion and drivably linked by a motor portion can be employed.

In this case, it is preferable that the fuel pump be provided with an outflow port through which a part of pressurized fuel flows out from the pump portion into the motor portion, and a drain port through which pressurized fuel, which has flowed into the motor portion through the outflow port, is discharged to the outside of the pump. Thus, a part of fuel flows out from the pump portion into the motor portion through the outflow portion and is discharged from the drain port to the outside of the pump, whereby the motor portion can be cooled and the sliding portion of the motor portion can be lubricated. For instance, the sliding portion may include a sliding portion between a bearing and a shaft of an armature or between a brush and a commutator.

It is preferable that the fuel supply device further includes a jet pump that transfers fuel from outside of the reserve cup into the reserve cup by using the flow of pressurized fuel discharged from the drain port of the fuel pump as a driving source to enable the transfer. Accordingly, the pressure energy of the flow of pressurized fuel discharged from the drain port of the fuel pump can be efficiently utilized.

In another embodiment, the first filter (i.e., the intake filter) is provided with the filtering members of a multilayer structure that is coarse on an outer layer side and fine on an inner layer side. Thus, by capturing both large foreign matter and small foreign matter in a stepwise manner by means of the different layers of the filtering members, the filtering member on the inner layer side can be prevented from being clogged and the life of the first filter can be prolonged.

In this case, it is preferable to form a vapor separation filter by a part of the filtering member provided on the outer layer side of the first filter. The vapor separation filter allows the passage of the pressurized fuel, restricts the passage of vapor contained in the pressurized fuel, and causes the fuel pump to draw pressurized fuel that has passed through the filtering member on the outer layer side. The vapor contained in the pressurized fuel can therefore be prevented or restrained from entering the fuel intake passage. Since the vapor separation filter is formed utilizing a part of the filtering member on the outer layer side of the first filter, the number of components can be reduced and the fuel supply device can be reduced in size in comparison with the case in which the vapor separation filter is provided separately. By utilizing a part of the filtering member on the outer layer side as the vapor separation filter and by causing the fuel pump to draw pressurized fuel that has passed through the filtering member on the outer layer side, the pressure loss of the pressurized fuel is smaller than in a case where the filtering member on the inner layer side is utilized. As a result, the vapor separation filter can be prevented or restrained from being clogged with vapor.

In another embodiment, the first filter (i.e., the intake filter) is provided with a pressurized fuel introduction passage through which pressurized fuel is introduced from a pressurized fuel inflow port to a region close to the pump intake port of the fuel pump. Thus, the pressurized fuel is introduced to a region close to the pump intake port of the fuel pump, increasing the pressure in the region close to the intake port. Consequently, vapors can be restrained from being generated due to the negative pressure generated in the first filter.

In another embodiment, the first filter (i.e., the intake filter) is provided with a pressurized fuel lead-out passage which is connectible to a discharge port of the fuel pump and through which fuel discharged from the discharge port is introduced into a predetermined region. Thus, piping for connection to the discharge port of the fuel pump can be dispensed with, so that the number of components can be reduced and the fuel supply device can be reduced in size. A member forming the pressurized fuel lead-out passage may be mounted to the first filter or be molded integrally with the filter case of the first filter. In the case where the member forming the pressurized fuel lead-out passage is molded integrally with the filter case of the first filter, the number of components can be reduced and the first filter can be reduced in size.

In another embodiment, a part of at least one component disposed in the vicinity of the reserve cup is integrated with the reserve cup. Thus, the number of components can be reduced and the fuel supply device can be reduced in size. The component integrated with the reserve cup may be mounted to the reserve cup or be molded integrally with the reserve cup. The first filter (i.e., the intake filter), the jet pump, the pressurized fuel introduction passage, the pressurized fuel lead-out passage, or the like may be the component disposed in the vicinity of the reserve cup. The technical scope of the present invention covers the case of partially or entirely integrating at least one or a plurality of those components with the reserve cup.

In another embodiment, a sealing member is interposed between the pump intake port of the fuel pump and the fuel introduction passage connected to the intake port of the fuel pump. As a result, fuel can be prevented or restrained from leaking from a connecting portion between the pump intake port of the fuel pump and the fuel introduction passage.

In another embodiment, a sealing member is interposed between a drain port of the fuel pump and the fuel lead-out passage connected to the drain port. Thus, fuel can be prevented or restrained from leaking from a connecting portion between the drain port of the fuel pump and the fuel lead-out passage.

BRIEF DESCRIPTION OF THE DRAWINGS

Additional objects, features, and advantages, of the present invention will be readily understood after reading the following detailed description together with the claims and the accompanying drawings, in which:

DETAILED DESCRIPTION OF THE INVENTION

Each of the additional features and teachings disclosed above and below may be utilized separately or in conjunction with other features and teachings to provide improved fuel supply devices for fuel returnless systems and methods of manufacturing such fuel supply devices. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful embodiments of the present teachings.

(First Representative Embodiment)

Figure 1:
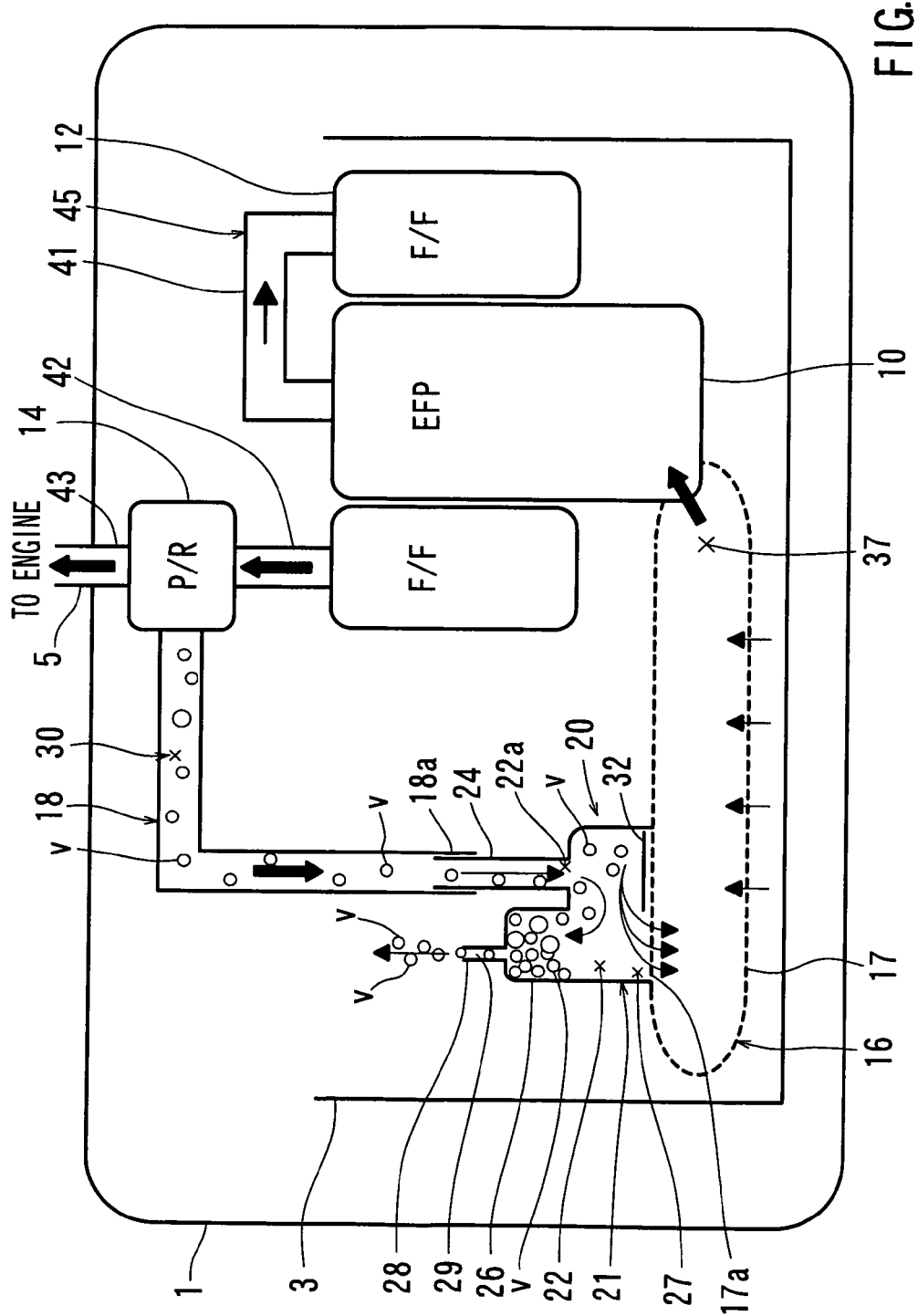
FIG. 1 is a schematic view showing a fuel supply device for a fuel returnless system according to a first representative embodiment of the present invention.

A fuel supply device for a fuel returnless system (hereinafter also referred to simply as "the fuel supply device") according to a first embodiment of the present invention will be described. As shown in FIG. 1, the fuel supply device is constructed as a module in which a fuel pump 10, a high-pressure filter 12, a pressure regulating valve 14, and an intake filter 16 are integrated. The fuel tank 1 defines a substantially sealed fuel accommodation space. The fuel supply device is disposed in a reserve cup 3 (also referred to simply as "a cup") of a fuel tank 1. The reserve cup 3 installed in the fuel tank 1 is also referred to as "a sub tank", "a reservoir cup", or the like. The reserve cup 3 is provided as needed or may be dispensed with.

First the fuel pump 10 will be described. The fuel pump 10, which is an in-tank-type motorized pump, is installed in the fuel tank 1, functions to draw and pressurize the fuel (not shown) in the reserve cup 3 so as to discharge the fuel into the high-pressure filter 12. Fuel gradually flows into the fuel tank 1 via a communication passage (not shown), such as an access flow hole formed in the reserve cup 3.

Figure 12:
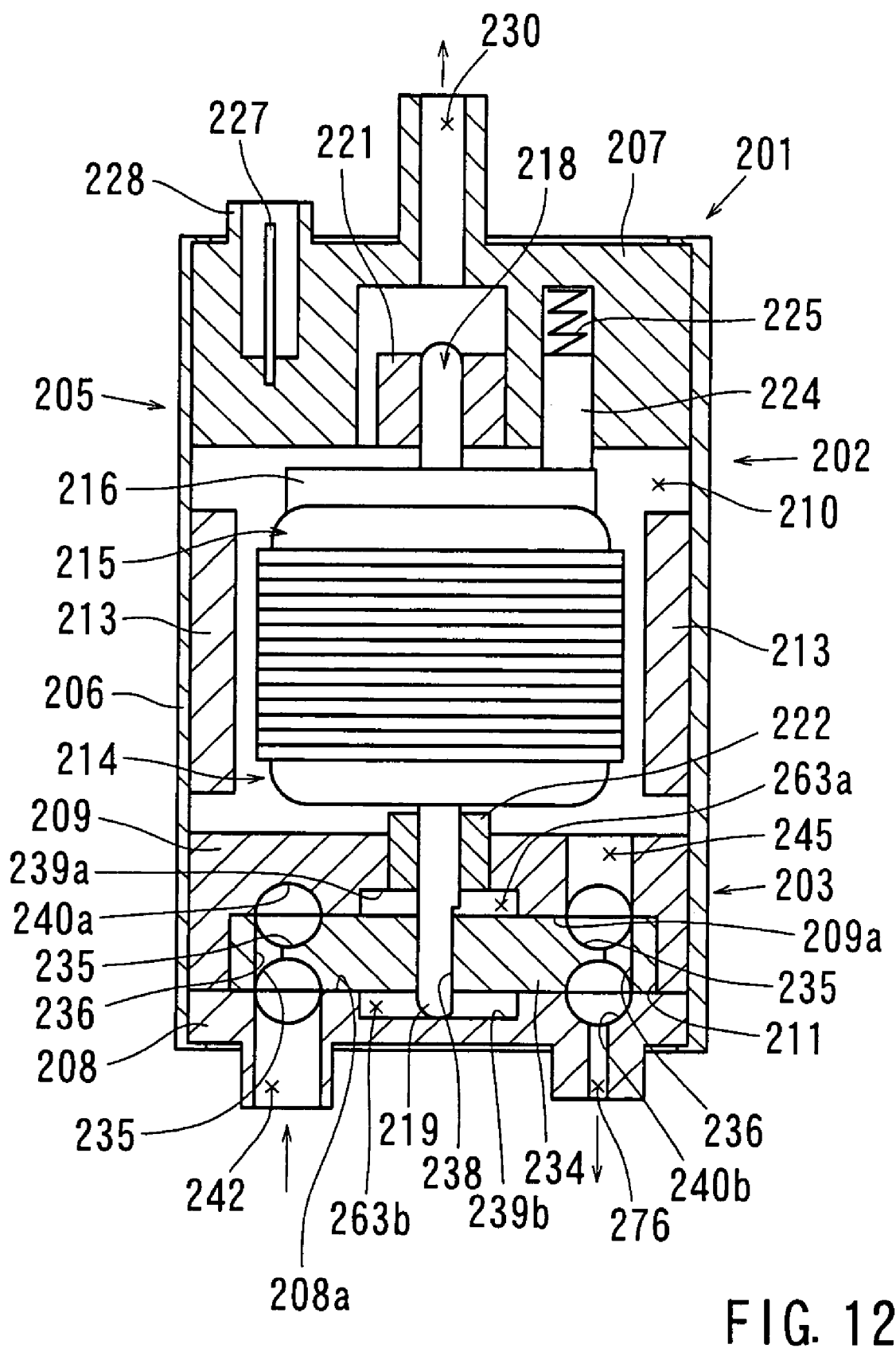
FIG. 12 is a sectional view showing a fuel pump of the fuel supply device of the first representative embodiment.

As shown in FIG. 12, the fuel pump 10 may be integrally provided with a motor portion 202 and an impeller-type (also referred to as Westco-type) pump portion 203 provided in one end portion (a lower end portion in FIG. 12) of the motor portion 202. A casing 205, constituting an outer shell of the fuel pump 10, is provided with a generally cylindrical housing tube 206, a motor cover 207 for closing one end (an upper end in FIG. 12) of the housing tube 206, a pump cover 208 for closing the other end (a lower end in FIG. 12) of the housing tube 206, and a pump housing 209 provided in a superimposed manner on the pump cover 208 in the housing tube 206. The pump housing 209 partitions an interior of the housing tube 206 into a motor chamber 210 of the motor portion 202 and a pump chamber 211 of the pump portion 203.

The motor portion 202 is constructed as, for example, a brush-equipped direct-current motor, and is provided with magnets 213 fixed to the interior of the housing tube 206, and an armature 214 that is rotationally driven in the housing tube 206. The armature 214 has an armature body 215 provided with a commutator 216, a core (to which no reference numeral is assigned), a coil (not shown), and the like, and a shaft 218 penetrating an axial center portion of the armature body 215. The motor cover 207 rotatably supports one end portion (an upper end portion in FIG. 12) of the shaft 218 via a bearing 221. The pump housing 209 rotatably supports the other end portion (a lower end portion in FIG. 12) of the shaft 218 via a bearing 222. The lower portion of the shaft 218 penetrates the pump housing 209. The lower end portion of the shaft 218, protruding into the pump chamber 211, is configured as a coupling shaft portion 219 having a non-circular cross-section (e.g., a D-shaped cross section).

Brushes 224 slidably contact the commutator 216 of the armature 214. Springs 225 press the brushes 224 against the commutator 216. The brushes 224, springs 225, and the like, are assembled into the motor cover 207. The motor cover 207 is provided with a connector portion 228, which is provided with terminals 227 for electrically connecting to the brushes 224. The coil (not shown) of the armature 214 is energized by the application of power through the terminals 227, the brushes 224, and the commutator 216. Consequently, the armature 214 is rotationally driven. A pump discharge port 230, which communicates with the motor chamber 210 and opens to an outside of the pump (for example, upwards as viewed in FIG. 12), is formed in the motor cover 207.

In the pump portion 203, a generally disc-shaped impeller 234 is rotatably accommodated in the pump chamber 211. A large number of blade grooves 235, circumferentially arranged at intervals of a predetermined distance, are formed in a front-back symmetrical manner in an outer peripheral portion of the impeller 234. The blade grooves 235 disposed on the front and back faces communicate with one another through communication holes 236. The coupling shaft portion 219 of the shaft 218 of the armature 214 is inserted into and engaged with a shaft hole 238 that is correspondingly configured as a non-circular hole (e.g., a D-shaped hole). The shaft hole 238 is formed in a central portion of the impeller 234 in a manner enabling torque transmission.

In the pump housing 209 and the pump cover 208, generally circular recess grooves 239a and 239b are vertically symmetrically formed in central portions of wall faces (to which reference symbols 209a and 208a are assigned) facing both front and back faces of the impeller 234. The recess groove 239a of the pump housing 209 and the recess groove 239b of the pump cover 208 respectively form bearing chambers 263a and 263b. Generally arc-shaped flow passage grooves 240a and 240b, corresponding to the respective blade grooves 235 of both the front and back faces of the impeller 234, are vertically symmetrically formed in the wall face 209a of the pump housing 209 and the wall face 208a of the pump cover 208, which face both the front and back faces of the impeller 234.

A pump intake port 242, which communicates with a leading end portion of the flow passage groove 240b and opens to the outside of the pump (i.e., namely, downwards as viewed in FIG. 12) is formed in the pump cover 208. In addition, a vapor drain port 276 is formed in the pump cover 208 and communicates with a portion between the leading end portion and a trailing end portion of the flow passage groove 240b. The vapor drain port 276 opens to the outside of the pump (i.e., downwards as viewed in FIG. 12). An inner discharge port 245 is formed in the pump housing 209 and communicates with a trailing end portion of the flow passage groove 240a and opens to the motor chamber 210. The vapor drain port 276 and the inner discharge port 245 are offset in position from each other by a predetermined amount with respect to the circumferential direction of the impeller 234.

The operation of the aforementioned fuel pump 10 (see FIG. 12) will be described next. Energizing the coil (not shown) of the armature 214 of the motor portion 202 rotationally drives the armature 214. The impeller 234 is then rotated in a predetermined direction as the shaft 218 of the armature 214 rotates, performing a pumping action. As this pumping action is performed, fuel is drawn into both the upper and lower flow passage grooves 240a and 240b from the pump intake port 242. The fuel receives kinetic energy from the blade grooves 235 of both the front and back faces communicating with one another through the communication holes 236 of the impeller 234. The fuel is sent from the leading end portions toward the trailing end portions in both of the flow passage grooves 240a and 240b, while being pressurized. The pressurized fuel that has been sent to the trailing end portions of both of the flow passage grooves 240a and 240b is then discharged into the motor chamber 210 through the inner discharge port 245. Furthermore, the pressurized fuel passes through the interior of the motor chamber 210 and is discharged from the pump discharge port 230. Steam bubbles or vapor contained in the fuel, which are sent while being pressurized in a pumping stroke caused by one turn of the impeller 234, are drained from the vapor drain port 276 to the outside of the pump.

Now the high-pressure filter 12 will be described. The pressurized fuel that has been discharged from the pump discharge port 230 (see FIG. 12) of the fuel pump 10 flows into the high-pressure filter 12 through a first duct 41. The high-pressure filter 12 removes foreign matter contained in the pressurized fuel discharged from the pump discharge port 230 of the fuel pump 10, and subsequently discharges the pressurized fuel to the pressure-regulating valve 14. Although not shown, a filter having, for example, a generally cylindrical or C-shaped tubular filter case in which a likewise generally cylindrical or C-shaped tubular filter element is accommodated is adopted as the high-pressure filter 12. The fuel pump 10 is disposed in an inserted state in a hollow portion of the high-pressure filter 12.

The pressure-regulating valve 14 will now be described. The pressurized fuel discharged from the high-pressure filter 12 flows through a second duct 42 into the pressure regulating valve 14, also referred to as "a pressure regulator" or the like. The pressure-regulating valve 14 regulates the fuel pressure of the pressurized fuel discharged from the high-pressure filter 12, and drains a surplus of the pressurized fuel through a pressurized fuel return pipe 18. The other end portion or a downstream end portion of the pressurized fuel return pipe 18 is connected to a pressurized fuel inflow port 24 of a gas-liquid separation housing 21, which will be described later. Fuel at a predetermined fuel pressure level, which has been discharged from the pressure regulating valve 14, is discharged through a third duct 43 to the fuel supply passage 5 provided outside of the fuel tank 1. The fuel discharged to the fuel supply passage 5 is supplied to injectors via a delivery pipe of an engine (not shown).

The intake filter 16 will be described next. The intake filter 16, which is also referred to as "a suction filter", "a low-pressure filter", or the like, is connected to the pump intake port 242 of the fuel pump 10 (see FIG. 12). The intake filter 16 has a generally bag-shaped reticulate filtering member 17, and removes foreign matter contained in the fuel drawn into the fuel pump 10 from an interior of the reserve cup 3 by means of the filtering member 17. The intake filter 16 is so formed as to enable removal of foreign matter that are relatively larger in size than those removed by the high-pressure filter 12. The high-pressure filter 12 is provided with a fine-mesh filtering material (not shown) enabling removal of motor-derived foreign matter, which are contained in fuel and are relatively smaller in size than those removed by the filtering member 17 of the intake filter 16. The motor-derived foreign matter may include abrasion powder that is generated due to the abrasion of the sliding portions of the motor portion 202 of the fuel pump 10 (see FIG. 12), namely, sliding portions between the commutator 216 and the brushes 224, and is mixed with the pressurized fuel. The high-pressure filter 12 removes motor-derived foreign matter in order to aid in preventing problems otherwise caused by the delivery of the motor-derived foreign matter to the pressure regulating valve 14 disposed downstream of the high-pressure filter 12, the injectors (not shown), or the like. As a result, a fine-mesh filtering material (not shown) may be selected for the high-pressure filter 12, for example, such that a capture value of 95% is obtained in a foreign matter capture test and that foreign matter can be removed in the range of 5 to 30 μm. A fuel flow passage extending from an interior of the intake filter 16 (see FIG. 1) to the pump intake port 242 (see FIG. 12) of the fuel pump 10 forms the fuel intake passage 37.

Figure 2:
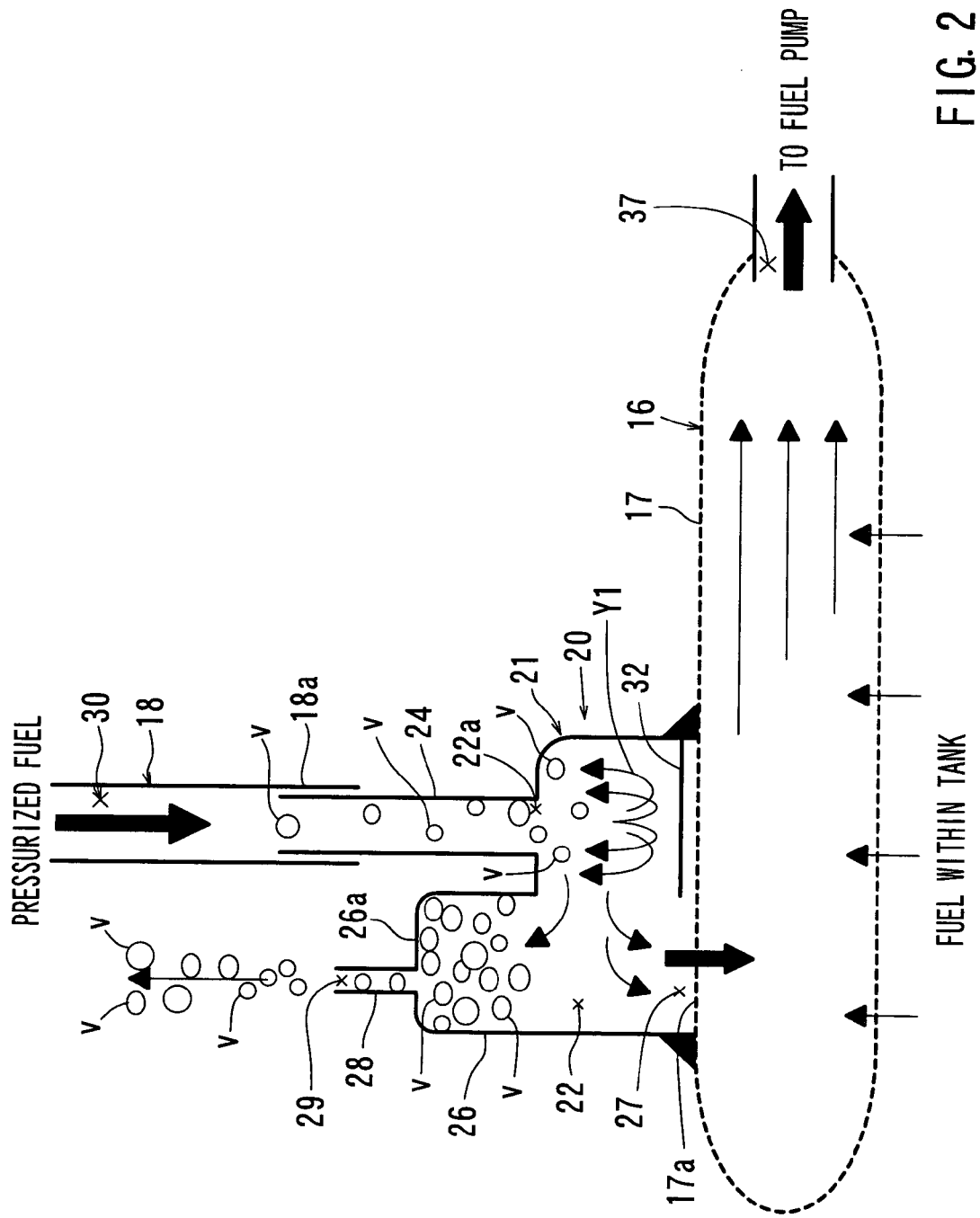
FIG. 2 is a schematic view showing an intake filter.

As shown in FIG. 2, the gas-liquid separation housing 21, which may be in the shape of an inverted cup, is integrally provided on the filtering member 17 of the intake filter 16. An expansion chamber 22 is defined inside of the gas-liquid separation housing 21. The gas-liquid separation housing 21 is provided with a pressurized fuel inflow port 24 and an expansion portion 26. The pressurized fuel inflow port 24 assumes the shape of a straight pipe and protrudes from an upper face of the gas-liquid separation housing 21. The expansion portion 26 is arranged in parallel with the inflow port 24 and is spaced at a predetermined distance therefrom. The expansion portion 26 protrudes from the upper face of the gas-liquid separation housing 21 in the shape of an inverted cup, for example. The other end portion or a downstream end portion 18a of the pressurized fuel return pipe 18 is directly coupled in a sealed state to the pressurized fuel inflow port 24, by means of a faucet joint composed of a socket and a spigot. "The faucet joint" mentioned in this specification refers to a joint in which one member is a spigot and is tightly fitted into a socket as the other member. Therefore, regarding the pressurized fuel inflow port 24 and the downstream end portion 18a of the pressurized fuel return pipe 18, for example, the pressurized fuel inflow port 24 (as a spigot) is tightly fitted into the downstream end portion 18a of the pressurized fuel return pipe 18 (as a socket).

The expansion chamber 22 is formed with a larger passage cross section than that of the pressurized fuel inflow port 24. A downstream end portion or a lower-end opening portion of the pressurized fuel inflow port 24 serves as an inlet portion 22a of the expansion chamber 22. A straight-pipe-shaped vapor jet 28 defining a vapor drain hole 29, through which the expansion chamber 22 opens to the outside of the housing, protrudes above a wall portion located at a higher position than the inlet portion 22a of the expansion chamber 22, namely, above an upper wall portion 26a of an enlarged portion 26 (see FIG. 2). Accordingly, the upper wall portion 26a of the enlarged portion 26 of the gas-liquid separation housing 21 constitutes an upper wall portion of a pressurized fuel return passage 30.

A substantially plate-like collision wall 32, which is substantially horizontally located above the filtering member 17 of the intake filter 16 at a predetermined distance therefrom, is integrally provided in a bottom portion of the gas-liquid separation housing 21. The collision wall 32 is disposed directly below the inlet portion 22a of the expansion chamber 22. The collision wall 32 blocks the flow of pressurized fuel (referred to as the pressurized fuel flow) that flowed into the expansion chamber 22 through the pressurized fuel inflow port 24. The collision wall 32 prevents the pressurized fuel from being directly applied to the filtering member 17 of the intake filter 16. A part of a lower face opening portion of the expansion chamber 22, which is not blocked by the collision wall 32, serves as a communication port 27 through which the expansion chamber 22 communicates with the filtering member 17 of the intake filter 16. A portion of the filtering member 17 of the intake filter 16, which faces the communication port 27 of the expansion chamber 22, serves as a vapor separation filter 17a.

As shown in FIG. 1, in the fuel tank 1 a pressurized fuel discharge passage 45 is defined by a passage through which fuel, pressurized by the fuel pump 10, flows. The fuel flows namely via a pressurized fuel passage extending from a pressurization-side flow passage of the fuel pump 10 to a downstream end portion of the third duct 43. In other words, the pressurized fuel discharge passage 45 defines a pressurized fuel flow passageway that makes it possible to create system fuel pressure $P_{SYS}$ (see FIG. 3) in the fuel tank 1.

A pressurized fuel path forms the pressurized fuel return passage 30 that is mainly defined by the interior of the pressurized fuel return pipe 18. The pressurized fuel return passage 30 includes the expansion chamber 22 in the gas-liquid separation housing 21 and the like. The fuel flow passageway extending from the interior of the intake filter 16 to the pump intake port 242 (see FIG. 12) of the fuel pump 10 defines the fuel intake passage 37.

A vapor separation/drainage mechanism 20 is constituted by the gas-liquid separation housing 21, the vapor separation filter 17a of the intake filter 16, and the like.

In the fuel supply device (see FIG. 1) in the fuel returnless system described above, when the fuel pump 10 is driven, the fuel in the reserve cup 3 is filtered by passing through the filtering member 17 of the intake filter 16. The filtered fuel is then drawn into the fuel pump 10 from the pump intake port 242 (see FIG. 12). The fuel drawn into the fuel pump 10 is pressurized in the fuel pump 10 and is discharged from the pump discharge port 230 (see FIG. 12). The fuel is discharged into the high-pressure filter 12 through the first duct 41. The pressurized fuel that has been filtered by passing through the high-pressure filter 12 is discharged through the second duct 42 to the pressure-regulating valve 14. The pressurized fuel is then supplied to the fuel supply passage 5 outside the fuel tank 1 via the third duct 43. The pressurized fuel supplied to the fuel supply passage 5 is further supplied to the injectors via the delivery pipe of an engine (not shown).

The pressure-regulating valve 14 regulates the fuel pressure of the pressurized fuel. A surplus of pressurized fuel is discharged from the pressurized fuel return pipe 18 to the expansion chamber 22 through the pressurized fuel inflow port 24 of the gas-liquid separation housing 21. At this location, an energetic flow of pressurized fuel collides with the collision wall 32 and rebounds (see arrows Y1 in FIG. 2). As a result, the portion of pressurized fuel containing the most vapor v is separated into an upper layer portion or the enlarged portion 26 in the expansion chamber 22, and the portion of pressurized fuel containing almost no vapor v is separated into a lower layer portion of the expansion chamber 22. The pressurized fuel containing almost no vapor v, which had been separated into the lower layer portion of the expansion chamber 22, mainly flows into the filtering member 17 of the intake filer 16 from the communication port 27 via the vapor separation filter 17a. The fuel pump 10 thereby draws the returned fuel again. The portion of the pressurized fuel containing most of the vapor v, which had been previously separated into the upper layer portion of the expansion chamber 22, is drained from the vapor drain hole 29 into the fuel tank 1 (more specifically, into the reserve cup 3).

Figure 3:
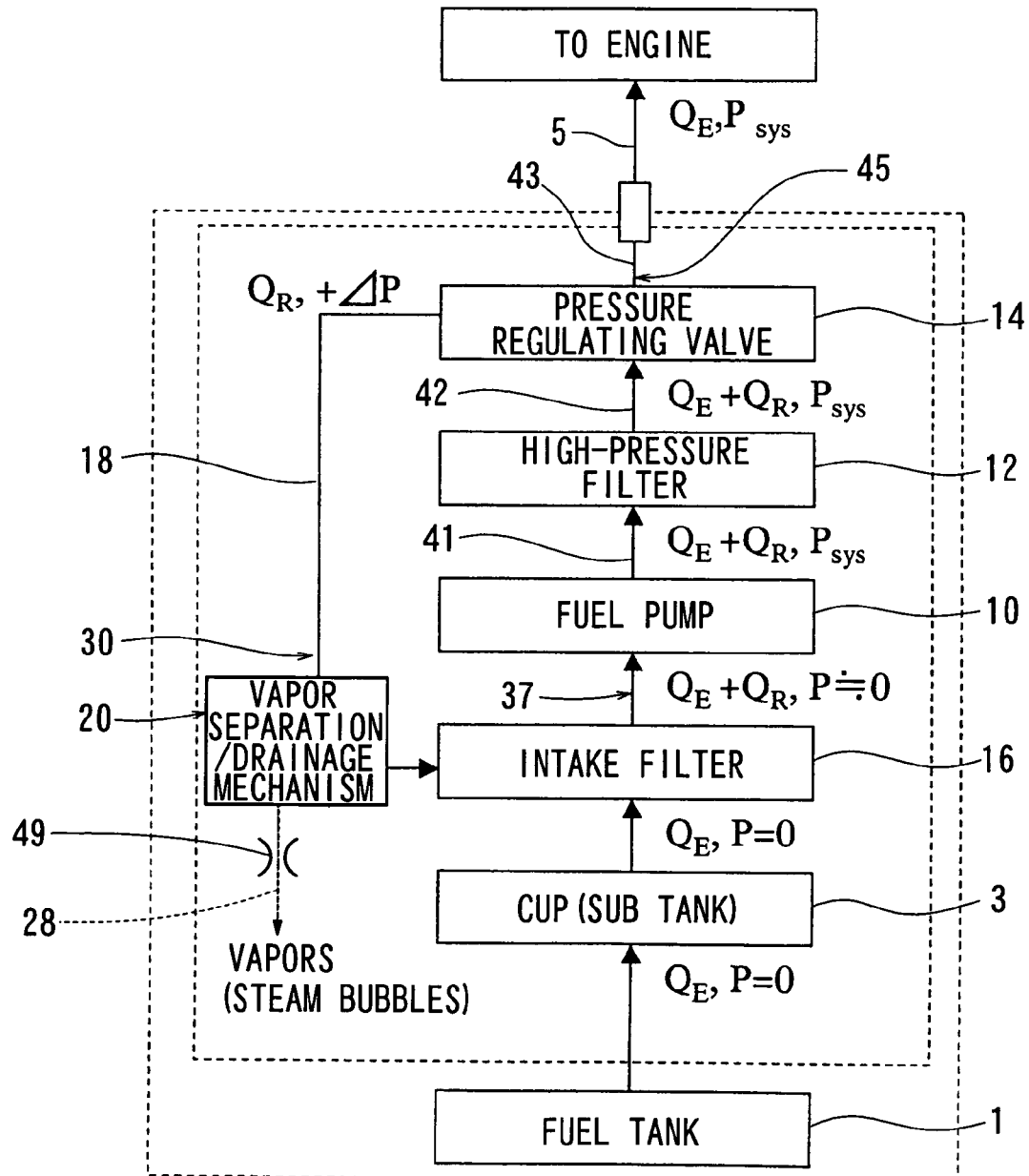
FIG. 3 is an explanatory view showing how fuel flows in the fuel supply device in the fuel returnless system.

FIG. 3 shows how the fuel flows in the fuel supply device of the aforementioned first representative embodiment. Referring to FIG. 3, "$Q_E$" represents an amount of fuel passing through the intake filter 16, namely, the amount of fuel to be supplied to the engine or the fuel consumption amount of the engine.

"$Q_R$" represents a surplus amount of pressurized fuel that is drained from the pressure-regulating valve 14.

"P" represents the pressure in the fuel tank 1. "P" is equal to atmospheric pressure when P=0.

"$P_{SYS}$" represents an in-pipe supply pressure of pressurized fuel that is supplied to an injector or a high-pressure pump provided in a direct-injection engine, and is called the system fuel pressure (e.g., 300 to 600 kPa).

"+ΔP" represents a rise in the pressure resulting from the passage resistance at a time when the pressurized fuel, i.e., the returned fuel drained from the pressure-regulating valve 14, passes through the vapor separation filter 17a (see FIG. 1). It should be noted that Δ means a value sufficiently smaller than the system fuel pressure $P_{SYS}$.

Figure 11:
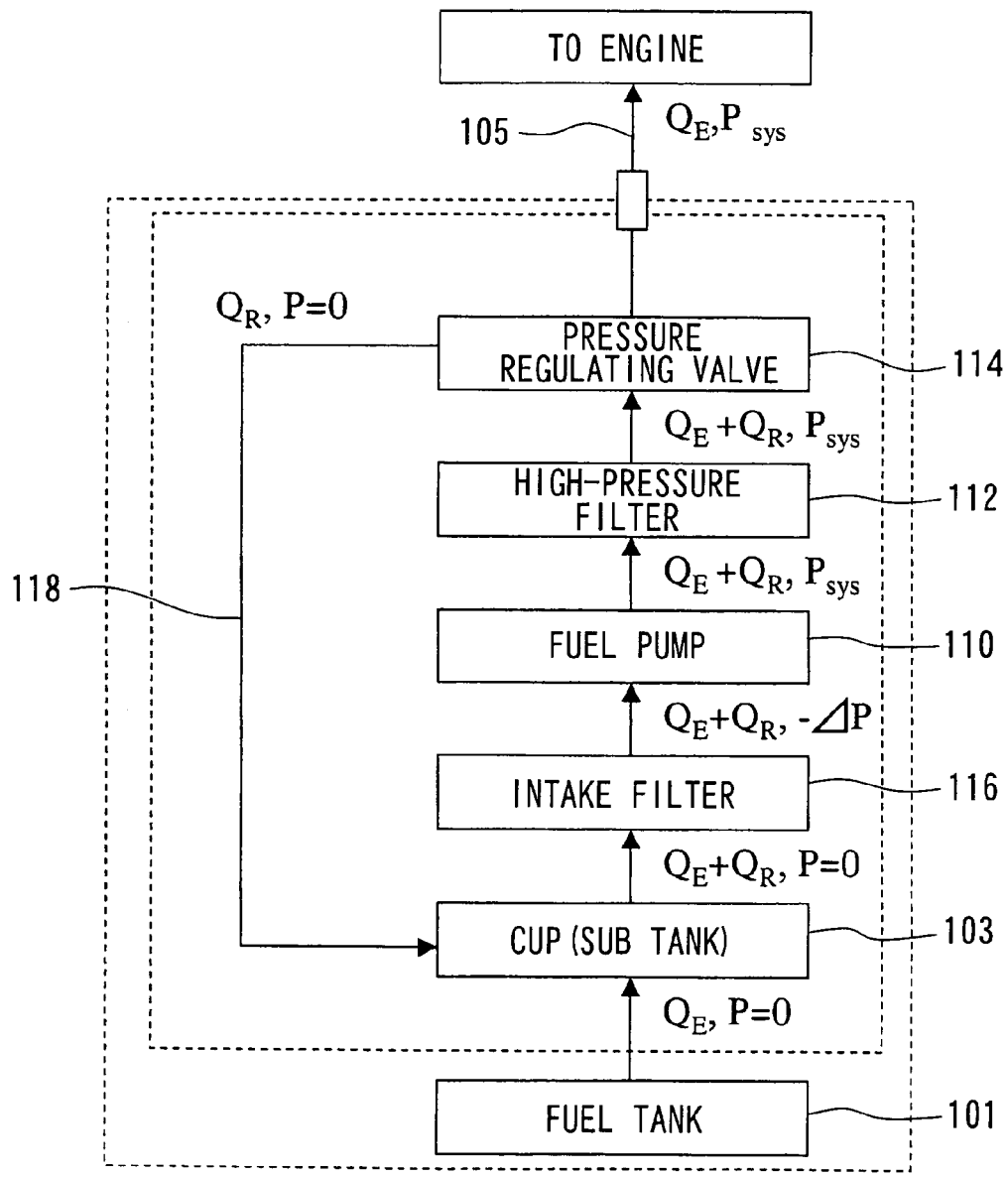
FIG. 11 is an explanatory view showing how fuel flows in the fuel supply device in the fuel returnless system.

"P≈0" in the fuel intake passage 37 extending from the intake filter 16 to the fuel pump 10 means that a pressure (i.e., a negative pressure) "−ΔP" in the intake filter 16 in the conventional example (see FIG. 11) has been mitigated.

The vapor jet 28 (more specifically, the interior of the vapor drain hole 29) of the vapor separation/drainage mechanism 20 is provided with an orifice or a throttle 49 (see FIG. 3) for limiting the flow rate of drained fuel containing vapor to a predetermined amount. The vapor jet 28 having the vapor drain hole 29 constitutes a vapor drain passage. The throttle 49 constitutes throttle means for limiting a flow rate of drained fuel.

During normal use, the fuel amount $Q_E$ required by the engine side is approximately equal to or smaller than 30% of a fuel discharge flow rate ($Q_E+Q_R$) of the fuel pump 10. As a result, a surplus of pressurized fuel is continuously discharged from the pressure-regulating valve 14.

According to the fuel supply device in the aforementioned fuel returnless system, a portion of the positive-pressure fuel or the pressurized fuel discharged from the fuel pump 10, flows into or is drawn into the intake filter 16 through the pressurized fuel return passage 30. The negative pressure generated in the intake filter 16, as a result of the force of the fuel intake due to the fuel pump 10 and the passage resistance of the intake filter 16, can be mitigated. Therefore, generation of vapor in the intake filter 16 due to the decompression and boiling of low-boiling components contained in fuel, for example, at a high temperature, low-pressure environment, etc. can be reduced or minimized in the case where fuel is used containing low-boiling components such as alcohol. Thus, a decrease in the discharge flow rate of fuel due to the intake of vapors by the fuel pump 10 can be reduced or minimized. This is advantageous in a situation where fuel is used containing low-boiling components such as alcohol, for example.

Since a surplus of the pressurized fuel drained from the pressure regulating valve 14 is utilized as the pressurized fuel flowing into the intake filter 16 through the pressurized fuel return passage 30, it is possible to construct a high-efficiency device.

The pressurized fuel flowing through the pressurized fuel return pipe 18 is forced to flow into the intake filter 16, thereby pressurized fuel that has been pressurized and heated by passing through the interior of the fuel pump 10 is not discharged into the fuel tank 1 and the reserve cup 3 outside of the intake filter. Accordingly, a rise in the temperature of the fuel in the fuel tank 1 and the reserve cup 3 can be reduced or minimized.

By connecting the downstream end portion 18a of the pressurized fuel return pipe 18 to the pressurized fuel inflow port 24 of the gas-liquid separation housing 21 provided in the intake filter 16, a series of pressurized fuel return passages 30 can be formed. Losses resulting from sealing performance can be reduced or prevented, for example, in the case where the downstream end portion 18a of the pressurized fuel return pipe 18 simply abuts the filtering member 17 of the intake filter 16.

The vapor v contained in the pressurized fuel flowing through the pressurized fuel return passage 30 can be separated by means of the vapor separation/drainage mechanism 20 (see FIG. 2). The vapor v can then be drained from the vapor drain hole 29 of the gas-liquid separation housing 21. As a result, the vapor v contained in the pressurized fuel can be prevented or restrained from entering the intake filter 16.

The vapor v contained in the pressurized fuel flowing through the pressurized fuel return passage 30 can be swiftly discharged from the vapor drain hole 29 of the upper wall portion 26a (see FIG. 2) of the enlarged portion 26 of the gas-liquid separation housing 21 defining the upper wall portion of the pressurized fuel return passage 30. Consequently, the vapor v contained within the pressurized fuel can be prevented or restrained from entering the intake filter 16.

The vapor separation filter 17a, as a part of the filtering member 17 of the intake filter 16, allows the passage of pressurized fuel and restricts the passage of the vapor v contained within the pressurized fuel. Therefore, the vapor v contained within the pressurized fuel can be prevented or restrained from entering the intake filter 16.

The vapor separation filter 17a is formed using a section of the filtering member 17 of the intake filter 16. In comparison with a case in which a separate vapor separation filter is provided, the number of individual components can be reduced and the overall cost and size of the fuel supply device can be reduced.

The pressurized fuel flowing through the pressurized fuel return passage 30 is decompressed in the expansion chamber 22 in the gas-liquid separation housing 21. The decompression causes the vaporized components in the pressurized fuel to form into bubbles. The vapor v contained in the pressurized fuel can then be easily separated and drained.

The vapor v that has been separated from the pressurized fuel floats upwards and gathers in the enlarged portion 26, defining an upper portion of the expansion chamber 22 in the gas-liquid separation housing 21. The vapor v can then be drained from the vapor drain hole 29. Consequently, the vapor v contained within the pressurized fuel can be prevented or restrained from entering into the intake filter 16.

A flow of pressurized fuel that had previously flowed into the expansion chamber 22 in the gas-liquid separation housing 21 collides with the collision wall 32 and is effectively stirred. The vaporized components in the pressurized fuel can then be made into bubbles. Once in bubble form, the vapor v contained within the pressurized fuel can be easily separated and drained.

The throttle 49 provided in the vapor jet 28 of the vapor separation/drainage mechanism 20 restricts the flow rate of fuel discharged to the outside of the pressurized fuel return passage 30. Thus, the flow rate of pressurized fuel returned to the fuel intake passage 37 (more specifically, into the intake filter 16) can be prevented or restrained from decreasing.

Figure 4:
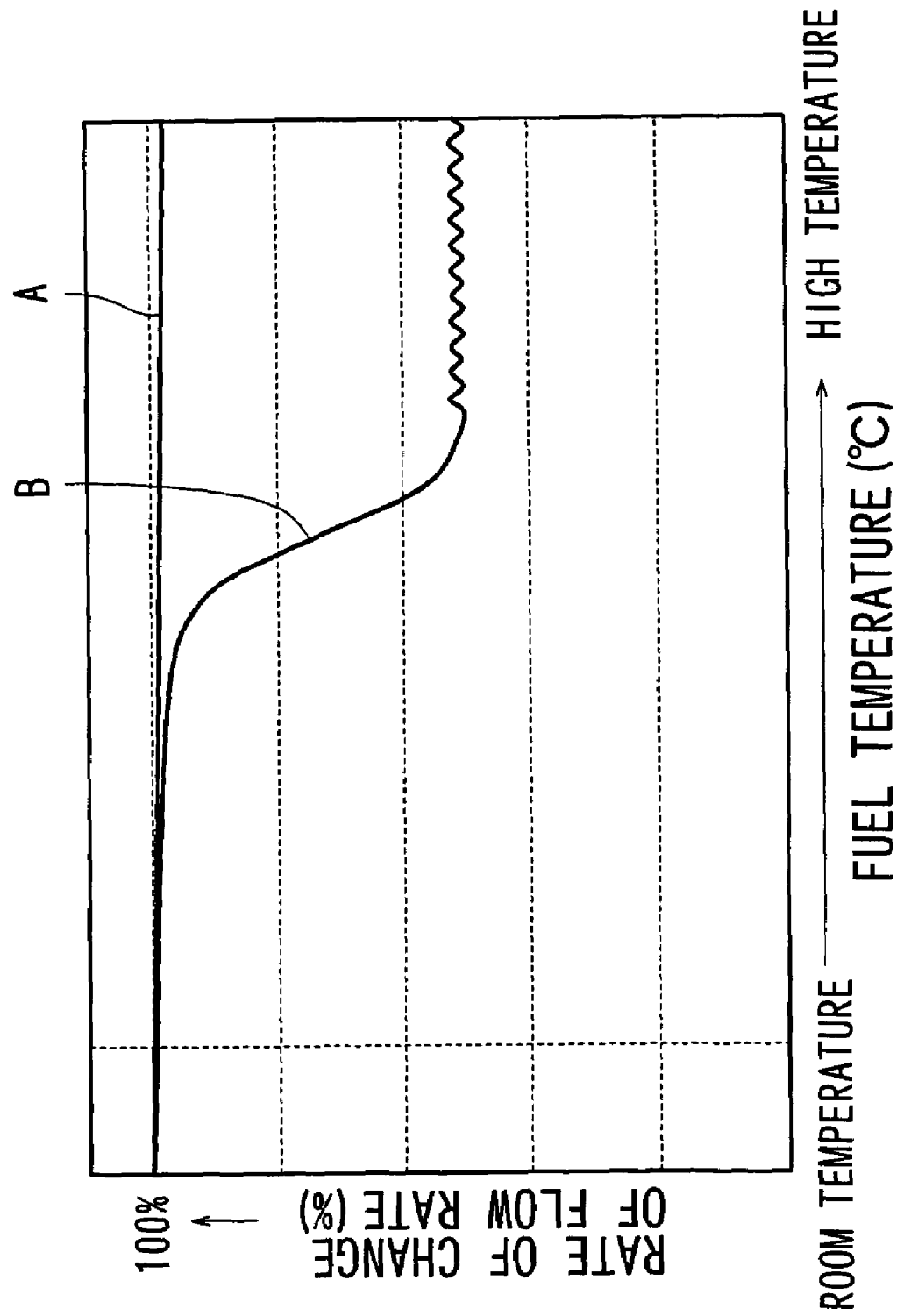
FIG. 4 is a characteristic diagram showing a relation between a fuel temperature and a rate of change in discharge flow rate.

An abrupt heat-up test (e.g., with a rise in temperature of approximately 1° C. per minute) was conducted to measure the relationship between the fuel temperature and a rate of change in the flow rate of fuel discharged from the fuel pump in each of the fuel supply device of the aforementioned first representative embodiment and the known fuel supply device. As a result, obtaining the measurement results shown in FIG. 4. Referring to FIG. 4, the abscissa represents the fuel temperature (° C.) and the ordinate axis represents a rate of change (%) in the discharge flow rate of fuel. A characteristic curve A indicates the rate of change in the flow rate in the fuel supply device of the first embodiment. A characteristic curve B indicates a rate of change in flow rate in the known fuel supply device.

As is apparent from FIG. 4, in the case of the known fuel supply device (see the characteristic curve B), when the fuel temperature becomes high, the rate of change in discharge flow rate of fuel decreases and thus the discharge flow rate of fuel decreases. In contrast, in the case of the fuel supply device of a first representative embodiment (see the characteristic curve A), it is apparent that the rate of change in the discharge flow rate of fuel only slightly changes. The discharge flow rate of fuel is stabilized even when the fuel temperature becomes high.

The aforementioned representative embodiment is arranged such that a surplus of pressurized fuel drained from the pressure-regulating valve 14 is returned to the pressurized fuel return passage 30. However, the pressurized fuel can be returned to the pressurized fuel return passage 30 from any portion as long as the fuel pump 10 has pressurized the fuel. In other words, the pressurized fuel return pipe 18 can be connected to any portion of the pressurized fuel discharge passages 41, 42, and 43. Moreover, it is desirable to connect the pressurized fuel return pipe 18 to the pressurized fuel discharge passages 42 or 43 so as to return the pressurized fuel filtered by the high-pressure filter 12.

The aforementioned representative embodiment is arranged such that pressurized fuel from the pressurized fuel return passage 30 is returned into the intake filter 16. However, the pressurized fuel from the pressurized fuel return passage 30 can be returned into any portion of the fuel intake passage 37.

The second to twenty-second representative embodiments of the present invention will be described hereinafter. These embodiments are modification examples of the first representative embodiment, and members similar to those of the first embodiment are denoted by the same reference symbols. The description of these similar members may not be repeated.

(Second Representative Embodiment)

Figure 5:
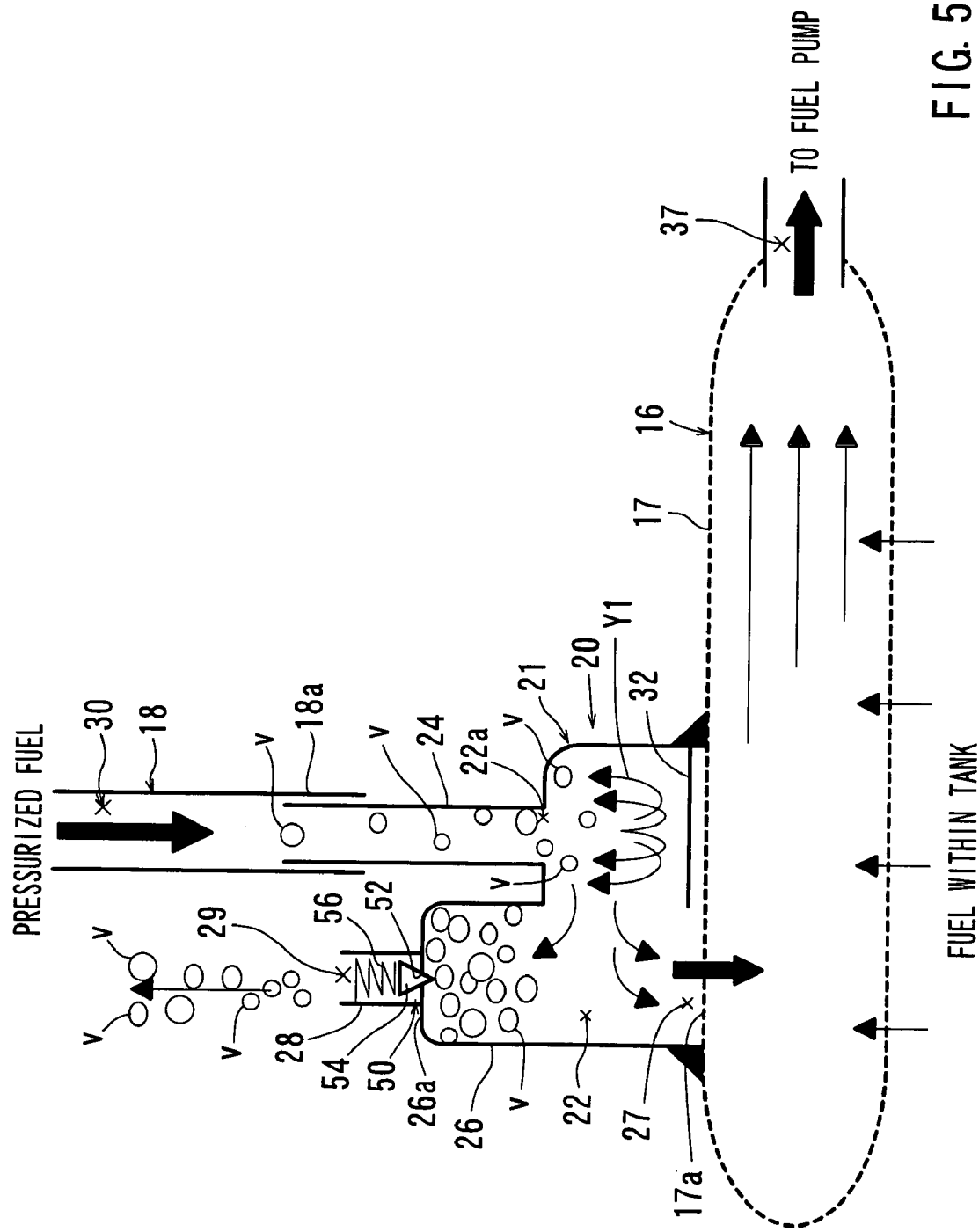
FIG. 5 is a schematic view showing an intake filter according to a second representative embodiment of the present invention.

According to a second representative embodiment of the present invention, as shown in FIG. 5, the vapor jet 28 (more specifically, the interior of the vapor drain hole 29) of the gas-liquid separation housing 21 of the vapor separation/drainage mechanism 20 in the aforementioned first representative embodiment (see FIG. 1), is provided with a valve mechanism 50 for maintaining a prescribed fuel pressure in the pressurized fuel return passage 30. The valve mechanism 50 is composed of a valve body 54 and a spring member 56. The valve body 54 can open and close a valve port 52 that is formed in the upper wall portion 26a of the enlarged portion 26 of the gas-liquid separation housing 21. The valve body 54 communicates with the vapor drain hole 29. The spring member 56 is inserted into the vapor drain hole 29 and urges the valve body 54 in a closing direction. The valve body 54 opens the valve port 52 with the aid of the elasticity of the spring member 56 when the fuel pressure in the expansion chamber 22 of the gas-liquid separation housing 21 becomes equal to or higher than a predetermined pressure. The valve body 54 closes the valve port 52 with the aid of an elasticity restoration force of the spring member 56 when the fuel pressure becomes lower than the predetermined pressure. Thus, the fuel pressure in the expansion chamber 22 in the gas-liquid separation housing 21 is maintained at a prescribed pressure. In the case of this representative embodiment, the throttle 49 (see FIG. 3) formed in the vapor jet 28 can be dispensed with.

The fuel supply device in the fuel returnless system of this representative embodiment also makes it possible to achieve an operation and an effect similar to those of the aforementioned first embodiment. Furthermore, the valve mechanism 50 provided in the vapor jet 28 of the vapor separation/drainage mechanism 20 can hold the fuel pressure in the pressurized fuel return passage 30, including the expansion chamber 22, at a prescribed pressure. Consequently, the performance of the fuel supply system can be stabilized. At the same time, fuel and gases (air or vapor) from the vapor jet 28 can be prevented from flowing backward, namely, into the expansion chamber 22.

(Third Representative Embodiment)

Figure 6:
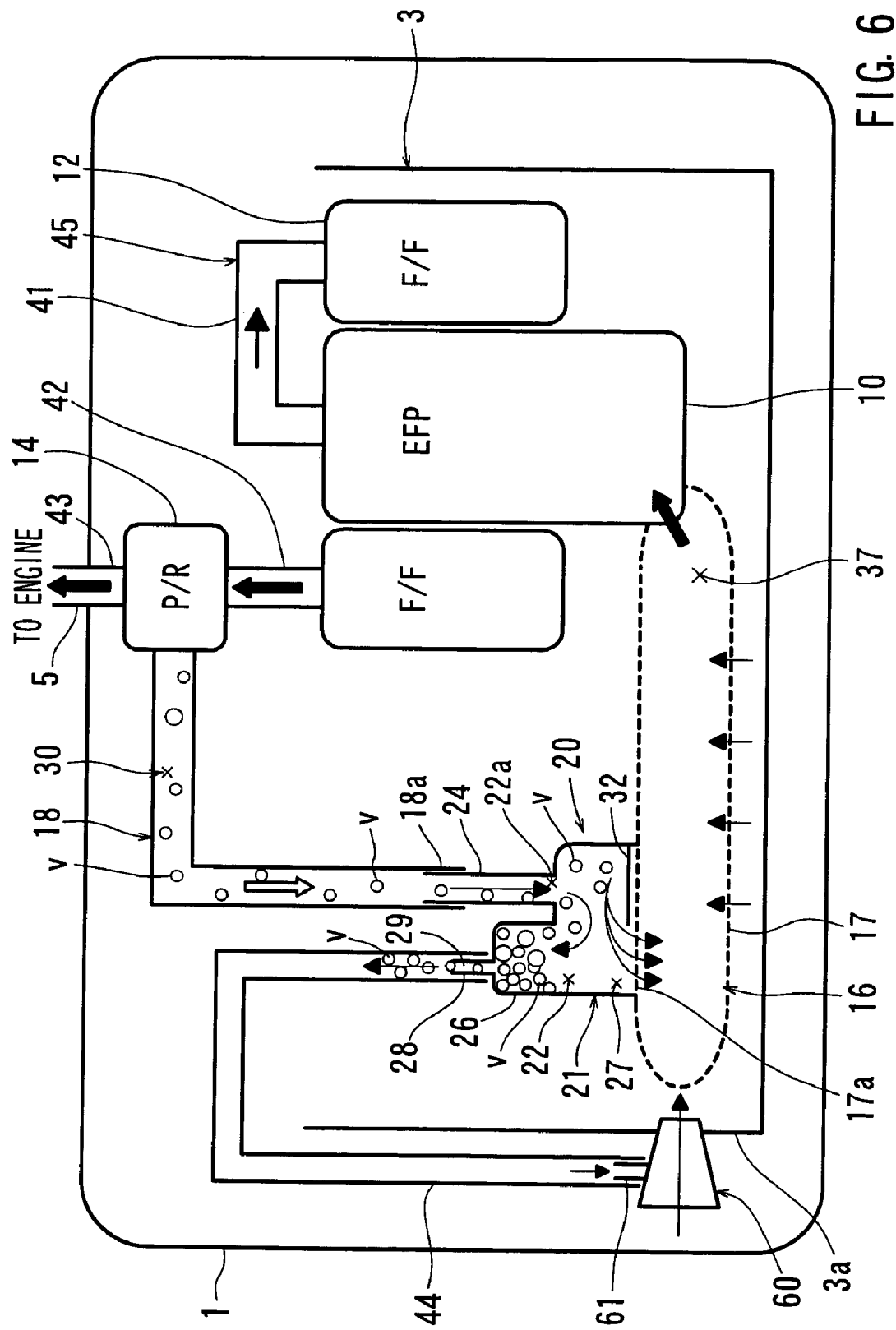
FIG. 6 is a schematic view showing a fuel supply device for a fuel returnless system according to a third representative embodiment of the present invention.

A third representative embodiment of the present invention will be described with reference to FIGS. 6 and 7. In this embodiment a jet pump 60 is provided in a lower portion of a lateral wall (indicated by reference symbol 3a) of the reserve cup 3 from the aforementioned first representative embodiment (see FIG. 1). One end portion of a fourth duct 44 is connected in a sealed state to the vapor jet 28 of the gas-liquid separation housing 21 by means of a faucet joint composed of a socket and a spigot. The other end portion of the fourth duct 44 is connected in a sealed state to the transferred fuel introduction portion 61 of the jet pump 60 by means of a faucet joint also composed of a socket and a spigot. Owing to the negative pressure generated in discharging the pressurized fuel introduced through the fourth duct 44 from the reserve cup 3, the jet pump 60 draws the fuel from outside of the reserve cup 3 in the fuel tank 1 and sends the outside fuel into the reserve cup 3. In other words, the jet pump 60 performs a pumping action of transferring fuel from outside of the reserve cup 3 in the fuel tank 1 into the reserve cup 3, using the flow of pressurized fuel containing vapor discharged from the vapor drain hole 29 of the gas-liquid separation housing 21 as a driving source. The basic construction of this kind of jet pump is well known in the art and therefore will not be described in detail.

Figure 7:
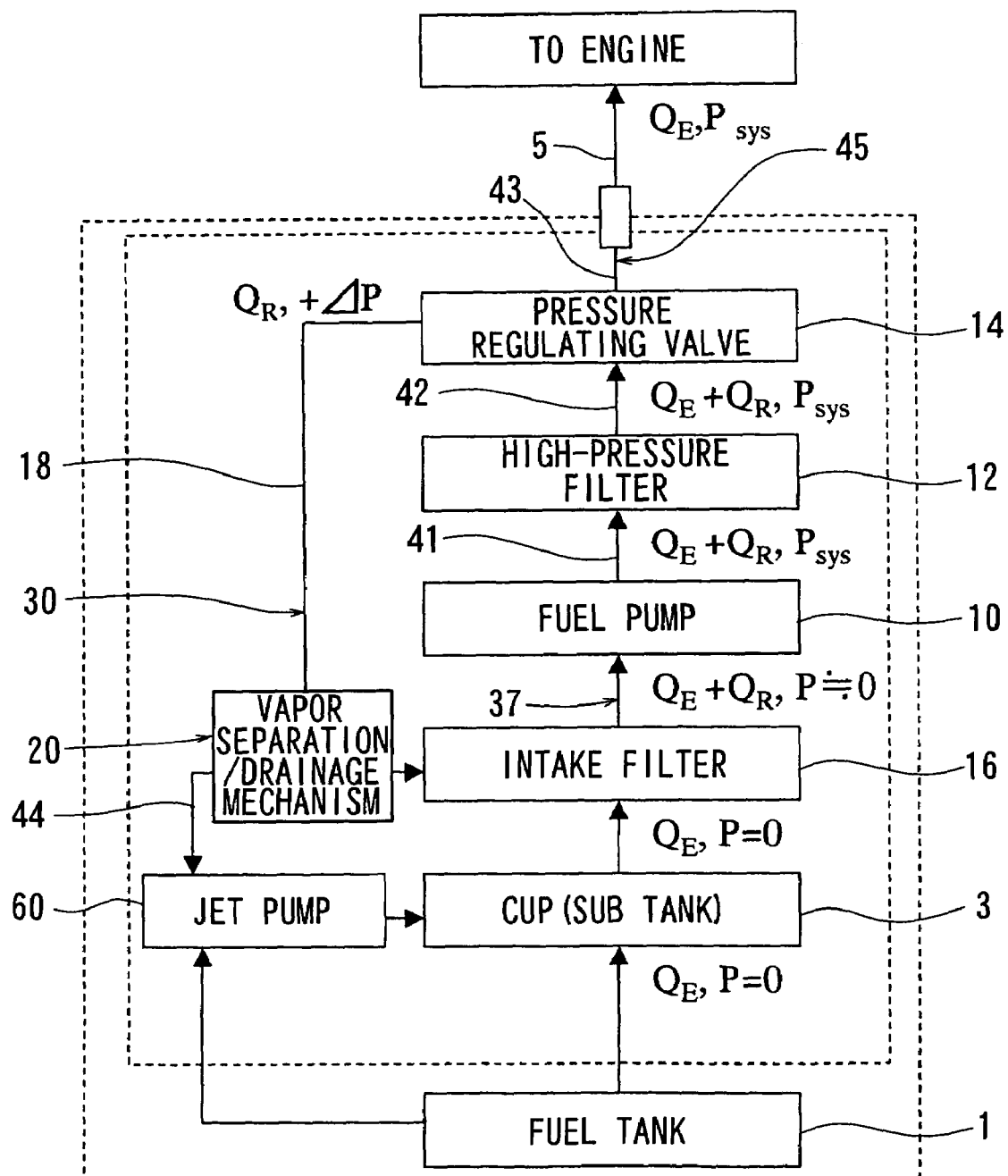
FIG. 7 is an explanatory view showing how fuel flows in the fuel supply device in the fuel returnless system.

FIG. 7 shows how fuel flows in the fuel supply device of the aforementioned third representative embodiment. Referring to FIG. 7, "$Q_E$", "$Q_R$", "P", "$P_{SYS}$", "ΔP", and "P≈0" are similar to those in the case of the flow of fuel (see FIG. 3) in the fuel supply device of the aforementioned first representative embodiment.

The fuel supply device in the fuel returnless system of this representative embodiment also makes it possible to achieve an operation and an effect similar to those of the aforementioned first representative embodiment.

Furthermore, the jet pump 60, which uses a flow of pressurized fuel containing vapor discharged from the vapor drain hole 29 of the gas-liquid separation housing 21 as the driving source, can transfer fuel from outside of the reserve cup 3 in the fuel tank 1 into the reserve cup 3. Accordingly, the pressure energy of the flow of pressurized fuel discharged from the vapor drain hole 29. In this case, in order to ensure a stable flow rate of fuel flowing into the jet pump 60, it is appropriate to increase the surplus fuel amount $Q_R$ of the pressurized fuel drained from the pressure regulating valve 14 to the pressurized fuel return passage 30. The fuel sent into the reserve cup 3 by the jet pump 60 may also directly flow into the intake filter 16.

(Fourth Representative Embodiment)

Figure 8:
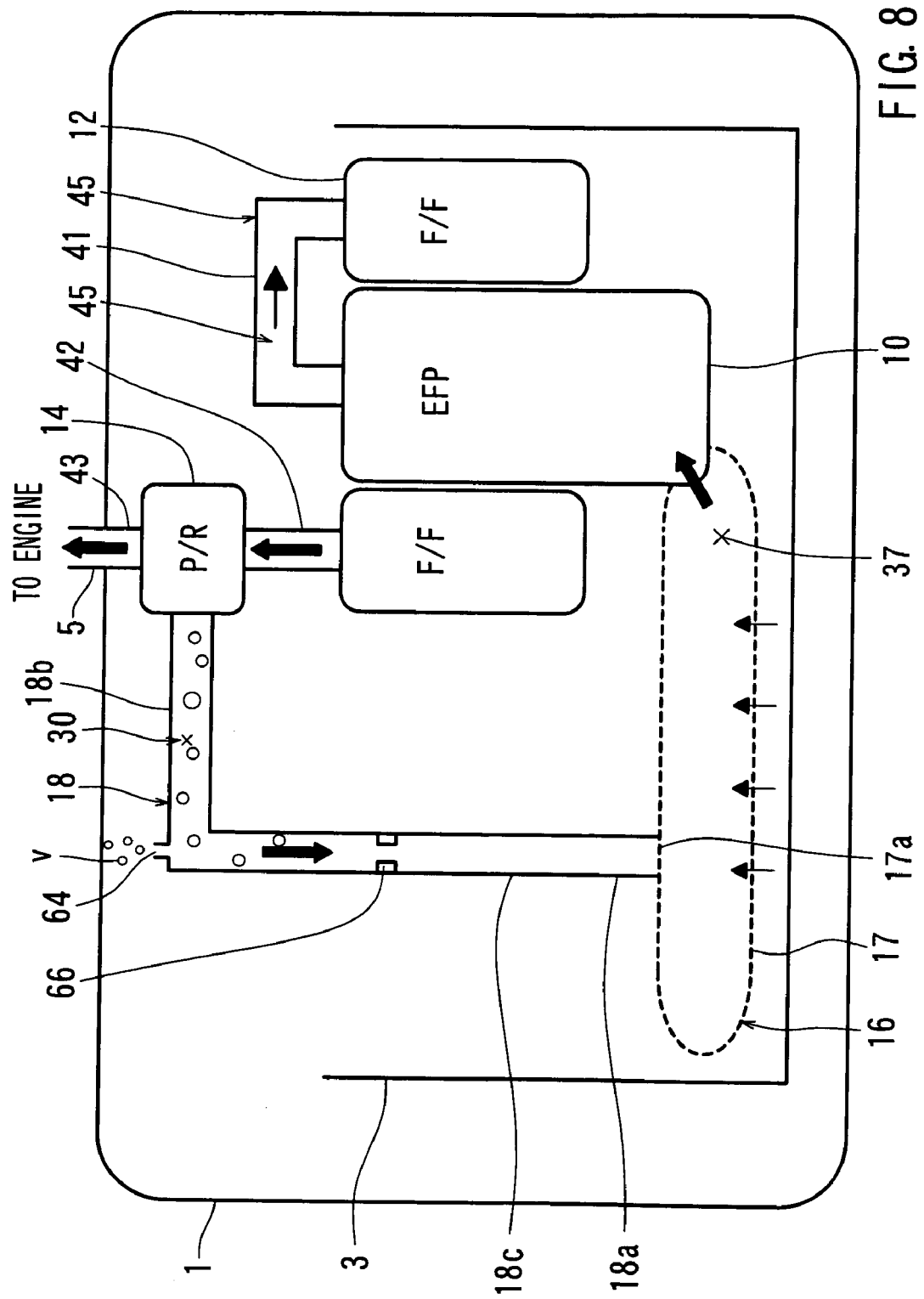
FIG. 8 is a schematic view showing a fuel supply device for a fuel returnless system according to a fourth representative embodiment of the present invention.

A fourth embodiment of the present invention will be described with reference to FIGS. 8 and 9. In this representative embodiment, as shown in FIG. 8, the downstream end portion 18a of the pressurized fuel return pipe 18 is directly connected to, that is, abuts the upper face of the filtering member 17 of the intake filter 16. A portion of the filtering member 17, which faces the opening of the downstream end portion 18a of the pressurized fuel return pipe 18, serves as the vapor separation filter 17a (which is assigned the same reference symbol as in the first representative embodiment) similar to that of the aforementioned first representative embodiment. In this representative embodiment, the gas-liquid separation housing 21 of the vapor separation/drainage mechanism 20 as provided in the aforementioned first representative embodiment (see FIG. 1) is dispensed with.

The pressurized fuel return pipe 18 has a horizontal pipe portion 18b and a vertical pipe portion 18c. The horizontal pipe portion 18b is connected to the pressure-regulating valve 14 and extends substantially horizontally. The vertical pipe portion 18c is continuously formed with the horizontal pipe portion 18b, extends downwards, and has a downstream end portion 18a. This particular configuration holds true for the pressurized fuel return pipes 18 of the aforementioned first to third representative embodiments as well.

However, a vapor drain hole 64 is formed in an upper wall portion (which is not assigned a reference numeral) of the horizontal pipe portion 18b of the pressurized fuel return pipe 18. The upper wall portion of the horizontal pipe portion 18b of the pressurized fuel return pipe 18 constitutes the upper wall portion of the pressurized fuel return passage 30. In this embodiment, therefore, the vapor drain hole 64 opened in the upper wall portion of the horizontal pipe portion 18b of the pressurized fuel return pipe 18 constitutes a vapor separation/drainage mechanism.

In addition, the vertical pipe portion 18c of the pressurized fuel return pipe 18 is provided with a throttle 66 for limiting the flow rate of pressurized fuel returned into the intake filter 16 to a predetermined amount.

Figure 9:
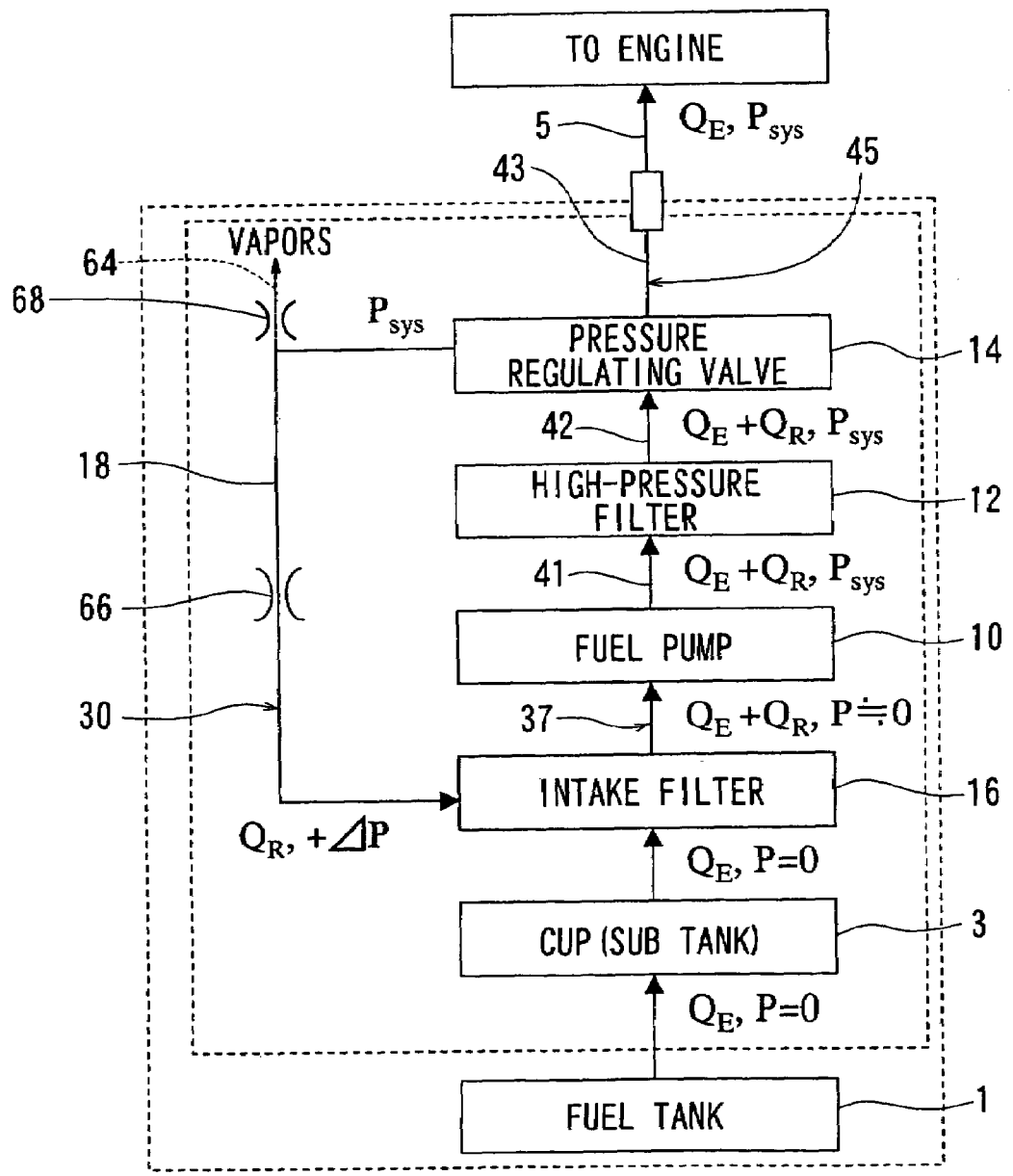
FIG. 9 is an explanatory view showing how fuel flows in the fuel supply device in the fuel returnless system.
Figure 10:
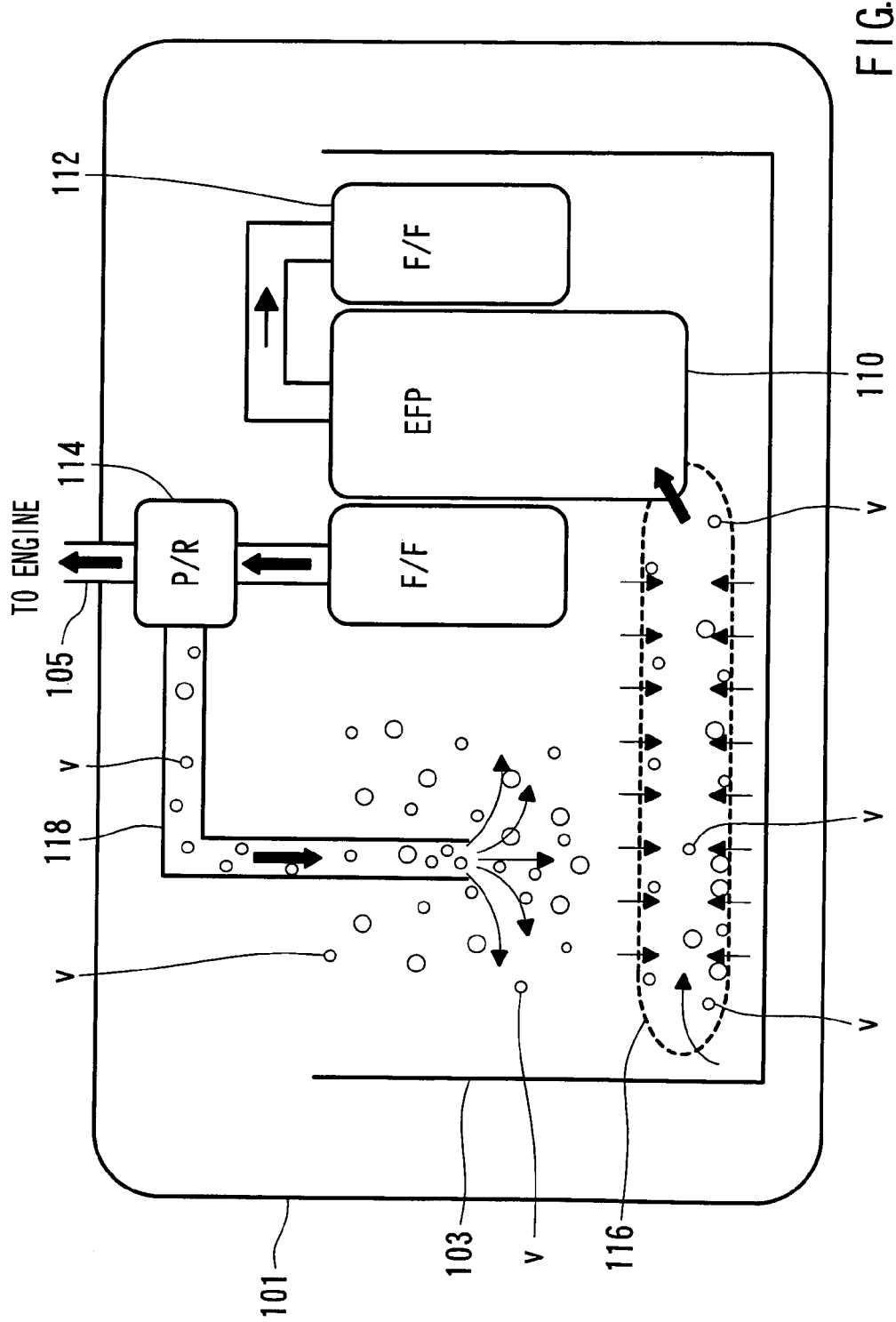
FIG. 10 is a schematic view showing a known fuel supply device for a fuel returnless system.

FIG. 9 shows how the fuel flows in the fuel supply device of the aforementioned fourth representative embodiment. Referring to FIG. 9, "$Q_E$", "$Q_R$", "P", "$P_{SYS}$", "+ΔP", and "P≈0" are similar to those in the case of the flow of fuel (see FIG. 3) in the fuel supply device of the aforementioned first representative embodiment.

The throttle 66 formed in the vertical pipe portion 18c of the pressurized fuel return pipe 18 limits the flow rate of pressurized fuel returned into the intake filter 16 to a predetermined fuel amount $Q_R$. At the predetermined fuel amount $Q_R$, the reduction of the system fuel pressure $P_{SYS}$ to a value lower than a predetermined value may be prevented or minimized.

An orifice or a throttle 68 for limiting the flow rate of fuel containing drained vapor to a predetermined amount is formed in the vapor drain hole 64 of the pressurized fuel return pipe 18. The vapor drain hole 64 constitutes a vapor drain passage. The throttle 68 constitutes throttle means for limiting the flow rate of the drained fuel.

The fuel supply device in the fuel returnless system of this representative embodiment also makes it possible to achieve an operation and an effect similar to those of the aforementioned first embodiment. In addition, the vapor v contained within the pressurized fuel flowing through the pressurized fuel return pipe 18 can be swiftly drained from the vapor drain hole 64 of the horizontal pipe portion 18b of the pressurized fuel return pipe 18 (see FIG. 8). Thus, the vapor v contained within the pressurized fuel can be prevented or restrained from entering the intake filter 16. The throttle 68 formed in the vapor jet 28 of the pressurized fuel return pipe 18 limits the flow rate of pressurized fuel drained to the outside of the pressurized fuel return passage 30, whereby the decrease in the flow rate of the pressurized fuel returned into the fuel intake passage 37 (more specifically, into the intake filter 16) can be prevented or minimized. Since the throttle 66 for limiting the flow rate of pressurized fuel returned into the intake filter 16 to a predetermined fuel amount is formed in the vertical pipe portion 18c of the pressurized fuel return pipe 18, it is possible to ensure a stable flow rate of pressurized fuel. In this case, it is appropriate to increase the surplus fuel amount of pressurized fuel drained from the pressure-regulating valve 14 to the pressurized fuel return passage 30. The throttle 66 may be formed as needed or may also be dispensed with.

(Fifth Representative Embodiment)

Figure 13:
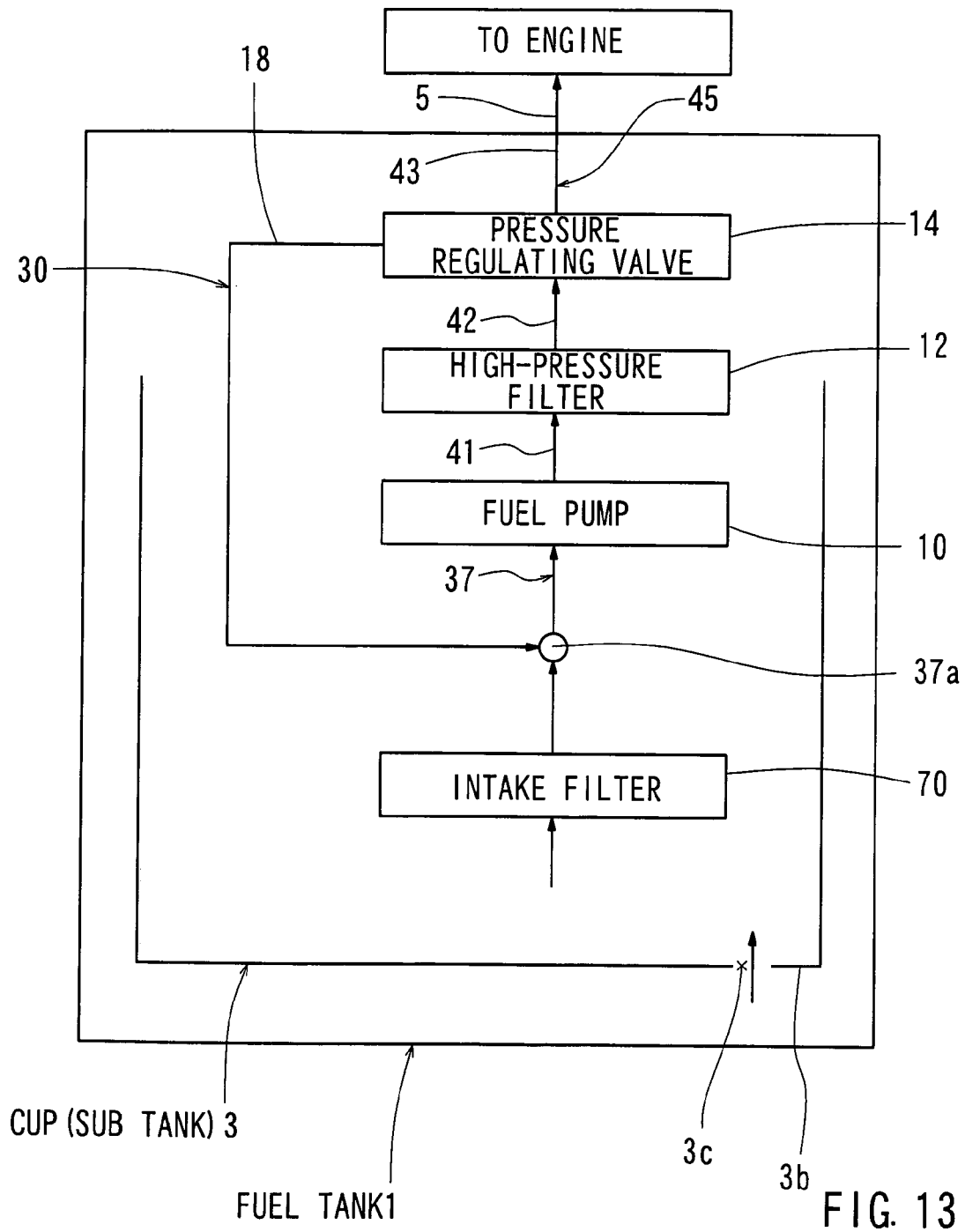
FIG. 13 is an explanatory view showing how fuel flows in a fuel supply device for a fuel returnless system according to a fifth representative embodiment of the present invention.

A fifth representative embodiment of the present invention will be described with reference to FIG. 13. This representative embodiment is obtained by modifying the aforementioned fourth representative embodiment. In this representative embodiment, as shown in FIG. 13, the vapor drain hole 64 and the throttle 66 in the aforementioned fourth representative embodiment (see FIG. 8) are dispensed with. The downstream end portion (which is not assigned a reference numeral) of the pressurized fuel return pipe 18 is joined to an intermediate point 37a of the fuel intake passage 37 extending from the interior of the intake filter 16 to the fuel pump 10. A flow passage hole 3c allowing fuel from outside of the reserve cup 3 to flow into the reserve cup 3 is formed in a bottom wall 3b of the reserve cup 3. The flow passage hole 3c may be provided as needed or may also be dispensed with.

The intake filter (which is assigned reference numeral 70) in this representative embodiment is formed with a filtering area larger than that of the high-pressure filter 12 in order to remove foreign matter that is approximately equal in size to or smaller in size than those removed by the high-pressure filter 12. In this representative embodiment, as is the case with the high-pressure filter 12, the intake filter 70 has a capture value of 95% in a foreign matter capture test and is constructed in a manner enabling the removal of foreign matter as small as 5 to 30 μm.

The fuel supply device in the fuel returnless system of this representative embodiment also makes it possible to achieve an operation and an effect similar to those of the aforementioned fourth representative embodiment. Furthermore, the intake filter 70 is formed with a filtering area larger than that of the high-pressure filter 12 in order to remove foreign matter that is approximately equal in size to or smaller in size than those removed by the high-pressure filter 12. Accordingly, the intake filter 70 can remove foreign matter from the fuel drawn into the fuel pump 10, especially foreign matters that are approximately equal in size to or smaller in size than those removed by the high-pressure filter 12. Thus, the sliding portion of the fuel pump 10 is prevented or restrained from abrasion, malfunctioning, etc. due to foreign matter contamination, prolonging the life of the fuel pump 10.

By setting the filtering area of the intake filter 70 to be larger than that of the high-pressure filter 12, the intake filter 70 is prevented or restrained from being clogged with foreign matter. A negative pressure in the intake filter 70 resulting from an intake resistance is therefore mitigated. Consequently, generation of vapor in the intake filter 70 is suppressed, and deterioration in the performance of the fuel pump 10, namely, deterioration in the discharge flow rate of fuel, can be prevented or restrained.

(Sixth Representative Embodiment)

Figure 14:
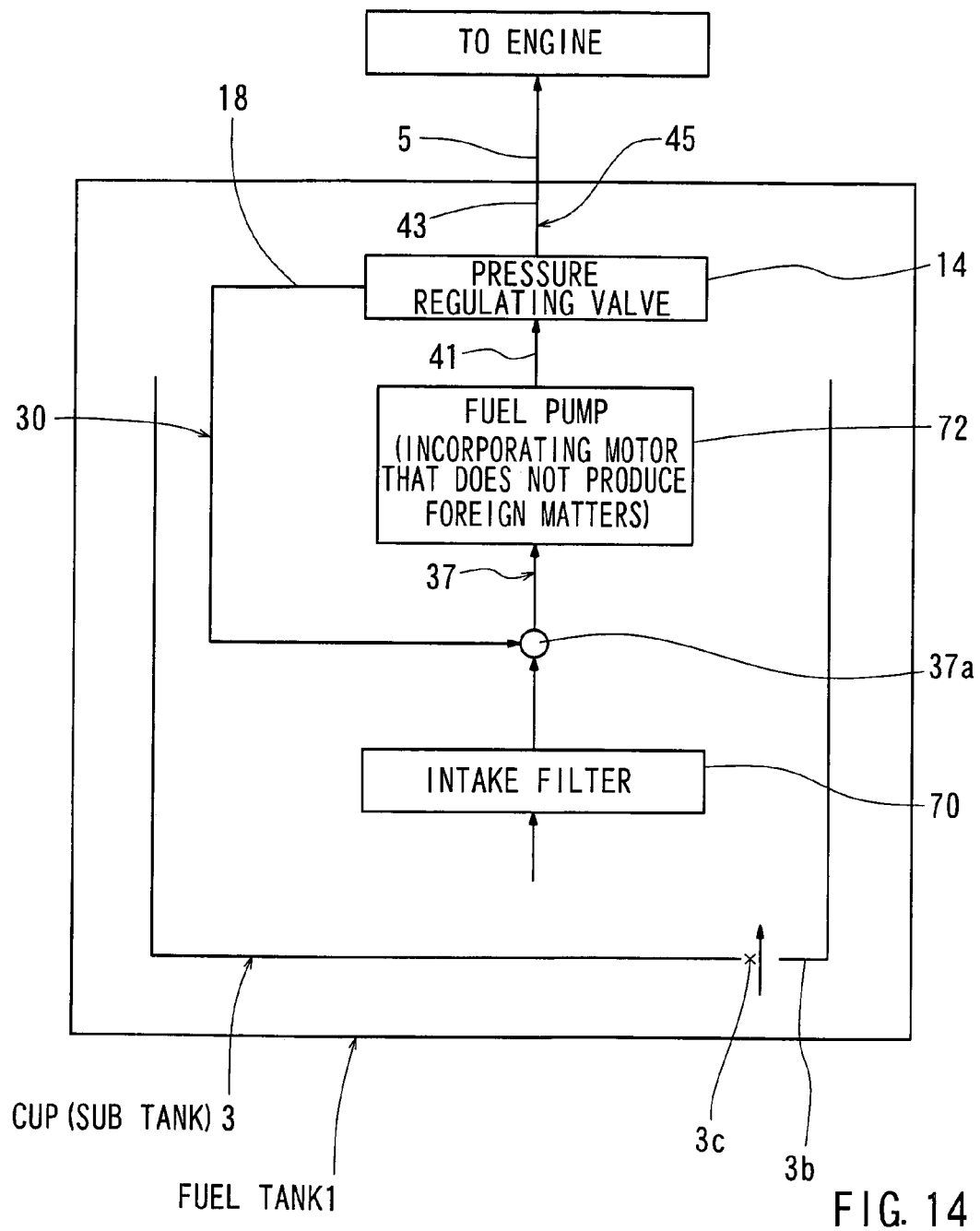
FIG. 14 is an explanatory view showing how fuel flows in a fuel supply device for a fuel returnless system according to a sixth representative embodiment of the present invention.

A sixth representative embodiment of the present invention will be described with reference to FIG. 14. This representative embodiment is obtained by modifying the aforementioned fifth representative embodiment. In this representative embodiment, as shown in FIG. 14, the high-pressure filter 12 and the second duct 42 provided in the aforementioned fifth representative embodiment (see FIG. 13) are dispensed with. The downstream end portion of the first duct 41 is connected to the pressure-regulating valve 14. Moreover, the fuel pump (which is assigned reference numeral 72) used in this representative embodiment has a motor that generates almost no foreign matter as a motor portion, for example, such as a non-contact brushless motor without brushes (not shown). As is the case with the motor portion 202 (see FIG. 12) in the aforementioned first representative embodiment, the motor portion constructed as a brushless motor for the fuel pump 72 is arranged such that the fuel discharged from the pump portion 203 flows through the motor chamber 210 of the motor portion 202. The fuel is then discharged from the pump discharge port 230. The fuel pump 72 equipped with the motor portion thus configured as a brushless motor is similar in construction to those well known in the art and thus will not be described in detail.

The fuel supply device in the fuel returnless system of this representative embodiment also makes it possible to achieve an operation and an effect similar to those of the aforementioned fifth representative embodiment. Since the motor portion of the fuel pump 72 is a non-contact brushless motor containing no brushes, almost no foreign matter is generated in the motor portion. Thus, even when the pressurized fuel discharged from the pump portion flows through the interior of the motor chamber of the motor portion, foreign matter from the motor portion can be prevented or restrained from mixing into the pressurized fuel. As a result, the life of the fuel supply device can be prolonged. Since the motor portion of the fuel pump 72 generates almost no foreign matter, the high-pressure filter 12 required downstream of the fuel pump 10 (see FIGS. 13 and 12) of the aforementioned fourth representative embodiment can be dispensed with. Consequently, the fuel supply device can be reduced in size and cost. Further, since the brushless motor of the motor portion of the fuel pump 72 can be controlled with regard to rotational speed, the discharge flow rate of the fuel can be easily regulated.

(Seventh Representative Embodiment)

Figure 15:
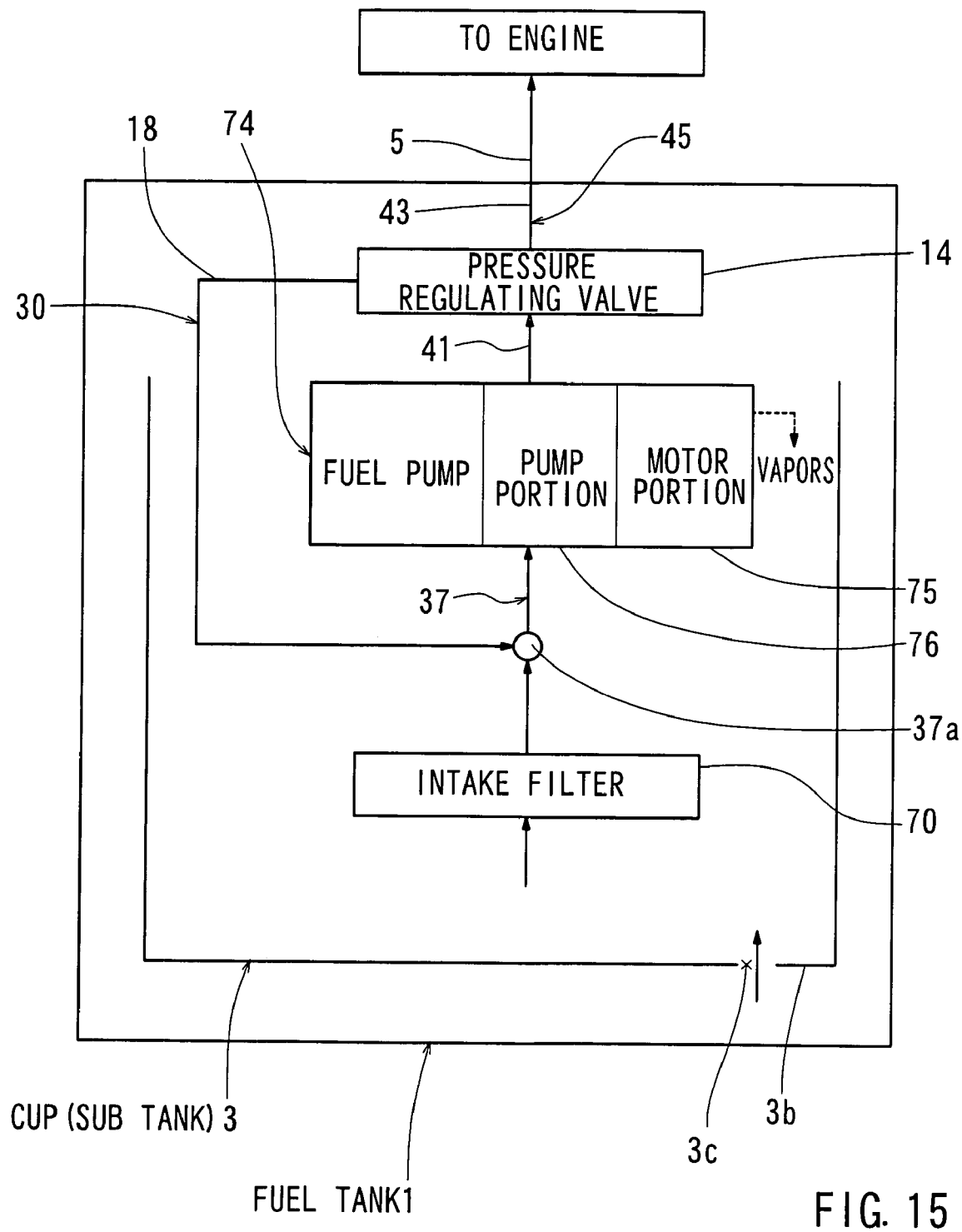
FIG. 15 is an explanatory view showing how fuel flows in a fuel supply device for a fuel returnless system according to a seventh representative embodiment of the present invention.
Figure 16:
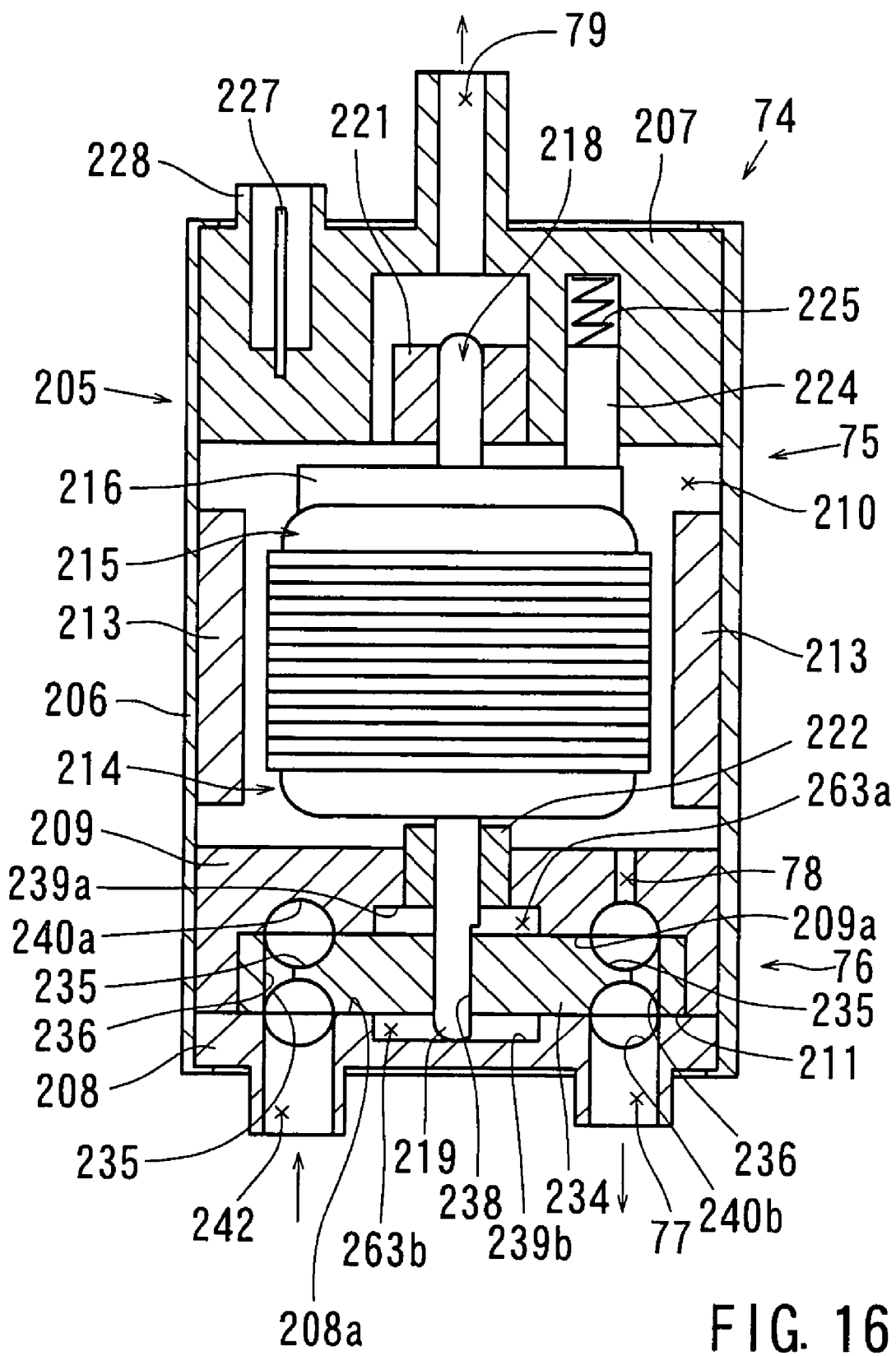
FIG. 16 is a sectional view of a fuel pump.

A seventh representative embodiment of the present invention will be described with reference to FIGS. 14, 15, and 16. This embodiment is obtained by modifying the aforementioned sixth representative embodiment. In this representative embodiment, as shown in FIG. 14, as a fuel pump in the aforementioned sixth representative embodiment (see FIG. 14), a fuel pump (which is assigned reference numeral 74) is used equipped with a pump portion (which is assigned reference numeral 76) and a motor portion (which is assigned reference numeral 75). The pump portion 76 draws fuel, pressurizes the fuel, and directly discharges it outside of the pump. The motor portion 75 drives the pump portion 76.

Since the fuel pump 74 is obtained by modifying the fuel pump 10 (see FIG. 12) described in the aforementioned first representative embodiment, portions identical to those of the fuel pump 10 are denoted by the same reference symbols and the redundancy of description may be omitted. Referring to FIG. 16 showing a fuel pump 74, a pump discharge port 77 communicating with a trailing end portion of the flow passage groove 240*b* and opening to the outside of the pump (e.g., downward as shown in FIG. 16) is formed in the pump cover 208. The first duct 41 is connected to the pump discharge port 77 (see FIG. 15). As is the case with the aforementioned sixth representative embodiment, the fuel intake passage 37 is connected to the pump intake port 242 of the pump cover 208. The vapor drain port 276 (see FIG. 12) of the pump cover 208 in the aforementioned first representative embodiment is dispensed with.

An outflow port 78 communicating with a portion between a leading end portion and a trailing end portion of the flow passage groove 240*a* and opening to the motor chamber 210 is formed in the pump housing 209. The pump discharge port 77 and the outflow port 78 are actually offset in position from each other by a predetermined amount, with respect to the circumferential direction of the impeller 234. By providing the outflow port 78 at a position corresponding to a one-fourth stroke or further from a starting end of a pumping stroke resulting from one turn of the impeller 234, vapor contained within the fuel can be effectively drained to the motor chamber 210 through the outflow port 78. The inner discharge port 245 (see FIG. 12) in the pump housing 209 in the aforementioned first representative embodiment is dispensed with. Instead of the pump discharge port 230 (see FIG. 12) in the aforementioned first representative embodiment, a drain port 79 is formed in the motor cover 207.

The operation of the aforementioned fuel pump 74 will be described next. Referring to FIG. 16, the armature 214 is rotationally driven by energizing the coil (not shown) of the armature 214 of the motor portion 75. As described above, the impeller 234 is then rotated in a predetermined direction, performing a pumping action. In accordance with this pumping action, fuel in the intake filter 70 (see FIG. 15) is drawn from the pump intake port 242 into the leading end portions of the flow passage grooves 240*a* and 240*b*. The fuel receives kinetic energy from the blade grooves 235 of both the front and back faces of the impeller 234 and is sent from the leading end portions toward the trailing end portions in both the flow passage grooves 240*a* and 240*b* while being pressurized. The fuel sent to the trailing end portions of both of the flow passage grooves 240*a* and 240*b* is discharged from the pump discharge port 77 to the first duct 41 (see FIG. 15). Vapor contained in the fuel, sent in the pumping action resulting from one turn of the impeller 234 while being pressurized, is discharged from the outflow port 78 into the motor chamber 210 of the motor portion 75, passed through the interior of the motor chamber 210, and then discharged from the drain port 79 into the fuel tank 1.

The fuel supply device in the fuel returnless system of this representative embodiment also makes it possible to achieve an operation and an effect similar to those of the aforementioned sixth representative embodiment. Furthermore, since the fuel pump 74 (see FIG. 16) is provided with a pump portion 76 that draws fuel, pressurizes the fuel, and directly discharges it to the outside of the pump, and with a motor portion 75 that drives the pump portion 76, pressurized fuel is directly discharged from the pump portion 76 to the outside of the motor, namely, to the first duct 41. Accordingly, foreign matter from the motor can be prevented from mixing into the pressurized fuel resulting from the passage of the pressurized fuel through the interior of the motor. Therefore, the life of the fuel pump 74 can be prolonged.

Since a brush-equipped motor is used as the motor portion 75, a drive circuit required for a brushless motor can be dispensed with. As a result, the motor portion 75 can be reduced in cost in comparison with the case of the brushless motor. Instead of the brush-equipped motor, a brushless motor can be used as the motor portion 75. Since this brushless motor can be controlled with respect to rotational speed, the discharge flow rate of fuel can be easily regulated.

The fuel pump 74 (see FIG. 16) is provided with the outflow port 78 through which part of the pressurized fuel flows out from the pump portion 76 into the motor portion 75. The fuel pump 74 is also provided with a drain port 79, through which pressurized fuel that has flowed into the motor portion 75 through the outflow port 78 is discharged outside of the pump. Thus, a portion of the pressurized fuel containing vapor flows out from the pump portion 76 into the motor portion 75 through the outflow port 78, and is discharged from the drain port 79 outside of the pump. Thereby, the motor portion 75 can be cooled and the sliding portion of the motor portion 75 can be lubricated.

(Eighth Representative Embodiment)

Figure 17:
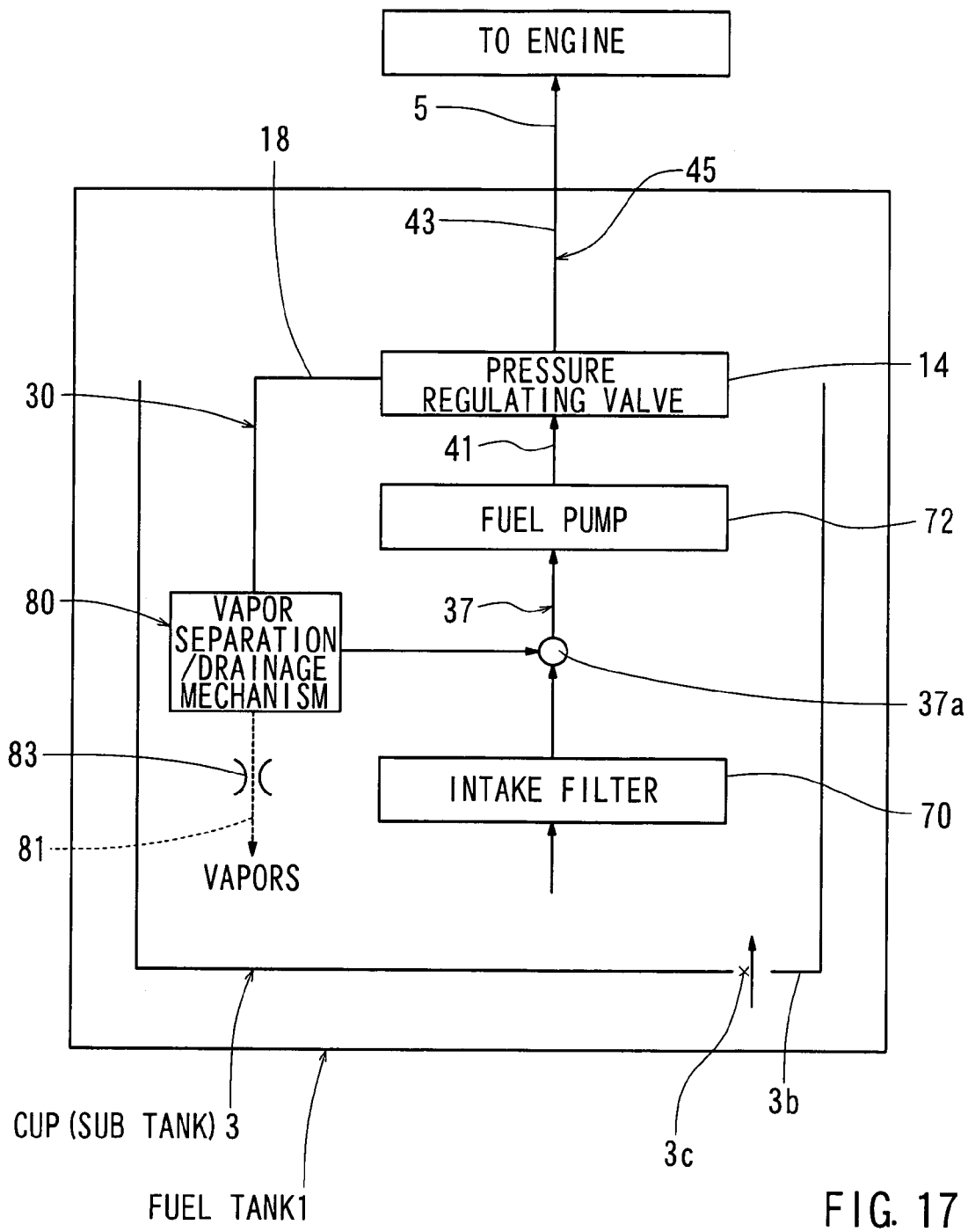
FIG. 17 is an explanatory view showing how fuel flows in a fuel supply device for a fuel returnless system according to an eighth representative embodiment of the present invention.

An eighth representative embodiment of the present invention will be described with reference to FIG. 17. This representative embodiment is obtained by modifying the aforementioned sixth representative embodiment. In this representative embodiment, as shown in FIG. 17, a vapor separation/drainage mechanism (which is assigned reference numeral 80), which separates and drains vapor contained in the pressurized fuel flowing through the pressurized fuel return passage 30 of the aforementioned sixth representative embodiment (see FIG. 14), is incorporated in a midway portion of the return passage 30. A throttle 83 for limiting the flow rate of fuel containing drained vapor to a predetermined fuel amount is formed in a vapor drain passage 81 of the vapor separation/drainage mechanism 80. The throttle 83 constitutes throttle means for limiting a flow rate of drained fuel.

The fuel supply device in the fuel returnless system of this representative embodiment also makes it possible to achieve an operation and an effect similar to those of the aforementioned sixth representative embodiment. In addition, vapor contained in the pressurized fuel flowing through the pressurized fuel return passage 30 can be separated and drained by the vapor separation/drainage mechanism 80. As a result, the vapor contained in the pressurized fuel can be prevented or restrained from entering the fuel intake passage 37. The vapor separation/drainage mechanism 80 may have any configuration as long as it performs the functions of separating and draining vapor contained within the pressurized fuel flowing through the pressurized fuel return passage 30. The throttle 83 formed in the vapor drain passage 81 of the vapor separation/drainage mechanism 80 limits the flow rate of fuel drained to the outside of the pressurized fuel return passage 30, whereby the flow rate of fuel returned to the fuel intake passage 37 can be prevented or restrained from decreasing.

(Ninth Representative Embodiment)

Figure 18:
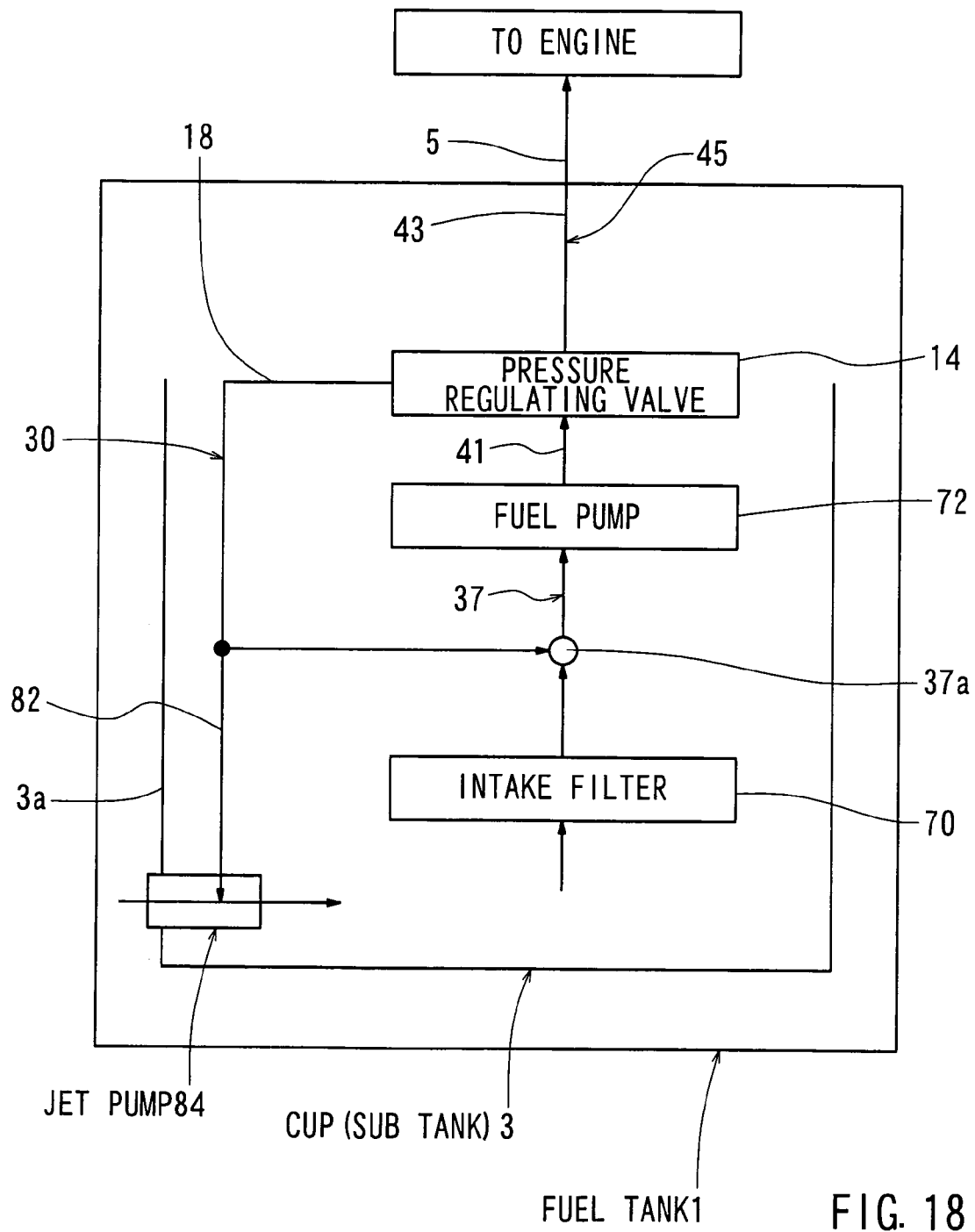
FIG. 18 is an explanatory view showing how fuel flows in a fuel supply device for a fuel returnless system according to a ninth representative embodiment of the present invention.

A ninth representative embodiment of the present invention will be described with reference to FIG. 18. This embodiment is obtained by modifying the aforementioned sixth representative embodiment. In this representative embodiment, as shown in FIG. 18, a branch passage 82 is provided in a midway portion of the pressurized fuel return passage 30 in the aforementioned sixth representative embodiment (see FIG. 14). A jet pump (which is assigned reference numeral 84) similar to that of the aforementioned third representative embodiment (see FIG. 6) is provided in a lower portion of the lateral wall 3*a* of the reserve cup 3. A downstream end portion (which is not assigned a reference numeral) of the branch passage 82 is connected to a transferred fuel introduction portion (which is not assigned a reference numeral) of the jet pump 84. Owing to the negative pressure generated in discharging pressurized fuel, which has been introduced from the pressurized fuel return passage 30 through the branch passage 82 into the reserve cup 3, the jet pump 84 draws fuel from outside of the reserve cup 3 in the fuel tank 1 and sends the fuel into the reserve cup 3. In other words, using the flow of pressurized fuel discharged from the branch passage 82 of the pressurized fuel return passage 30 as a driving source, the jet pump 84 performs the pumping action of transferring fuel from outside of the reserve cup 3 in the fuel tank 1 into the reserve cup 3. Since vapor is contained within the pressurized fuel in the pressurized fuel return passage 30, the pressurized fuel containing the vapor is drained from the branch passage 82 into the reserve cup 3 through the jet pump 84. Accordingly, the jet pump 84 is effectively providing the function of the vapor separation/drainage mechanism. Referring to FIG. 18, the flow passage hole 3*c* in the reserve cup 3 of the aforementioned sixth representative embodiment (see FIG. 14) is dispensed with.

The fuel supply device in the fuel returnless system of this representative embodiment also makes it possible to achieve an operation and an effect similar to those of the aforementioned eighth representative embodiment (see FIG. 17). Furthermore, the jet pump 84 (see FIG. 18), which uses the flow of pressurized fuel discharged from the branch passage 82 of the pressurized fuel return passage 30, can transfer fuel from outside of the reserve cup 3 in the fuel tank 1 into the reserve cup 3. Accordingly, the pressure energy of the flow of pressurized fuel discharged from the pressurized fuel return passage 30 can be efficiently utilized.

(Tenth Representative Embodiment)

Figure 19:
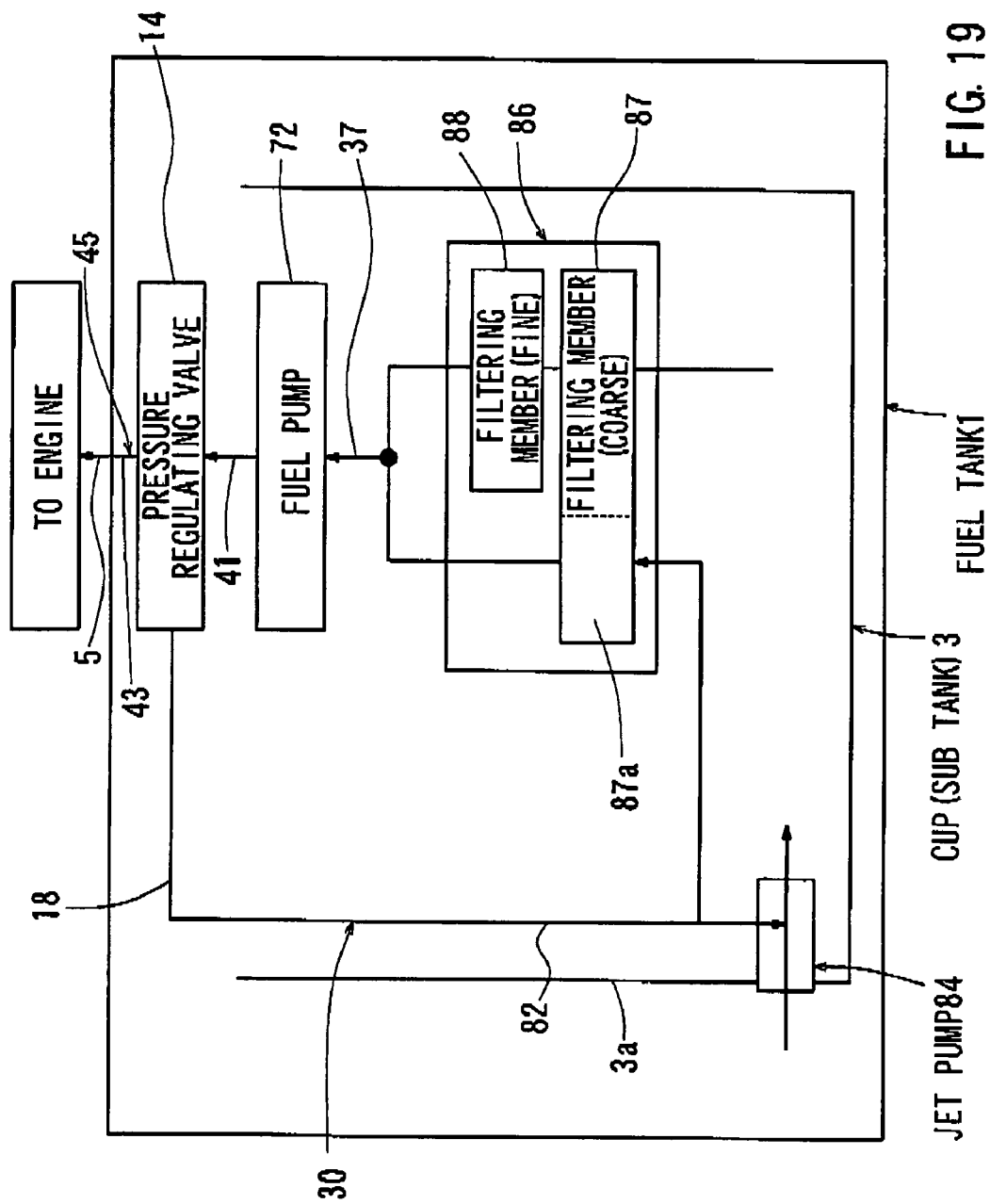
FIG. 19 is an explanatory view showing how fuel flows in a fuel supply device for a fuel returnless system according to a tenth representative embodiment of the present invention.

A tenth representative embodiment of the present invention will be described with respect to FIG. 19. This representative embodiment is obtained by modifying the aforementioned ninth representative embodiment (see FIG. 18). In this representative embodiment, as shown in FIG. 19, an intake filter (which is assigned the reference numeral 86) is provided with filtering members of a multiple layer structure (a double layer structure in this representative embodiment). In other words, the intake filter 86 has a coarse filtering member 87 on an outer layer side and a fine filtering member 88 that is superimposed inside the filtering member 87, namely, on an inner layer side. The respective filtering members 87 and 88 may be made of mesh materials, filter papers, non-woven fabrics, fibrous compacts, or the like.

Fuel in the reserve cup 3 in turn passes through the filtering member 87 on the outer layer side and the filtering member 88 on the inner layer side in this order, and then is drawn into the fuel pump 72. A downstream end portion (which is not assigned a reference numeral) of the pressurized fuel return pipe 18 abuts the filtering member 87 on the outer layer side such that pressurized fuel is discharged toward the filtering member 87. A portion in the filtering member 87 on the outer layer side, which faces the opening of the downstream end portion of the pressurized fuel return pipe 18, serves as a vapor separation filter 87a similar to that of the aforementioned first representative embodiment. The pressurized fuel that has passed through the filtering member 87 on the outer layer side is drawn into the fuel pump 72 without passing through the filtering member 88 on the inner layer side.

The fuel supply device in the fuel returnless system of this representative embodiment also makes it possible to achieve an operation and an effect similar to those of the aforementioned ninth representative embodiment (see FIG. 18). In addition, the intake filter 86 is provided with the filtering members 87 and 88 of the multiple layer structure in which the outer layer side is coarse and the inner layer side is fine. Thus, large foreign matter and small foreign matter is captured in a stepwise manner by the separate filtering members 87 and 88, whereby the filtering member 88 on the inner layer side is restrained from being clogged. As a result, the life of the intake filter 86 can be prolonged.

The vapor separation filter 87a, which is formed of part of the filtering member 87 on the outer layer side provided in the intake filter 86, allows passage of the pressurized fuel while restricting the passage of vapor contained within the pressurized fuel. As a result, the vapor contained within the pressurized fuel can be prevented or restrained from entering the fuel intake passage 37. The vapor separation filter 87a is formed by utilizing part of the filtering member 87 on the outer layer side of the intake filter 86. Therefore, in comparison with a case in which a separate vapor separation filter is provided, the number of components can be reduced and the fuel supply device can be reduced in size. By utilizing part of the filtering member 87 on the outer layer side of the intake filter 86 as the vapor separation filter 87a and causing the fuel pump 72 to draw pressurized fuel that has passed through the filtering member 87 on the outer layer side, the pressure loss of the pressurized fuel is minimized in comparison with a case in which the filtering member 88 on the inner layer side is utilized. Consequently, the vapor separation filter 87a can be prevented or restrained from being clogged with vapor. The pressurized fuel discharged from the pressurized fuel return passage 30 can also be made to pass through both the filtering member 87 on the outer layer side and the filtering member 88 on the inner layer side or only through the filtering member 88 on the inner layer side. It is not absolutely required that the filtering members 87 and 88 of the multiple layer structure have the double layer structure. The filtering members 87 and 88 may have a filtering member 17 of three or more layers that are coarse on the outer layer side and fine on the inner layer side.

(Eleventh Representative Embodiment)

Figure 20:
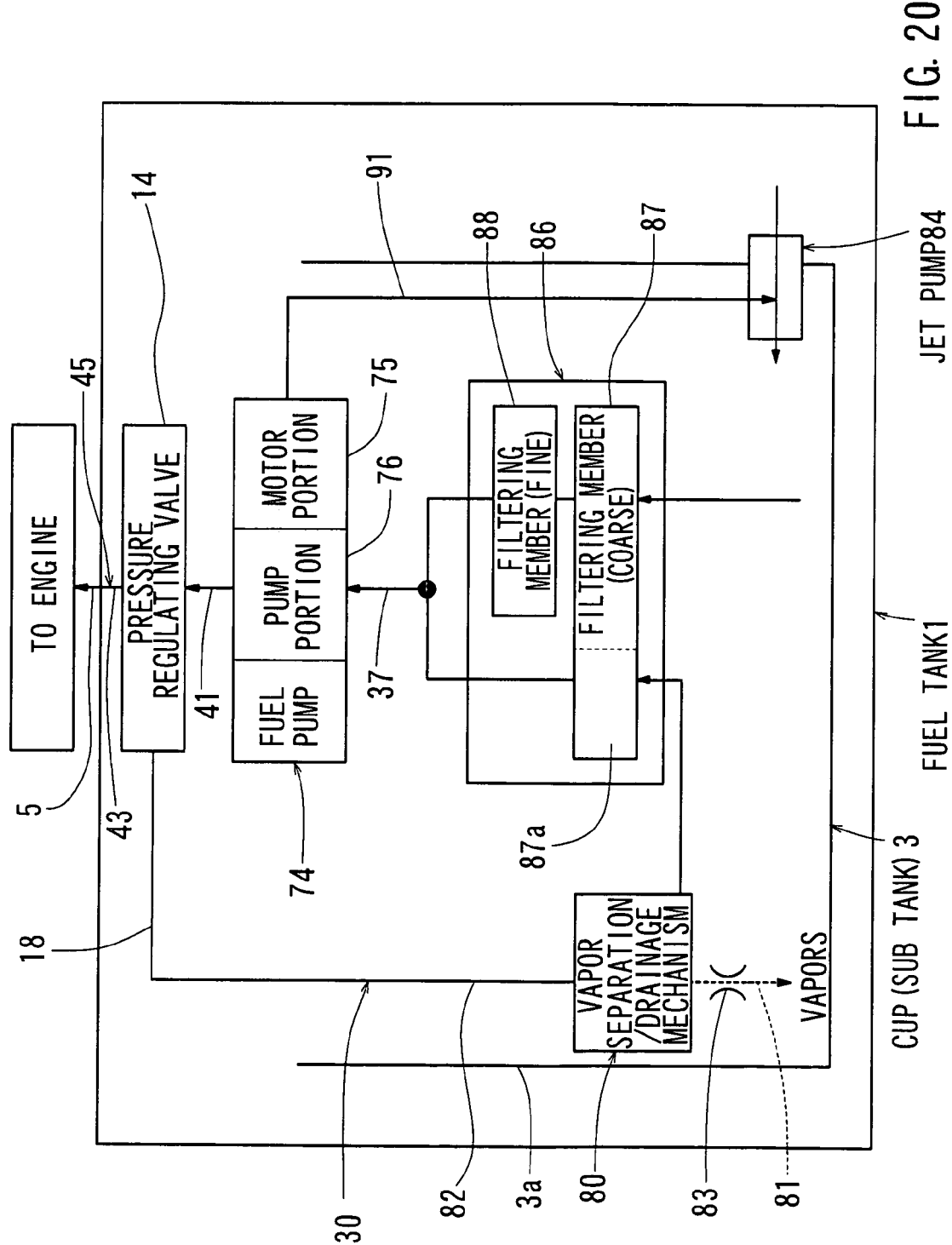
FIG. 20 is an explanatory view showing how fuel flows in a fuel supply device for a fuel returnless system according to an eleventh representative embodiment of the present invention.

An eleventh representative embodiment of the present invention will be described with reference to FIG. 20. This embodiment is obtained by modifying the aforementioned tenth representative embodiment (see FIG. 19). In this representative embodiment, as shown in FIG. 20, as is the case with the aforementioned eighth representative embodiment (see FIG. 17), a vapor separation/drainage mechanism 80, which separates and drains vapor contained in the pressurized fuel flowing through the pressurized fuel return passage 30, is incorporated in a midway portion of the return passage 30. As a result, the vapor contained within the pressurized fuel flowing through the pressurized fuel return passage 30 can be separated and drained by the vapor separation/drainage mechanism 80.

As is the case with the aforementioned eighth representative embodiment (see FIG. 17), a throttle 83, for limiting the flow rate of fuel containing drained vapor to a predetermined fuel amount, is formed in a vapor drain passage 81 of the vapor separation/drainage mechanism 80.

Furthermore, a lower portion of the lateral wall 3a of the reserve cup 3 is provided with a jet pump 84 similar to that of the aforementioned tenth representative embodiment (see FIG. 19). Referring to FIG. 20, the jet pump 84 is located in the lateral wall 3a on the right side.

As a fuel pump of this representative embodiment, the fuel pump 74 in the aforementioned seventh representative embodiment (see FIGS. 15 and 16) is used instead of the fuel pump 72. The fuel pump 74 is disposed in the same manner as in the case of the aforementioned seventh representative embodiment. Therefore, one end portion of a drainpipe 91 is connected to a drain port 79 (see FIG. 16) of the fuel pump 74. The other end portion of the drainpipe 91 is connected to a transferred fuel introduction portion (which is not assigned a reference numeral) of the jet pump 84. Owing to the negative pressure generated in discharging the pressurized fuel introduced through the drainpipe 91 into the reserve cup 3, the jet pump 84 draws fuel outside the reserve cup 3 in the fuel tank 1 and sends it into the reserve cup 3. In other words, using a flow of pressurized fuel discharged from the drain port 79 (see FIG. 16) of the fuel pump 74 as a driving source, the jet pump 84 performs a pumping action of transferring fuel from outside of the reserve cup 3 in the fuel tank 1 into the reserve cup 3. Since the pressurized fuel discharged from the drain port 79 of the fuel pump 74 contains vapor, the pressurized fuel containing the vapor is drained from the drainpipe 91 into the reserve cup 3 through the jet pump 84.

The fuel supply device in the fuel returnless system of this representative embodiment also makes it possible to achieve an operation and an effect similar to those of the aforementioned tenth representative embodiment (see FIG. 19). Furthermore, the jet pump 84, which uses the flow of pressurized fuel discharged from the drain port 79 (see FIG. 16) of the fuel pump 74 as a driving source, can transfer fuel from outside of the reserve cup 3 in the fuel tank 1 into the reserve cup 3. Accordingly, the pressure energy of the flow of pressurized fuel discharged from the drain port 79 of the fuel pump 74 can be efficiently utilized. The throttle 83 formed in the vapor drain passage 81 of the vapor separation/drainage mechanism 80 limits the flow rate of fuel drained outside of the pressurized fuel return passage 30, whereby the flow rate of fuel returned into the fuel intake passage 37 can be prevented or restrained from decreasing.

(Twelfth Representative Embodiment)

Figure 21:
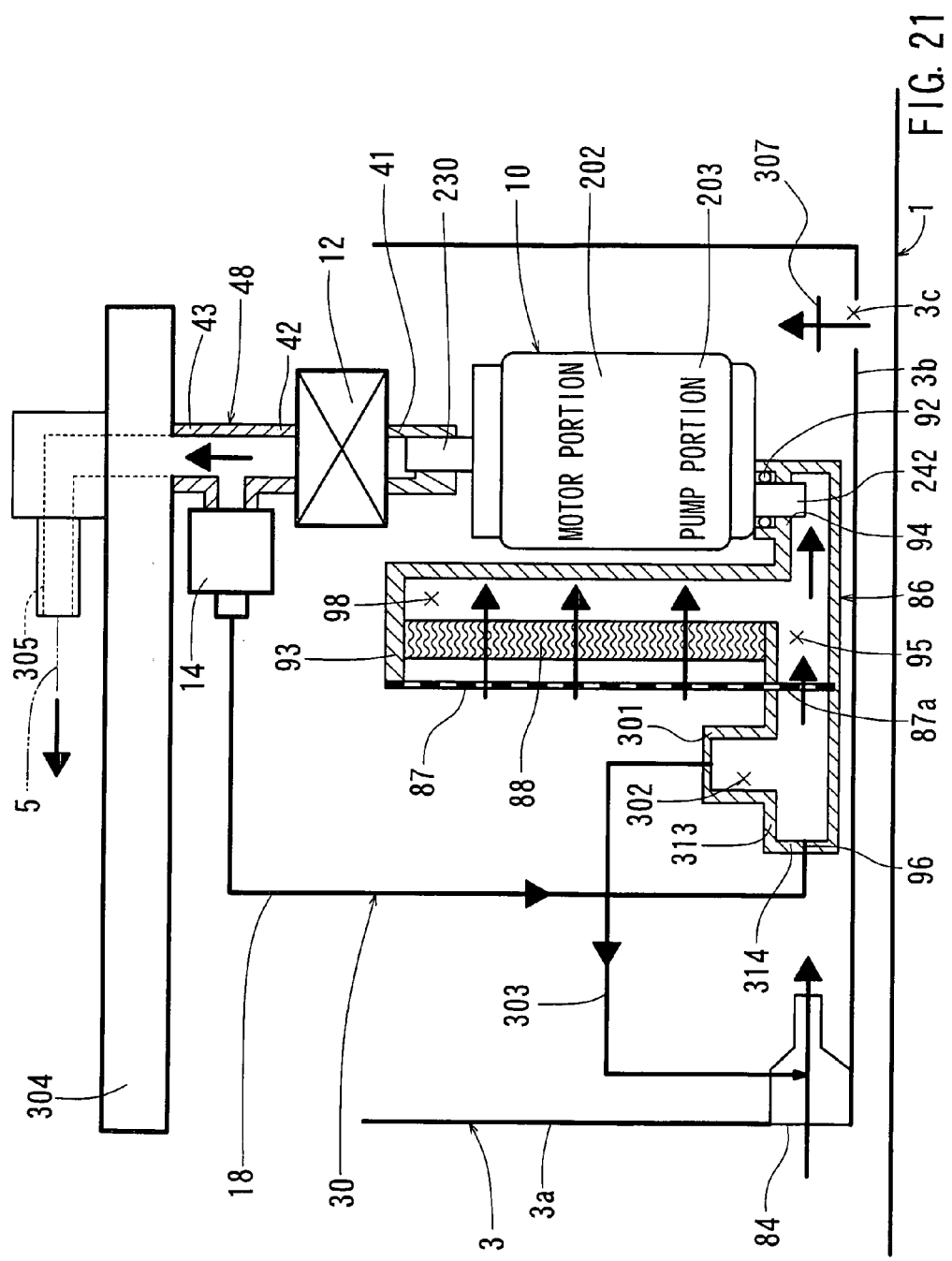
FIG. 21 is a schematic view showing a fuel supply device for a fuel returnless system according to a twelfth representative embodiment of the present invention.

A twelfth representative embodiment of the present invention will be described with reference to FIG. 21. This representative embodiment is obtained by modifying the aforementioned fifth representative embodiment (see FIG. 13). In this representative embodiment, as shown in FIG. 21, the intake filter 86 in the aforementioned tenth representative embodiment (see FIG. 19) is used instead of the intake filter 70 of the aforementioned fifth representative embodiment (see FIG. 13). The intake filter 86 is provided with a filter case 93. A pressurized fuel introduction passage 95 is formed in the filter case 93. An intake-side connection port 94 is connectible in a sealed state to the pump intake port 242 (see FIG. 12, more specifically, the tubular portion forming the pump intake port 242) of the fuel pump 10 by means of a faucet joint composed of a socket and a spigot. The intake-side connection port 94 is formed in one end portion (a right end portion in FIG. 21) of an upper wall portion 313 of the pressurized fuel introduction passage 95.

Furthermore, an annular groove (which is not assigned a reference numeral) is formed in an upper end portion of the intake-side connection port 94 of the pressurized fuel introduction passage 95. A sealing member 92 is configured as an O-ring for radially elastically sealing a gap between the pump intake port 242 of the fuel pump 10 and the intake-side connection port 94 of the pressurized fuel introduction passage 95. The sealing member 92 is fitted in the annular groove.

A pressurized fuel inflow port 96 is formed in a lateral wall 314 of the other end portion (a left end portion in FIG. 21) of the pressurized fuel introduction passage 95. The downstream end portion of the pressurized fuel return pipe 18 is connected to the pressurized fuel inflow port 96. A filter chamber 98 is formed in the filter case 93 and is laterally opened above the upper wall portion 313 of the pressurized fuel introduction passage 95 so as to communicate between the inner lower end portion of the filter chamber 98 and a downstream portion of the pressurized fuel introduction passage 95.

A lateral opening of the filter chamber 98 is closed by a coarse filtering member 87 on the outer layer side and the fine filtering member 88 that is superimposed inside the filtering member 87, namely, on the inner layer side at a predetermined distance from the filtering member 87. The lower end portion of the filtering member 87 on the outer layer side serves as the vapor separation filter 87a that divides the pressurized fuel introduction passage 95 into an upstream portion and a downstream portion. A gas-liquid separation housing portion 301 defining an expansion chamber 302 with an increased passage cross section is formed in the filter case 93 in a region forming an upstream portion of the pressurized fuel introduction passage 95. A vapor drain hole (which is not assigned a reference numeral) is formed in an upper wall portion of the gas-liquid separation housing 301. One end portion of a vapor drainpipe 303 is connected to the vapor drain hole.

The jet pump 84, similar to that of the aforementioned ninth representative embodiment (see FIG. 18), is provided in the lower portion of the lateral wall 3a of the reserve cup 3. The other end portion of the vapor drainpipe 303 is connected to the transferred fuel introduction portion of the jet pump 84. Owing to the negative pressure generated in discharging pressurized fuel introduced through the vapor drain pipe 303 into the reserve cup 3, the jet pump 84 draws fuel from outside of the reserve cup 3 in the fuel tank 1 and sends it into the reserve cup 3. In other words, using a flow of pressurized fuel containing vapors discharged from the vapor drain hole of the gas-liquid separation housing portion 301 as a drive source, the jet pump 84 performs a pumping action of transferring fuel outside the reserve cup 3 in the fuel tank 1 into the reserve cup 3.

The second duct 42 and the third duct 43 communicate with a successive duct (which is assigned the reference numeral 48), and the pressure-regulating valve 14 is incorporated in a midway portion of the duct 48. The fuel tank 1 is provided with a set plate 304, which closes an upper opening (not shown) of the fuel tank 1 and has a communication pipe 305 establishing communication between the third duct 43 and the fuel supply passage 5. The set plate 304 may be also provided in the fuel supply devices of the aforementioned representative embodiment.

The bottom wall 3b of the reserve cup 3 is provided with a one-way valve 307 configured as a check valve for opening and closing the flow passage hole 3c. The one-way valve 307 opens to allow fuel to flow from outside of the reserve cup 3 into the reserve cup 3 through the flow passage hole 3c. The one-way valve 307 closes to prevent fuel from flowing from inside of the reserve cup 3 into the fuel tank 1 through the flow passage hole 3c.

In the fuel supply device (see FIG. 21) of the aforementioned fuel returnless system, when the fuel pump 10 is driven the fuel in the reserve cup 3 is filtered by sequentially passing the fuel through the filtering member 87 on the outer layer side of the intake filter 86 and the filtering member 88 on the inner layer side of the intake filter 86. The fuel is then drawn into the fuel pump 10 from the filter chamber 98 through a downstream portion of the pressurized fuel introduction passage 95, so as to be pressurized and discharged into the high-pressure filter 12 through the first duct 41. Fuel that has been filtered by passing through the high-pressure filter 12 is discharged to the fuel supply passage 5 outside of the fuel tank 1 through the duct 48 and the communication pipe 305 of the set plate 304.

The pressure regulating valve 14 regulates the pressure of the pressurized fuel, whereby a surplus of pressurized fuel is discharged from the pressurized fuel return pipe 18 into the expansion chamber 302 in the pressurized fuel introduction passage 95 in the gas-liquid separation housing portion 301 of the intake filter 86. In the expansion chamber 302, pressurized fuel containing most of the vapor is separated into an upper layer portion of the expansion chamber 302. Fuel containing almost no vapor is separated into a lower layer portion of the expansion chamber 302.

The fuel containing almost no vapor, which has been separated into the lower layer portion of the expansion chamber 302, flows out from the upstream portion of the pressurized fuel introduction portion 95 to the downstream portion through the vapor separation filter 87a, and is again drawn by the fuel pump 10. The fuel containing most of the vapor, which has been separated into the upper layer portion of the expansion chamber 302, is introduced to the jet pump 84 through the vapor drainpipe 303. Owing to the negative pressure generated in discharging the introduced pressurized fuel into the reserve cup 3, the jet pump 84 draws fuel from outside of the reserve cup 3 in the fuel tank 1 and sends the fuel into the reserve cup 3.

The fuel supply device in the fuel returnless system of this representative embodiment also makes it possible to achieve an operation and an effect similar to those of the aforementioned fifth representative embodiment (see FIG. 13). In addition, the intake filter 86 makes it possible to achieve an operation and an effect similar to those of the aforementioned tenth representative embodiment (see FIG. 19). The gas-liquid separation housing portion 301 provided in the filter case 93 of the intake filter 86 makes it possible to achieve an operation and an effect similar to those of the aforementioned first representative embodiment (see FIG. 1). Since the filter case 93 of the intake filter 86 is provided with the gas-liquid separation housing portion 301, the fuel supply device can be compactly configured.

Since the jet pump 84 is provided (which uses a flow of pressurized fuel containing vapor discharged from the vapor drain hole of the gas-liquid separation housing portion 301 of the filter case 93 as a drive source), an operation and an effect similar to those of the aforementioned ninth representative embodiment (see FIG. 18) can be achieved.

The intake filter 86 is provided with the pressurized fuel introduction passage 95 that introduces pressurized fuel from the pressurized fuel inflow port 96 to a region close to the pump intake port 242 (see FIG. 12) of the fuel pump 10. Thus, pressurized fuel is introduced to the region close to the pump intake port 242 of the fuel pump 10, whereby the pressure in the region close to the pump intake port 242 increases. Therefore, the generation of vapor due to negative pressure generated in the intake filter 86 can be prevented or minimized.

The sealing member 92 is interposed between the pump intake port 242 of the fuel pump 10 and the intake-side connection port 94 of the pressurized fuel introduction passage 95 connected to the intake port 242. Thus, fuel can be prevented or restrained from leaking from a connecting portion between the pump intake port 242 of the fuel pump 10 and the intake-side connection port 94 of the pressurized fuel introduction passage 95.

(Thirteenth Representative Embodiment)

Figure 22:
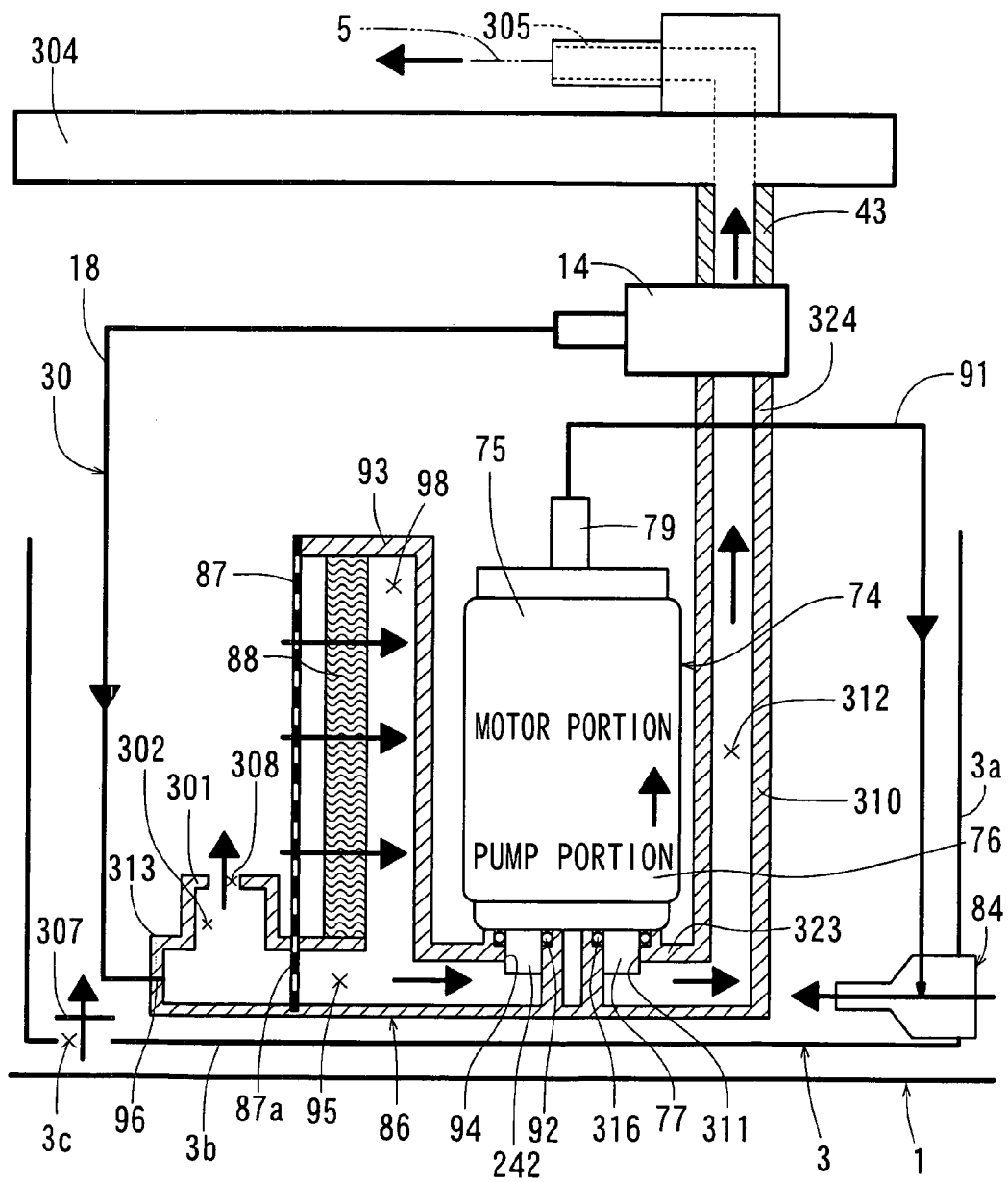
FIG. 22 is a schematic view showing a fuel supply device for a fuel returnless system according to a thirteenth representative embodiment of the present invention.

A thirteenth representative embodiment of the present invention will be described with reference to FIG. 22. This representative embodiment is obtained by modifying the aforementioned twelfth representative embodiment (see FIG. 21). In this representative embodiment, as shown in FIG. 22, the vapor drainpipe 303 in the aforementioned twelfth representative embodiment (see FIG. 21) is dispensed with. As a result, fuel containing a large amount of vapor separated in the expansion chamber 302 of the gas-liquid separation housing 301 of the intake filter 86 is drained from a vapor drain hole (which is assigned the reference numeral 308) into the reserve cup 3. In addition, the high-pressure filter 12, the first duct 41, and the second duct 42, in the aforementioned twelfth representative embodiment (see FIG. 21) are dispensed with.

The lower portion of the lateral wall 3*a* of the reserve cup 3 is provided with the jet pump 84 similar to that of the aforementioned twelfth embodiment (see FIG. 21). The jet pump 84 is located in the lateral wall 3*a* on the right side in FIG. 22.

As a fuel pump of this representative embodiment, the fuel pump 74 in the aforementioned seventh representative embodiment (see FIGS. 15 and 16) is used instead of the fuel pump 10. The fuel pump 74 is disposed in the same manner as in the case of the aforementioned seventh representative embodiment. Consequently, as is the case with the aforementioned eleventh representative embodiment (see FIG. 20), one end portion of the drainpipe 91 is connected to the drain port 79 of the fuel pump 74 (see FIG. 16). The other end portion of the drainpipe 91 is connected to the transferred fuel introduction portion (which is not assigned a reference numeral) of the jet pump 84. As is the case with the aforementioned eleventh representative embodiment (see FIG. 20), owing to a negative pressure generated in discharging the pressurized fuel introduced through the drain pipe 91 into the reserve cup 3, the jet pump 84 draws fuel from outside of the reserve cup 3 in the fuel tank 1 and sends the fuel into the reserve cup 3.

A generally L-shaped pressurized fuel lead-out pipe portion 310 is formed in the filter case 93. A discharge-side connection port 311 is connectible in a sealed state to the pump discharge port 77 (see FIG. 12, more specifically, a tubular portion forming the pump discharge port 77) of the fuel pump 74 by means of a faucet joint composed of a socket and a spigot. The connecting portion 311 is formed in an upper wall portion 323 in a lower portion of the pressurized fuel lead-out pipe portion 310. The pressurized fuel lead-out pipe portion 310 extends upwards along the fuel pump 74. A lead-out port 324, formed in an upper end portion of the fuel pump 74, is connected to the pressure-regulating valve 14. An interior of the pressurized fuel lead-out pipe portion 310 serves as a pressurized fuel lead-out passage 312, which is a pressurized fuel flow passage that introduces pressurized fuel discharged from the pump discharge port 77 of the fuel pump 74 to a predetermined region, namely, the pressure regulating valve 14.

An annular groove (which is not assigned a reference numeral) is formed in an upper end portion of the discharge-side connection port 311 of the pressurized fuel lead-out passage 312. A sealing member 316 is configured as an O-ring and is fitted in the annular groove for radially elastically sealing a gap between the pump discharge port 77 of the fuel pump 74 and the discharge-side connection port 311 of the pressurized fuel lead-out passage 312.

The fuel supply device in the fuel returnless system of this representative embodiment also makes it possible to achieve an operation and an effect similar to those of the aforementioned twelfth representative embodiment (see FIG. 21). In addition, since a jet pump 84 is provided that uses the flow of pressurized fuel containing vapor discharged from the drain port 79 of the fuel pump 74 as a driving source, an operation and an effect similar to those of the aforementioned eleventh representative embodiment (see FIG. 20) can be achieved.

The intake filter 86 is provided with a pressurized fuel lead-out passage 312, which is connectible to the pump discharge port 77 of the fuel pump 74 and introduces fuel discharged from the pump discharge port 77 to the pressure-regulating valve 14 as a predetermined region. Consequently, piping for connection to the pump discharge port 77 of the fuel pump 74 can be dispensed with. As a result, the number of components can be reduced and the fuel supply device can be reduced in size.

The sealing member 316 is interposed between the pump intake port 77 of the fuel pump 74 and the intake-side connection port 311 of the pressurized fuel lead-out passage 312 connected to the intake port 77. Therefore, fuel can be prevented or restrained from leaking from a connecting portion between the pump intake port 77 of the fuel pump 74 and the intake-side connection port 311 of the pressurized fuel lead-out passage 312.

(Fourteenth Representative Embodiment)

Figure 23:
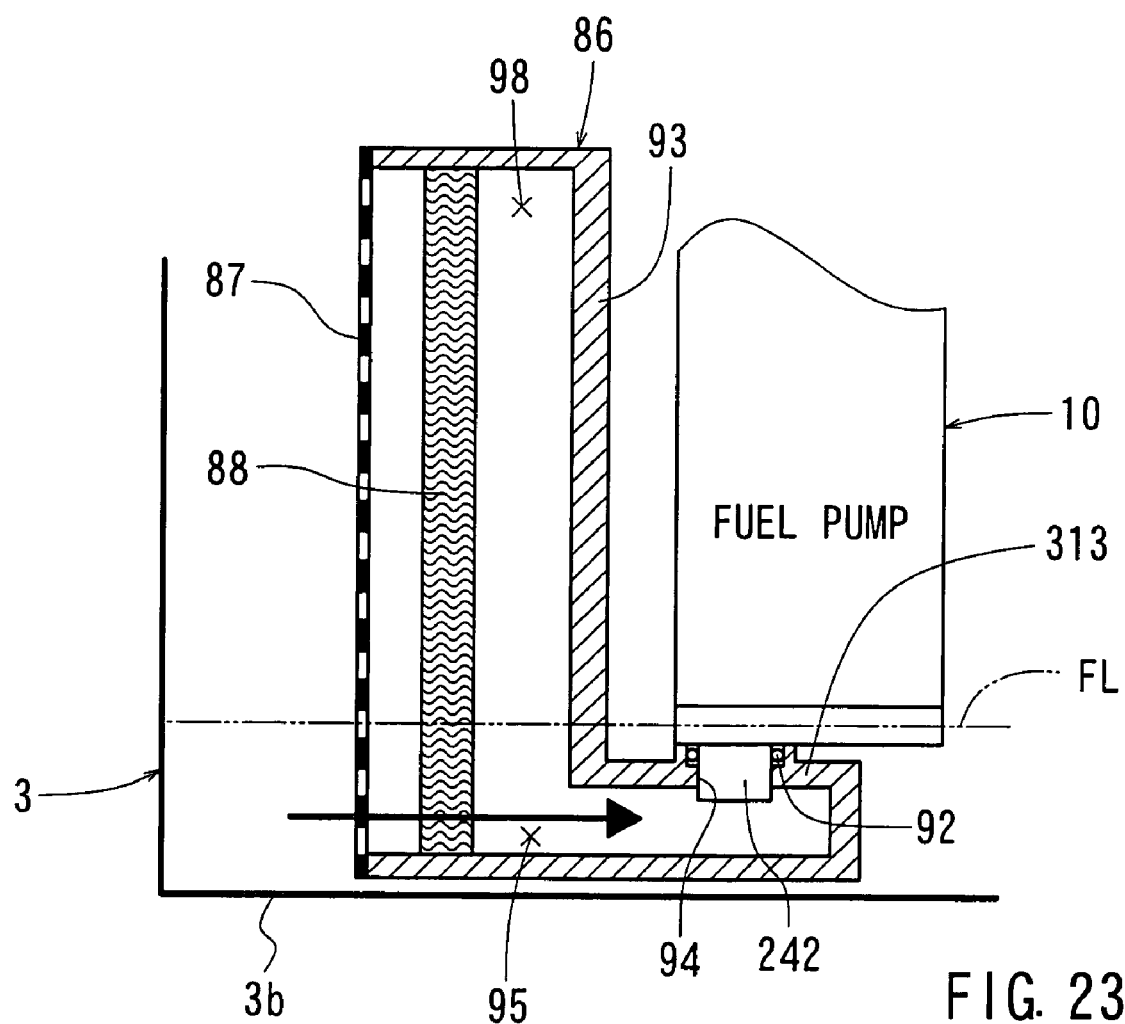
FIG. 23 is an explanatory view showing an intake filter according to a fourteenth representative embodiment of the present invention.

A fourteenth representative embodiment of the present invention will be described with reference to FIG. 23. This embodiment is obtained by modifying the intake filter 86 of the aforementioned twelfth representative embodiment (see FIG. 21). In this representative embodiment, as shown in FIG. 23, the filter chamber 98 in the filter case 93 of the intake filter 86 is extended to a region close to the bottom wall 3*b* of the reserve cup 3. The filter chamber 98 communicates with the interior of the reserve cup 3 below the pump intake port 242 (see FIG. 12) of the fuel pump 10.

Therefore, even in the event that a level FL of fuel in the reserve cup 3 has been lowered, the fuel can still be effectively drawn. Consequently, the amount of remaining fuel can be reduced.

(Fifteenth Representative Embodiment)

Figure 24:
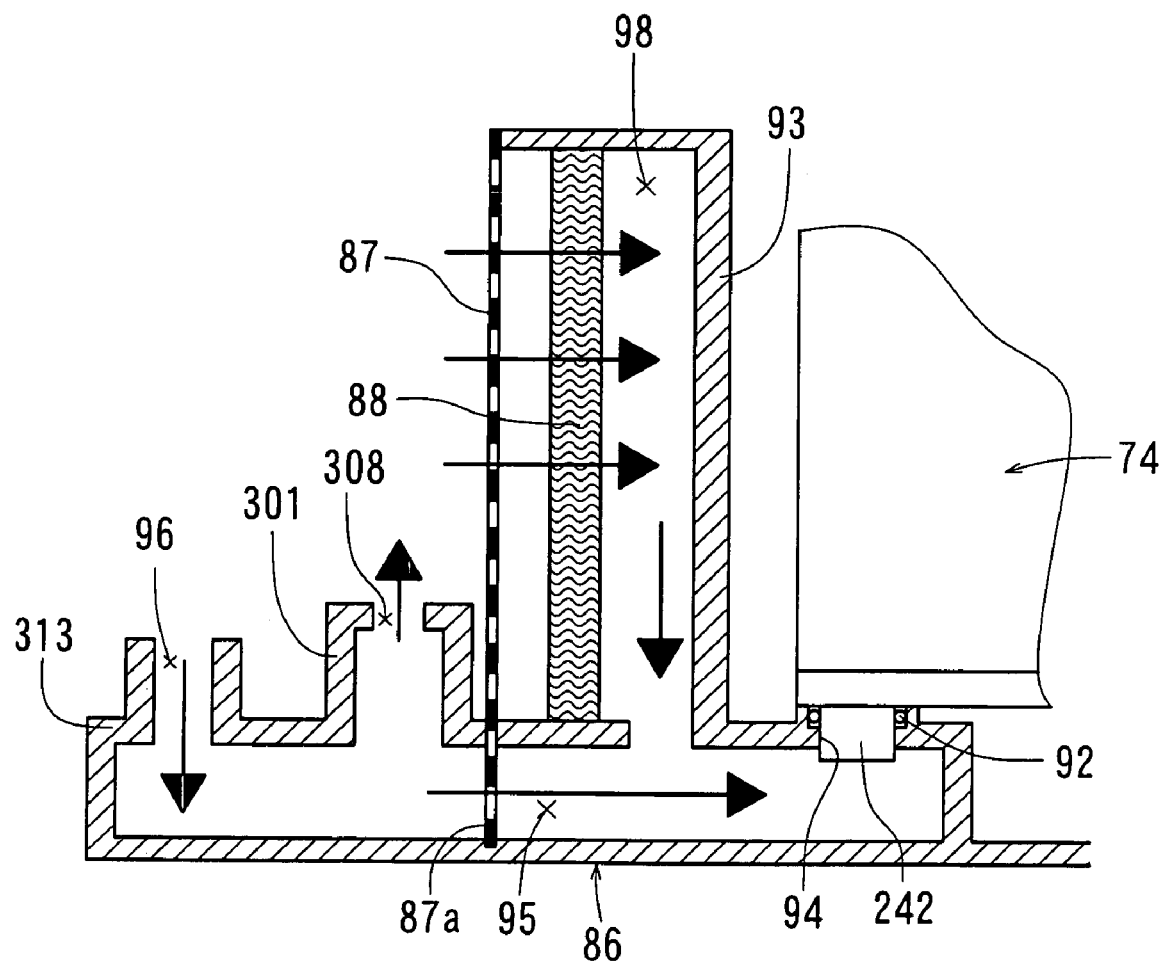
FIG. 24 is an explanatory view showing an intake filter according to a fifteenth representative embodiment of the present invention.

A fifteenth representative embodiment of the present invention will be described with reference to FIG. 24. This representative embodiment is obtained by modifying the intake filter 86 of the aforementioned thirteenth representative embodiment (see FIG. 22). In this representative embodiment, as shown in FIG. 24, the pressurized fuel inflow port 96 in the filter case 93 of the intake filter 86 is formed in the upper wall portion 313 of the pressurized fuel introduction passage 95. The pressurized fuel inflow port 96 is therefore set at approximately the same level as the connecting portion of the pump intake port 242 (see FIG. 16) of the fuel pump 74.

With this construction, due to the pressurized fuel introduced from the pressurized fuel inflow port 96 of the intake filter 86 into the pressurized fuel introduction passage 95, the pressure of fuel in the vicinity of the pump intake port 242 of the fuel pump 74 is increased. The effect of suppressing the generation of a negative pressure in the intake filter 86 is enhanced, suppressing the generation of vapor. Also, pressurized fuel can be prevented or restrained from flowing backwards and can preferentially flow into the pump intake port 242 of the fuel pump 74.

(Sixteenth Representative Embodiment)

Figure 25:
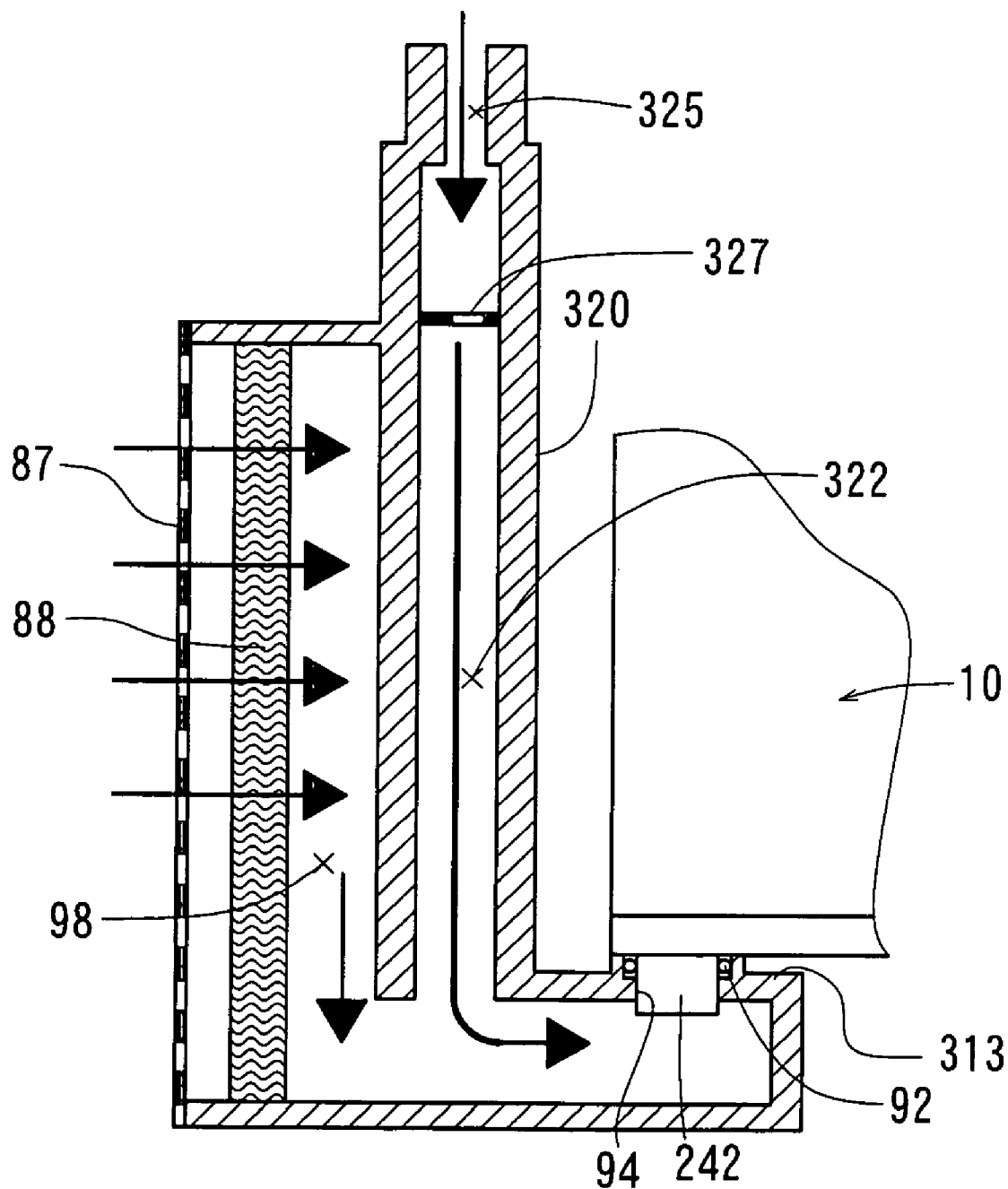
FIG. 25 is an explanatory view showing an intake filter according to a sixteenth representative embodiment of the present invention.

A sixteenth representative embodiment of the present invention will be described with reference to FIG. 25. This representative embodiment is obtained by modifying the intake filter 86 of the aforementioned fourteenth representative embodiment (see FIG. 23). In this representative embodiment, as shown in FIG. 25, the filter case 93 of the intake filter 86 is provided with a pressurized fuel introduction pipe portion 320 that extends longitudinally and is installed adjacent to the fuel pump 10. The interior of the pressurized fuel introduction pipe portion 320 serves as a pressurized fuel introduction passage 322. An upper end portion of the pressurized fuel introduction passage 322 has a pressurized fuel inflow port 325. A lower end portion of the pressurized fuel introduction passage 322 communicates with a lower end portion of the filter chamber 98 in the vicinity of the pump intake port 242 (see FIG. 12) of the fuel pump 10. The pressurized fuel introduction passage 322 serves as a pressurized fuel flow passage, which introduces pressurized fuel returned through the pressurized fuel return passage 30 to a predetermined region, namely, a region close to the pump intake port 242 of the fuel pump 10. A vapor separation filter 327 that filters pressurized fuel is provided in an upstream portion of the pressurized fuel introduction passage 322, namely, in the region close to an upper face portion of the filter case 93.

With this construction, due to pressurized fuel introduced from the pressurized fuel inflow port 325 of the intake filter 86 into the pressurized fuel introduction passage 322, the pressure of the fuel in the vicinity of the pump intake port 242 of the fuel pump 10 is increased. Thus, the effect of suppressing generation of a negative pressure in the intake filter 86 is enhanced; suppressing the generation of vapor. Also, the pressurized fuel can be prevented or restrained from flowing backwards and can preferentially flow into the pump intake port 242 of the fuel pump 10.

(Seventeenth Representative Embodiment)

Figure 26:
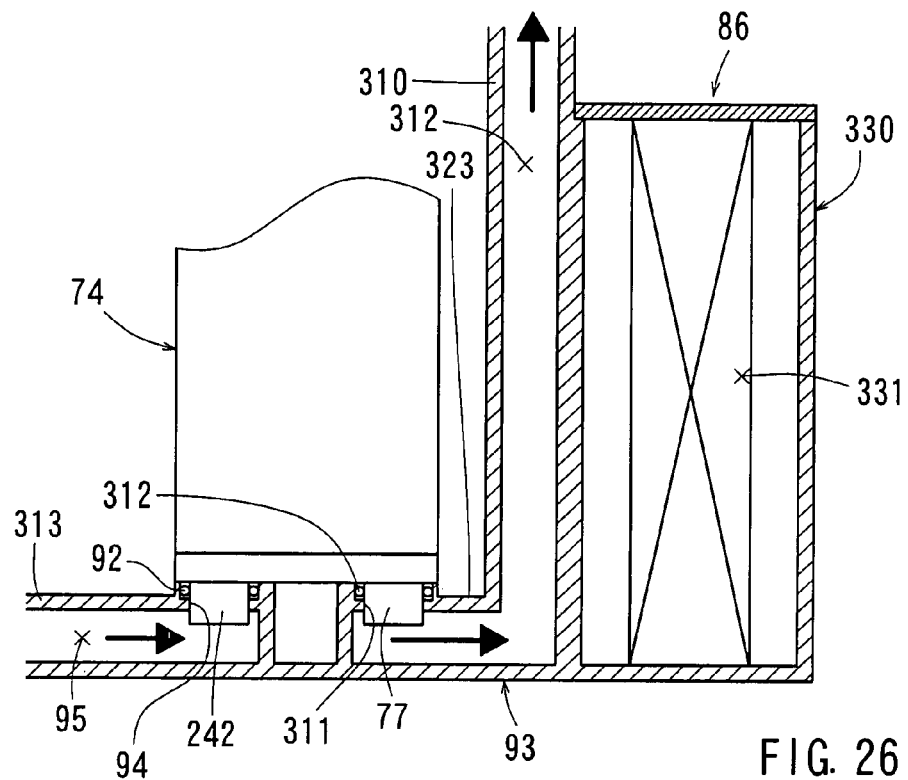
FIG. 26 is an explanatory view showing an intake filter according to a seventeenth representative embodiment of the present invention.

A seventeenth representative embodiment of the present invention will be described with reference to FIG. 26. This embodiment is obtained by modifying the intake filter 86 of the aforementioned thirteenth representative embodiment (see FIG. 22). In this representative embodiment, as shown in FIG. 26, a case body 330, having a filter chamber 331 surrounding an outside of the pressurized fuel lead-out portion 310, is formed in the filter case 93 of the intake filter 86 in the aforementioned thirteenth representative embodiment (see FIG. 22). The case body 330 assumes, for example, a generally cylindrical shape or a C-like tubular shape. The fuel pump 74 is inserted into a hollow portion formed by the case body 330. As is the case with the aforementioned twelfth representative embodiment (see FIG. 21), the filtering members 87 and 88 (not shown) of a double structure are incorporated in an outer peripheral portion of the filter chamber 331 defined in the case body 330.

With this construction, the filter case 93 of the intake filter 86 can be compactly formed while increasing the volume of the filter chamber 98. Therefore, the fuel supply device can be reduced in size.

(Eighteenth Representative Embodiment)

Figure 27:
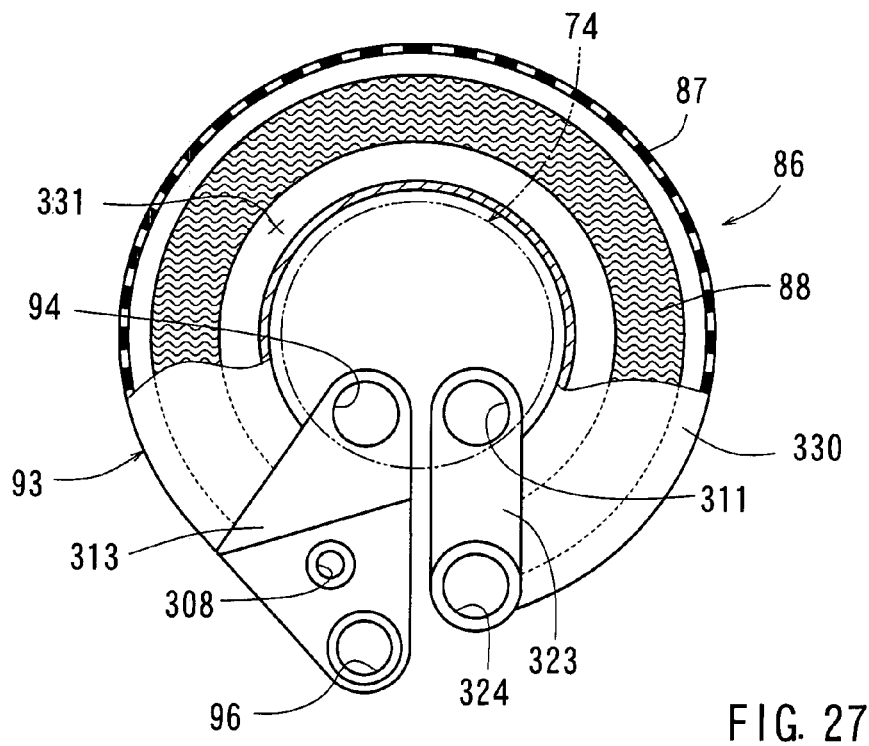
FIG. 27 is a partially broken plan view schematically showing an intake filter according to an eighteenth representative embodiment of the present invention.

An eighteenth representative embodiment of the present invention will be described with reference to FIG. 27. This representative embodiment is obtained by integrating the constructions of the intake filters 86 described in the aforementioned fifteenth representative embodiment (see FIG. 24) and the aforementioned seventeenth representative embodiment (see FIG. 26). In other words, as shown in FIG. 27, the filter case 93 of the intake filter 86 has the case body 330 assuming a generally C-like tubular shape. The fuel pump 74 is inserted into a hollow portion defined by the case body 330. As is the case with the aforementioned twelfth representative embodiment (see FIG. 21), the filtering members 87 and 88 of a double structure are incorporated in an outer peripheral portion of the C-like tubular filter chamber 331 defined in the case body 330.

The upper wall portion 313 of the pressurized fuel introduction passage 95 (see FIG. 24) is formed in a circumferential end portion of the filter case 93. As is the case with the aforementioned fifteenth representative embodiment (see FIG. 24), the pressurized fuel inflow port 96, the vapor drain hole 308, and the intake-side connection port 94 are formed in the upper wall portion 313. The upper wall portion 323 of the pressurized fuel lead-out passage 312 (see FIG. 26) is formed in the circumferentially other end portion of the filter case 93. As is the case with the aforementioned seventeenth representative embodiment (see FIG. 26), the discharge-side connection port 311 and the lead-out port 324 (see FIG. 22) of the pressurized fuel lead-out passage 312 are formed in the upper wall portion 323.

The intake-side connection port 94 and the discharge-side connection port 311 are provided at such positions as to protrude inwardly of the case body 330. The pump intake port 242 and the pump discharge port 77 of the fuel pump 74 inserted in the case body 330 are easily connected to each other by being fitted to each other.

With this construction, the intake filter 86 can be compactly constructed. Therefore, the fuel supply device can be reduced in size.

(Nineteenth Representative Embodiment)

Figure 28:
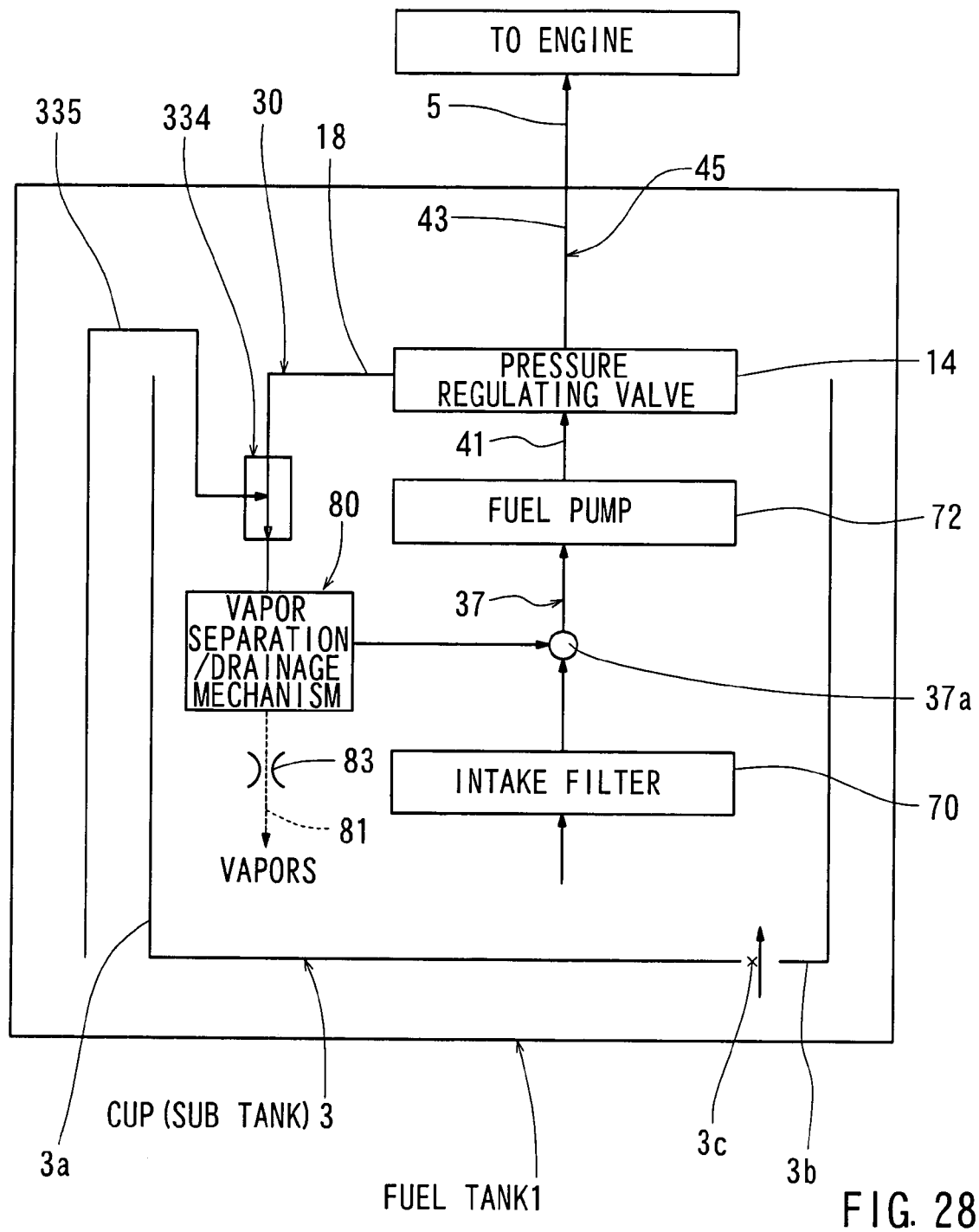
FIG. 28 is an explanatory view showing how fuel flows in a fuel supply device for a fuel returnless system according to a nineteenth representative embodiment of the present invention.

A nineteenth representative embodiment of the present invention will be described with reference to FIG. 28. This representative embodiment is obtained by modifying the aforementioned eighth representative embodiment. In this representative embodiment, as shown in FIG. 28, a jet pump (to which reference numeral 334 is assigned) similar to that of the aforementioned third representative embodiment (see FIG. 6) is provided between the pressure regulating valve 14 and the vapor separation/drainage mechanism 80 in the pressurized fuel return passage 30 of the aforementioned eighth representative embodiment (see FIG. 17), namely, in a midway portion of the pressurized fuel return pipe 18. As shown in FIG. 28, the jet pump 334 in this representative embodiment is located above the vapor separation/drainage mechanism 80. Therefore, the fuel intake pipe 335 is connected to the jet pump 334 and an intake port of the fuel intake pipe 335 faces a region close to the bottom face of the fuel tank 1. Owing to a negative pressure generated in discharging pressurized fuel flowing through the pressurized fuel return passage 30 from an upstream side to a downstream side of the jet pump 334, the jet pump 334 draws fuel from outside of the reserve cup 3 in the fuel tank 1 through the fuel intake pipe 335 and discharges the fuel into the pressurized fuel return passage 30. In other words, using the flow of pressurized fuel flowing through the pressurized fuel return passage 30 as a driving source, the jet pump 334 performs a pumping action of transferring fuel from outside of the reserve cup 3 in the fuel tank 1 into the reserve cup 3 through the fuel intake pipe 335.

The fuel supply device in the fuel returnless system of this representative embodiment also makes it possible to achieve an operation and an effect similar to those of the aforementioned eighth representative embodiment. In addition, the jet pump 334, which uses a flow of pressurized fuel flowing through the pressurized fuel return passage 30 as a drive source, can draw fuel into the pressurized fuel return passage 30. Accordingly, increasing the amount of fuel returned to the fuel intake passage 37 can mitigate the negative pressure otherwise generated in the intake filter 70.

(Twentieth Representative Embodiment)

Figure 29:
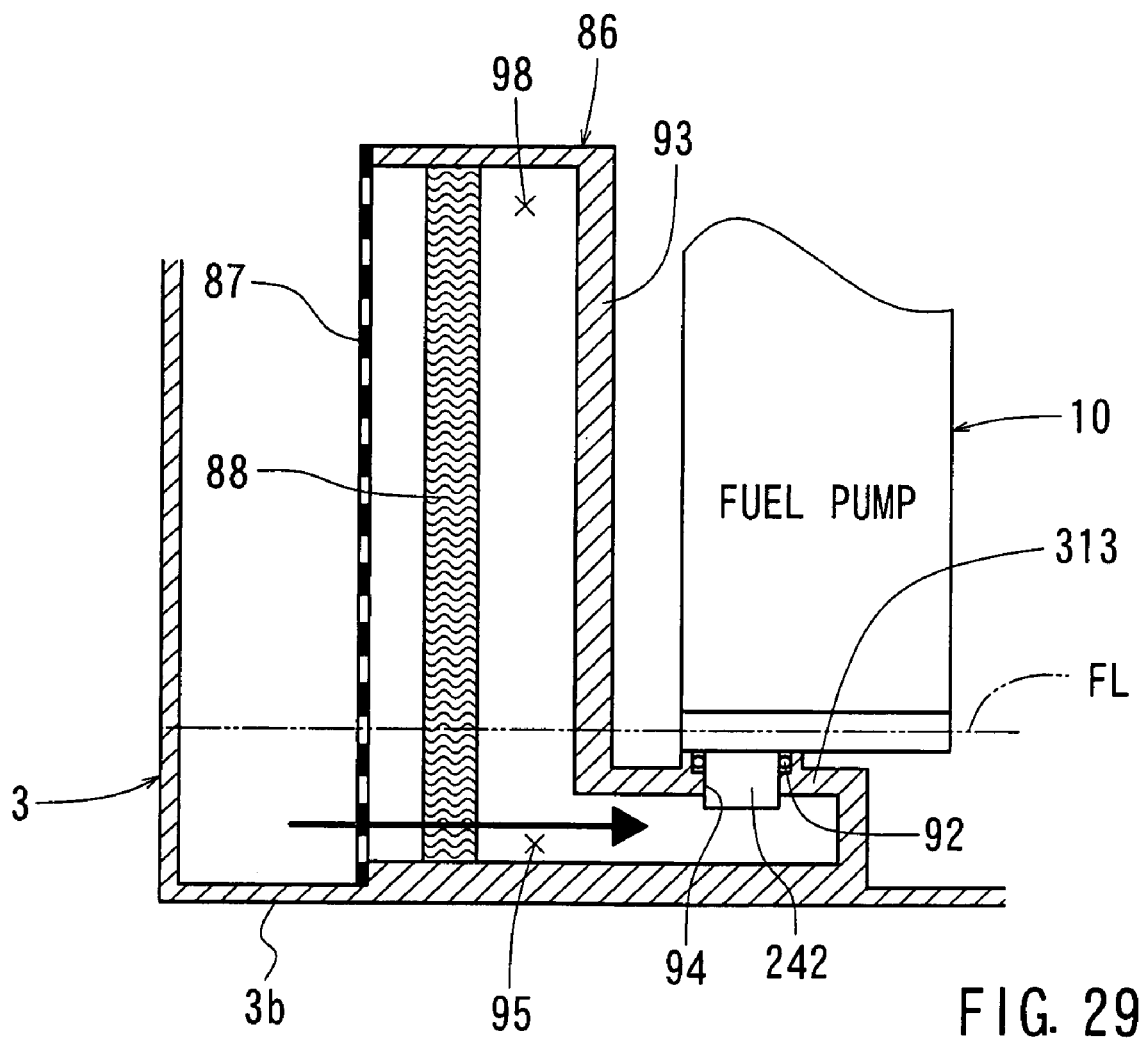
FIG. 29 is an explanatory view showing a reserve cup according to a twentieth representative embodiment of the present invention.

A twentieth representative embodiment of the present invention will be described with reference to FIG. 29. This representative embodiment is obtained by modifying the aforementioned fourteenth representative embodiment (see FIG. 23). In this representative embodiment, as shown in FIG. 29, a bottom wall portion of the filter case 93 of the intake filter 86 is molded integrally with the bottom wall 3b of the reserve cup 3. The number of components can therefore be reduced and the fuel supply device can be reduced in size. The bottom wall portion of the filter case 93 may be mounted to and thus integrated with the bottom wall 3b of the reserve cup 3. In this manner, that portion of the bottom wall portion of the filter case 93, which is connected to the reserve cup 3, constitutes a part of a component disposed around the reserve cup 3.

(Twenty-First Representative Embodiment)

Figure 30:
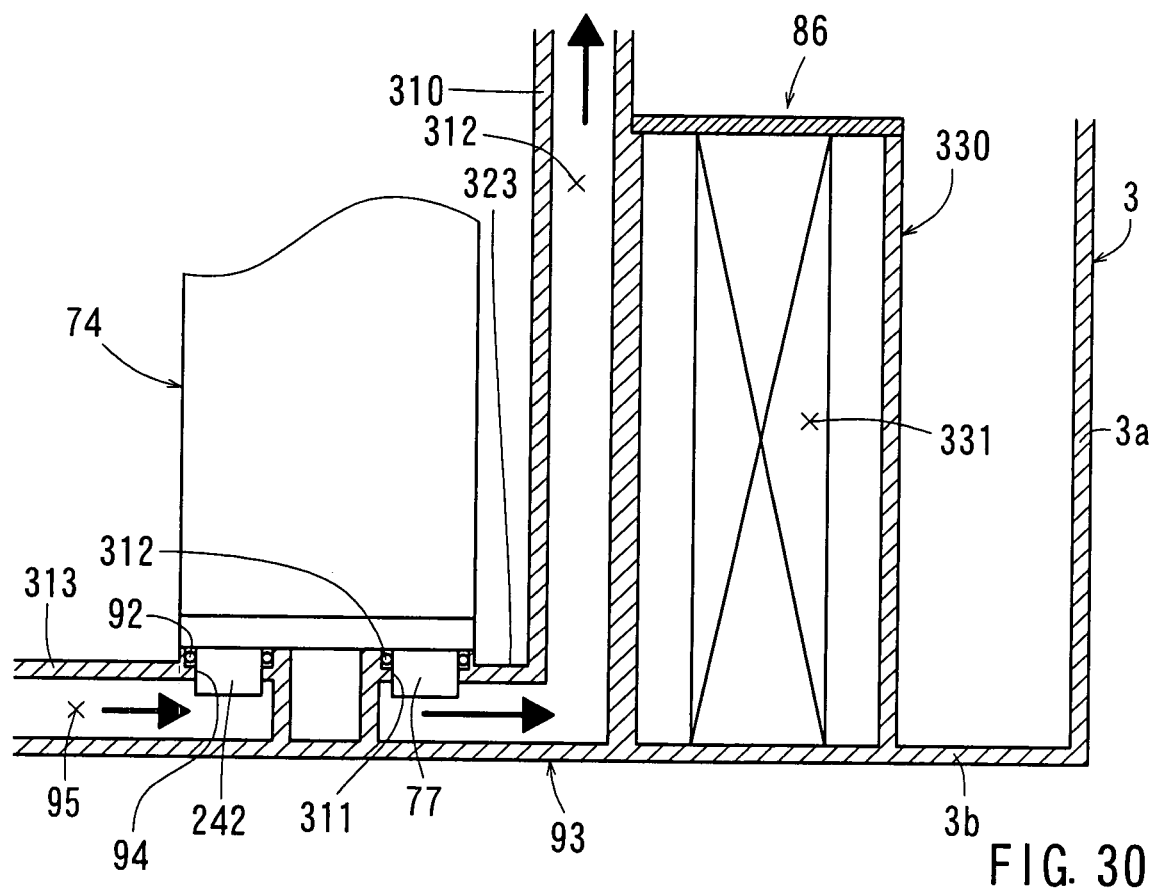
FIG. 30 is an explanatory view showing a reserve cup according to a twenty-first representative embodiment of the present invention.

A twenty-first representative embodiment of the present invention will be described with reference to FIG. 30. This representative embodiment is obtained by modifying the aforementioned seventeenth representative embodiment (see FIG. 26). In this representative embodiment, as shown in FIG. 30, a bottom wall portion of the filter case 93 of the intake filter 86 is integrally molded with the bottom wall 3b of the reserve cup 3. The lateral wall 3a of the reserve cup 3 is formed so as to surround the case body 330 of the filter case 93 of the intake filter 86 while leaving a predetermined gap therefrom. Thus, as is the case with the aforementioned twentieth representative embodiment (see FIG. 29), the number of components can be reduced and the fuel supply device can be reduced in size. The bottom wall portion of the filter case 93 may be mounted to and thus integrated with the bottom wall 3b of the reserve cup 3. In this manner, that portion of the bottom wall portion of the filter case 93, which is connected to the reserve cup 3, constitutes a part of a component disposed around the reserve cup 3.

(Twenty-Second Representative Embodiment)

Figure 31:
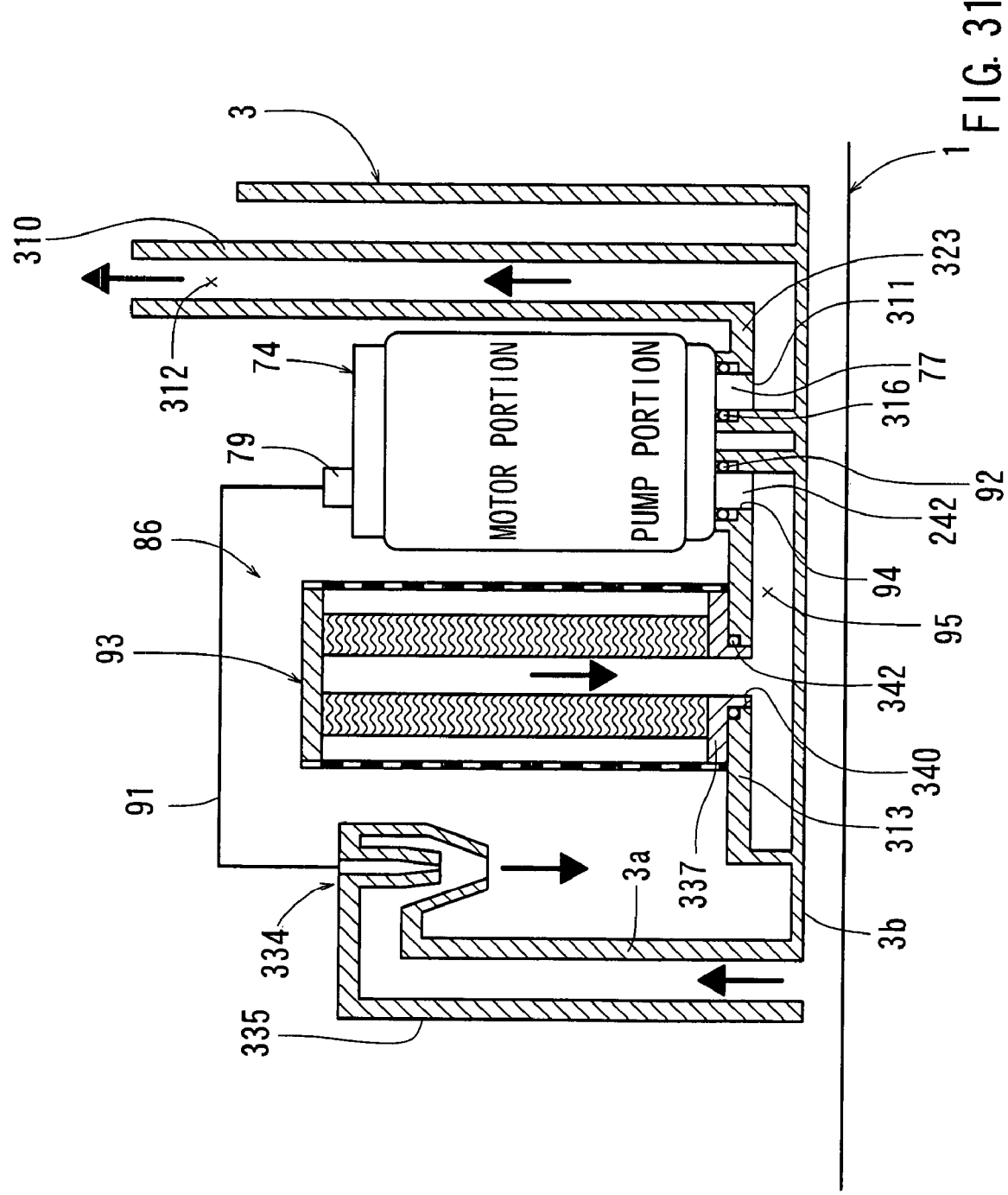
FIG. 31 is a schematic view showing a fuel supply device for a fuel returnless system according to a twenty-second representative embodiment of the present invention.

A twenty-second representative embodiment of the present invention will be described with reference to FIG. 31. This representative embodiment is obtained by modifying the aforementioned thirteenth representative embodiment (see FIG. 22). In this representative embodiment, as shown in FIG. 31, the pressurized fuel introduction passage 95 and the pressurized fuel lead-out passage 312 are integrally molded with the bottom wall 3b of the reserve cup 3.

As is the case with the aforementioned thirteenth representative embodiment, the pump intake port 242 and the pump discharge port 77 of the fuel pump 74 are connected in a sealed state to the pressurized fuel introduction passage 95 and the pressurized fuel lead-out passage 312, via the sealing members 92 and 316.

The filter case 93 of the fuel filter 86 of this embodiment is formed separately from the pressurized fuel introduction passage 95. A fuel outflow port 338, through which filtered fuel flows out, is formed in a bottom wall portion 337 of the filter case 93. A filter connection port 340 is connectible in a sealed state to the fuel outflow port 338 (more specifically, a tubular portion forming the fuel outflow port 338) of the filter case 93 by means of a faucet joint composed of a socket and a spigot and is formed in the upper wall portion 313 of the pressurized fuel introduction passage 95. In addition, an annular groove (which is not assigned a reference numeral) is formed in an upper end portion of the filter connection port 340 of the pressurized fuel introduction passage 95. A sealing member 342 is fitted in the annular groove and is configured as an O-ring for radially elastically sealing a gap between the fuel outflow port 338 of the filter case 93 and the filter connection port 340 of the pressurized fuel introduction passage 95.

The jet pump 334 in the aforementioned nineteenth representative embodiment (see FIG. 28) is integrated with the upper end portion of the lateral wall 3a of the reserve cup 3 by means of integral molding or mounting. Unlike the aforementioned nineteenth representative embodiment, the jet pump 334 is not provided in the midway portion of the pressurized fuel return pipe 18. The drainpipe 91 connected to the drain port 79 of the fuel pump 74 is connected to the jet pump 334. The drain port 79 of the fuel pump 74 of this representative embodiment is positioned displaced from the rotational axis of the motor portion.

Owing to the negative pressure generated in discharging the pressurized fuel discharged from the drain port 79 of the fuel pump 74 from the upstream side to the downstream side of the jet pump 334, the jet pump 334 transfers fuel outside the reserve cup 3 in the fuel tank 1 into the reserve cup 3. The fuel intake pipe 335 leading to the jet pump 334 is integrally molded with the lateral wall 3a of the reserve cup 3.

The fuel supply device in the fuel returnless system of this representative embodiment also makes it possible to achieve an operation and an effect similar to those of the aforementioned thirteenth representative embodiment. Furthermore, the jet pump 334, which uses the flow of pressurized fuel discharged from the drain port 79 of the fuel pump 74 as a driving source, can transfer fuel from outside of the reserve cup 3 into the reserve cup 3. Accordingly, the pressure energy of the flow of pressurized fuel discharged from the drain port 79 of the fuel pump 74 can be efficiently utilized.

The pressurized fuel introduction passage 95 and the pressurized fuel lead-out passage 312 are integrated with the reserved cup 3. Thus, the number of components can be reduced, and the fuel supply device can be reduced in size. The pressurized fuel introduction passage 95 and/or the pressurized fuel lead-out passage 312 may be mounted to and thus integrated with the bottom wall 3b of the reserve cup 3. In this manner, those portions of the pressurized fuel introduction passage 95 and the pressurized fuel lead-out passage 312 which are connected to the reserve cup 3 constitute parts of components disposed around the reserve cup 3.

The jet pump 334 is integrated with the reserve cup 3. Thus, the number of components can be reduced and the fuel supply device can be reduced in size. The jet pump 334 may be mounted to and thus integrated with the lateral wall 3a of the reserve cup 3. In this manner, that portion of the jet pump 334, which is connected to the reserve cup 3, constitutes a part of a component disposed around the reserve cup 3.

The fuel intake pipe 335 is integrated with the reserve cup 3. Thus, the number of components can be reduced and the fuel supply device can be reduced in size. The fuel intake pipe 335 may be mounted and thus integrated with the lateral wall 3a of the reserve cup 3. In this manner, that portion of the fuel intake pipe 335 that is connected to the reserve cup 3, constitutes a part of a component disposed around the reserve cup.

The sealing member 342 is interposed between the fuel outflow port 338 of the fuel case 93 and the filter connection port 340 connected to the fuel outflow port 338. Thus, fuel can be prevented or restrained from leaking from a connecting portion between the fuel outflow port 338 of the fuel case 93 and the filter connection port 340.

The present invention may not be limited to the aforementioned representative embodiments but may be modified without departing from the spirit of the present invention.

What is claimed is:

1. A fuel supply device for a fuel returnless system, the device comprising:
    a fuel pump arranged and constructed to draw, pressurize, and discharge fuel in a fuel tank;
    a pressure regulating valve arranged and constructed to regulate a pressure of the pressurized fuel and to drain a surplus of the pressurized fuel into the fuel tank;
    a first filter arranged and constructed to remove foreign matters contained in the fuel drawn into the fuel pump; and
    a pressurized fuel return passage arranged and constructed to return a part of the pressurized fuel to a fuel intake passage extending from an interior of the first filter to a pump intake port of the fuel pump,
    wherein the fuel supply device is disposed in the fuel tank.

2. A fuel supply device as in claim 1, further comprising a second filter arranged and constructed to remove foreign matters contained in the pressurized fuel discharged from the fuel pump.

3. The fuel supply device as in claim 1, wherein the pressurized fuel returned to the fuel intake passage through the pressurized fuel return passage is a surplus of the pressurized fuel drained from the pressure regulating valve.

4. The fuel supply device as in claim 1, wherein the first filter is provided with a pressurized fuel inflow port connectible to the pressurized fuel return passage.

5. The fuel supply device as in claim 1, wherein the pressurized fuel return passage is provided with a vapor separation/drainage mechanism that separates and drains vapors contained in the pressurized fuel flowing through the return passage.

6. The fuel supply device as in claim 5, wherein the vapor separation/drainage mechanism comprises a vapor drain hole formed in an upper wall portion of the pressurized fuel return passage, so that the vapors are drained through the vapor drain hole.

7. The fuel supply device as in claim 5, wherein the vapor separation/drainage mechanism comprises a vapor separation filter that allows passage of the pressurized fuel and restricts passage of vapors contained in the pressurized fuel.

8. The fuel supply device as in claim 7, wherein the vapor separation filter is formed by a part of a filtering member of the first filter.

9. The fuel supply device as in claim 5, wherein the vapor separation/drainage mechanism comprises an expansion chamber provided in the pressurized fuel return passage, the expansion chamber being larger in passage cross-sectional area than the return passage.

10. The fuel supply device as in claim 9, wherein a vapor drain hole through which vapors are drained is formed in a wall portion that is located higher than an inlet portion of the expansion chamber.

11. The fuel supply device as in claim 9, wherein the vapor separation/drainage mechanism comprises a collision wall with which a flow of the pressurized fuel that has flown into the expansion chamber collides.

12. The fuel supply device as in claim 5, wherein the vapor separation/drainage mechanism comprises a vapor drain passage through which vapors are drained, and the vapor drain passage is provided with a valve mechanism for maintaining a fuel pressure in the pressurized fuel return passage at a prescribed pressure.

13. The fuel supply device as in claim 5, wherein the vapor separation/drainage mechanism comprises a vapor drain passage through which vapors are drained, and the vapor drain passage is provided with throttle means for limiting a flow rate of the fuel to be drained.

14. The fuel supply device as in any in claim 2, wherein the first filter has a larger filtering area than that of the second filter in order to remove foreign matters that are approximately equal in size to or smaller in size than foreign matters removed by the second filter.

15. The fuel supply device as in claim 5, wherein the fuel supply device further comprises:
    a reserve cup installed in the fuel tank and storing fuel that has been drawn via the first filter by the fuel pump; and
    a jet pump operable to transfer the fuel outside the reserve cup into the reserve cup by using a flow of pressurized fuel discharged from a vapor drain passage of the vapor separation/drainage mechanism, through which vapors are drained, as a drive source.

16. The fuel supply device as in claim 1, wherein the fuel supply device further comprises:
    a reserve cup installed in the fuel tank and storing fuel that has been drawn via the first filter by the fuel pump; and
    a jet pump operable to transfers the fuel outside the reserve cup into the reserve cup by using a flow of pressurized fuel discharged from a branch passage provided in the pressurized fuel return passage as a drive source.

17. The fuel supply device as in claim 1, wherein the pressurized fuel return passage further comprises a jet pump operable to draw the fuel by using a flow of the pressurized fuel as a drive source.

18. The fuel supply device as in claim 16, wherein the jet pump serves also as a vapor separation/drainage mechanism that separates and drains vapors contained in pressurized fuel flowing through the pressurized fuel return passage.

19. The fuel supply device as in claim 1, wherein the fuel pump comprises a pump portion operable to draw, pressurize, and discharge the fuel, and a motor portion comprising a brushless motor operable to drive the pump portion and defines a space through which the pressurized fuel discharged from the pump portion passes.

20. The fuel supply device as in any claim 1, wherein the fuel pump comprises a pump portion operable to draws and pressurize the fuel and directly discharges the fuel to the outside of the pump, and a motor portion operable to drive the pump portion.

21. The fuel supply device as in claim 20, wherein the fuel pump comprises an outflow port through which a part of pressurized fuel flows out from the pump portion into the motor portion, and a drain port through which pressurized fuel that has flown out into the motor portion through the outflow port is discharged to the outside of the pump.

22. The fuel supply device as in claim 21, further comprising a jet pump operable to transfer the fuel outside the reserve cup into the reserve cup by using a flow of pressurized fuel discharged from the drain port of the fuel pump as a drive source.

23. The fuel supply device as in claim 1, wherein the first filter comprises filtering members of a multilayer structure which is coarse on an outer layer side and fine on an inner layer side.

24. The fuel supply device as in claim 23, wherein a vapor separation filter is formed by a part of the filtering member provided on an outer layer side of the first filter, the vapor separation filter allowing passage of the pressurized fuel, restricting passage of vapors contained in the pressurized fuel, and enabling the fuel pump to draw the pressurized fuel that has passed through the filtering member on the outer layer side.

25. The fuel supply device as in claim 1, wherein the first filter comprises a pressurized fuel introduction passage through which the pressurized fuel is introduced from the pressurized fuel inflow port to a region close to a pump intake port of the fuel pump.

26. The fuel supply device as in claim 1, wherein the first filter comprises a pressurized fuel lead-out passage which is connectible to a discharge port of the fuel pump and through which the fuel discharged from the discharge port is introduced into a predetermined region.

27. The fuel supply device as in claim 15, wherein a part of at least one component disposed in a vicinity of the reserve cup is integrated with the reserve cup.

28. The fuel supply device as in claim 1, wherein a sealing member is interposed between the pump intake port of the fuel pump and a fuel introduction passage connected to the intake port of the fuel pump.

29. The fuel supply device as in claim 1, wherein a sealing member is interposed between a drain port of the fuel pump and a pressurized fuel lead-out passage connected to the drain port of the fuel pump.

* * * * *